United States Patent
Ramarao et al.

(10) Patent No.: US 7,328,403 B2
(45) Date of Patent: Feb. 5, 2008

(54) DEVICE FOR STRUCTURED DATA TRANSFORMATION

(75) Inventors: Karempudi V. Ramarao, Austin, TX (US); Richard P. Trujillo, Austin, TX (US); Daniel M. Cermak, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 10/889,547

(22) Filed: Jul. 12, 2004

(65) Prior Publication Data

US 2005/0091588 A1   Apr. 28, 2005

Related U.S. Application Data

(60) Provisional application No. 60/513,306, filed on Oct. 22, 2003.

(51) Int. Cl.
*G06F 15/00* (2006.01)
(52) U.S. Cl. .................. 715/523; 715/500.1; 715/513; 715/522; 717/140
(58) Field of Classification Search ............. 715/500.1, 715/513, 522, 523; 717/140
See application file for complete search history.

(56) References Cited

U.S. PATENT DOCUMENTS

| | | | |
|---|---|---|---|
| 5,544,357 A | 8/1996 | Huei | |
| 6,151,034 A | 11/2000 | Jain et al. | |
| 6,223,193 B1 | 4/2001 | Pau et al. | |
| 6,247,068 B1 | 6/2001 | Kyle | |
| 6,263,332 B1 | 7/2001 | Nasr et al. | |
| 6,317,804 B1 | 11/2001 | Levy et al. | |
| 6,772,413 B2 | 8/2004 | Kuznetson | |
| 2001/0042081 A1 | 11/2001 | MacFarlane et al. | |
| 2001/0043600 A1 | 11/2001 | Chatterjee et al. | |
| 2003/0041302 A1 | 2/2003 | McDonald | |

(Continued)

FOREIGN PATENT DOCUMENTS

WO   WO01/46837   6/2001

(Continued)

OTHER PUBLICATIONS

Veillard, Daniel, "The XSLT C library for Gnome: Library internals", Oct. 15, 2002, XMLSoft.org, pp. 1-16,<http://web.archive.org/web/20021015233704/http://xmlsoft.org/XSLT/internals.html>.*

(Continued)

*Primary Examiner*—Stephen Hong
*Assistant Examiner*—David Faber
(74) *Attorney, Agent, or Firm*—Blakely, Sokoloff, Taylor & Zafman LLP

(57) ABSTRACT

Numerous embodiments of structured data transformation are disclosed. Some embodiments include characterizing at least a portion of an expression in a stylesheet as evaluatable at a phase wherein the phase is one of a compile phase, a parse phase, or a transformation phase of applying the stylesheet to a document to transform the document in a document transformation appliance, applying at least a portion of the expression to the document in the phase determined in the characterizing, combining results from applying the at least a portion of the expression and from applying other expressions to the document to generate a transformed document, and outputting the transformed document or saving the transformed document to memory.

9 Claims, 29 Drawing Sheets

U.S. PATENT DOCUMENTS

2003/0163285 A1     8/2003    Nakamura et al.
2004/0010754 A1*   1/2004    Jones .......................... 715/513

FOREIGN PATENT DOCUMENTS

WO        WO03/094007       11/2003

OTHER PUBLICATIONS

Fenandez et al., "SilkRoute: Trading Between Relations and XML," Computer Networks 33, www.elsvier.com/locate/comnet, 2000 (723-745).

Banerjee et al., "Oracle 8i—The XML Enabled Data Management System," 2000 IEEE, Oracle Corporation, (pp. 561-568).

Emmerich et al., "Markup Meets Middleware," 1999 IEEE, (pp. 261-266).

Barton et al., "Streaming Xpath Processing with Forward and Backward Axes," 2003 IEEE, (pp. 455-466).

Morton Jorgensen, "XSLTC Documentation," xml.apache.org/xalan-j/xsltc/index.html, Jun. 18, 2003 (4 Pages).

Practical Transformation Using XSLT and Xpath (XSL Transformations and the XML Path Language,) ISBN 1-894049-05-5, Eighth Edition, Crane Software, Ltd., Jul. 7, 2000, (122 Pages).

Gupta et al., "Stream Processing of Xpath Queries with Predicates," ACM 1-58113-634, SIGMOD 2003, Jun. 9-12, 2003, (pp. 419-430).

G. Ken Holman, "What is XSLT?," http://www.xml.com/pub/a/2000/08/holman/sl.html, Aug. 12-15, 2003, (31 Pages).

G. Ken Holman, "Getting Started with XSLT and XPath," http://www.xml.com/lpt/a/2000/8/holman/s2_1.html, Aug. 12-15, 2003, (15 Pages).

Norman Walsh et al., "What do XML Documents Look Like?" http://www.xml.com/pub/a/98/10/guide2.html, Oct. 3, 1998, (13 Pages).

Norman Walsh, "What is XML?," http://www.xml.com/pub/a/98/10/guide3.html, Oct. 3, 1998, (5 Pages).

Norman Walsh, "Pulling the Pieces Together," http://www.xml.com/pub/a/98/10/guide4.html, Oct. 3, 1998, (5 Pages).

Norman Walsh, "Validity," http://www.xml.com/pub/a/98/10/guide3.html, Oct. 3, 1998, (2 Pages).

Maler et al., "XML Linking Language (Xlink)," http://www.w3.org/TR/1998/WD-xlink-19980303.html, Mar. 3, 1998, (15 Pages).

Maler et al., "XML Pointer Language," http://www.w3.org/TR/1998/WD-xptr-19980303.html, Mar. 3, 1998, (19 Pages).

Adler et al., "Extensible Stylesheet Language (XSL) Version 1.0," http://www.w3.org/TR/2000/CR-xsl-20001121.html, Nov. 21, 2000, (11 Pages).

Bray et al., "Extensible Markup Language (XML Edition)," http://www.w3.org/TR/2000/REC-xml-20001006.html, Oct. 6, 2000, (50 Pages).

Clark et al., "XML Path Language (Xpath) Version 1.0," http://www.w3.org/TR/1999/REC-xpath-19991116.html, Nov. 16, 1999, (36 Pages).

James Clark, "XSL Transformations (XSLT) Version 1.0," http://www.w3.org/TR/1999/REC-xslt-19991116.html, Nov. 16, 1999, (102 Pages).

International Search Report, PCT/US2004/035300 mailed Feb. 17, 2005, (15 Pages).

DataPower Technology, Inc., "XA35 XML Accelerator," 2002, 2 pages.

DataPower Technology, Inc., "XS40XML Security Gateway," 2003, 4 pages.

DataPower Technology, Inc., Intelligent XML-Aware Network Infrastructure, "XG3™ Technology," printed from http://www.datapower.com/products/index.html on Oct. 14, 2003, 2 pages.

DataPower Technology, Inc., Intelligent XML-Aware Network Infrastructure, "XA35 XML Accelerator Applications," printed from http://www.datapower.com/products/app_za35.html on Oct. 14, 2003, 2 pages.

DataPower Technology, Inc., Intelligent XML-Aware Network Infrastructure, "XA35 XML Accelerator," printed from http://www.datapower.com/products/xa35.html on Oct. 14, 2003, 3 pages.

DataPower Technology, Inc., Intelligent XML-Aware Network Infrastructure, "XS40 XML Security Gateway Applications," printed from http://www.datapower.com/products/app_xs40.html on Oct. 14, 2003, 2 pages.

Sarvega, Inc., "XESOS™ Technology," 2003, 2 pages.

Sarvega, Inc. "Sarvega XPE 2000," 2003, 1 page.

Sarvega, Inc., The Sarvega XPE 2000: Unlock the Power of XML, 2003, 1 page.

Sarvega, Inc., "XESOS Studio™," 2003, 1 page.

Forum Systems, Inc., Managing & Accelerating XML Web Services Security, "Forum Sentry™," printed from http://www.forumsys.com/products_sentry.html on Oct. 14, 2003, 1 page.

Forum Systems, Inc., Managing & Accelerating XML Web Services Security, "Extended Enterprise Security" printed from http://www.forumsys.com/products-40303-ees.html on Oct. 14, 2003, 1 page.

Forum Systems, Inc., Managing & Accelerating XML Web Services Security, "Forum Sentry™ 1500 Benefits" printed from http://www.forumsys.com/products-40303-benefits.html on Oct. 14, 2003, 1 page.

Forum Systems, Inc., Managing & Accelerating XML Web Services Security, "Forum Sentry™ 1500 Specifications" printed from http://www.forumsys.com/products-40303-specifications.html on Oct. 14, 2003, 2pgs.

Forum Systems, Inc., Managing & Accelerating XML Web Services Security, "Unique Features" printed from http://www.forumsys.com/products-40303-solutions.html on Oct. 14, 2003, 1 page.

Reactivity, Inc., "Secure XML: Reactivity XML Firewall™," 2003, 3 pages.

Westbridge Technology, "Westbridge XA2500 Security and Management Appliance," 2003, 2 pages.

Westbridge Technology, "XMS Overview," 2003, 2 pages.

Westbridge Technology, "XMS Features," 2003, 4 pages.

Westbridge Technology, "XMS Architecture," 2003, 1 page.

Sarvega, Inc., "Product Features and Technical Specifications," 2003, 1 page.

Forum Systems, Inc., "SSL is Not Enough for Today's Web Services", White Paper, (Jan. 1, 2002), 9 pp.

* cited by examiner

| Parse-time Expression Tree 26 |||||||||||
|---|---|---|---|---|---|---|---|---|---|---|
| TLT | S/N | LN | PT | EOL | Ptr / | Ptr // | Ptr Attr | XLP | TLP | Pr TP | Pr DT |

120

| Parse-time Expression Tree 26 | | | | | | | | |
|---|---|---|---|---|---|---|---|---|
| TLT | S/N | LN | CD | EOL | XLP | TLP | Pr TP | Pr DT |
| NT | Ptr / | Ptr // | Ptr / Attr | Ptr // Attr | Ptr / PI | Ptr // PI | | |

| CD Field | |
|---|---|
| Bit | Meaning |
| 11 | element, / |
| 10 | element, // |
| 9 | attribute, / |
| 8 | attribute, // |
| 7 | text, / |
| 6 | text, // |
| 5 | comment, / |
| 4 | comment, // |
| 3 | PI, / |
| 2 | PI, // |
| 1 | PI-literal, / |
| 0 | PI-literal, // |

— 302

| NT Field | |
|---|---|
| Enc | Meaning |
| 000 | Element |
| 001 | Attribute |
| 010 | Text |
| 011 | Comment |
| 100 | PI |
| 101 | Node |
| 110 | PI w/ Target |
| 111 | Reserved |

— 304

| PrTP Field | |
|---|---|
| Enc | Meaning |
| 0000 | None |
| 0001 | Positional |
| 0100 | Element Child |
| 0101 | Attribute Name |
| 0110 | PI Node Test w/ Name |
| 1000 | Node Test |
| 1001 | Comment Node Test |
| 1010 | PI Node Test |
| 1011 | Text Node Test |

DEVICE FOR STRUCTURED DATA TRANSFORMATION

This application claims benefit of priority to U.S. Provisional Patent Application Ser. No. 60/513,306 filed Oct. 22, 2003, which is incorporated herein by reference in its entirety.

BACKGROUND OF THE INVENTION

1. Field of the Invention

This invention is related to the field of processing and transforming structured documents, such as extensible markup language (XML), standardized generalized markup language (SGML), hypertext markup language (HTML), and unstructured data and documents in databases and/or filesystems.

2. Description of the Related Art

As computers and computer storage have become ubiquitous, the volume of information that various organizations maintain has increased dramatically. The information is often stored in many different forms, such as word processor documents, spreadsheet files, databases, portable document format (pdf) documents, imaged documents (e.g. scanned-in to various graphical display formats), plain text, etc. Additionally, documents may be stored in markup language form such as SGML, HTML, XML, etc.

Having information in so many different forms complicates the sharing of information within the organization as well as external to the organization. Recently, XML has been emerging as a standard for describing content in documents and providing structure to unstructured data and/or documents. XML provides a flexible, extensible mechanism for defining markup for the document, permitting the markup to be customized to the information being described.

One mechanism implemented as a means to process XML is the extensible stylesheet language (XSL) and stylesheets written using XSL. Stylesheets may be written to transform XML documents from one markup definition (or "vocabulary") defined within XML to another vocabulary, from XML markup to another structured or unstructured document form (such as plain text, word processor, spreadsheet, database, pdf, HTML, etc.), or from another structured or unstructured document form to XML markup. Thus, stylesheets may be used to simplify the access to an organization's information (in its many different forms) by transforming the document's structure from its stored form to the form expected by a given user. There are also other types of stylesheets (e.g. cascading style sheets, or CSS, defined as an extension to HTML).

Typically, the document transformation process is performed in software executing on a general purpose computer (e.g. the server that manages the document storage, the user machine, etc.). Significant delays in accessing such documents are being experienced.

SUMMARY OF THE INVENTION

In one embodiment, an apparatus comprises a parse circuit and an expression processor. Coupled to receive a document, the parse circuit is configured to parse the document and generate events corresponding to the parsing. Coupled to receive the events from the parse circuit, the expression processor is configured to apply nodes identified by the events to one or more expression trees derived from a plurality of expressions in a stylesheet. The expression processor identifies nodes that satisfy the expressions represented in the one or more expression trees as a result of applying the nodes to the one or more expression trees.

In another embodiment, a method is contemplated. Each expression in a stylesheet is characterized as evaluatable at one of a plurality of phases of applying the stylesheet to a document in a document transformation appliance. Each expression is applied to the document in the one of the plurality of phases determined in the characterizing.

BRIEF DESCRIPTION OF THE DRAWINGS

The following detailed description makes reference to the accompanying drawings, which are now briefly described.

FIG. 17 is a block diagram of another embodiment of the parse-time expression tree shown in FIGS. 2 and 9.

FIG. 18 is a set of tables illustrating exemplary encodings for certain fields shown in FIG. 17.

Figure 1:
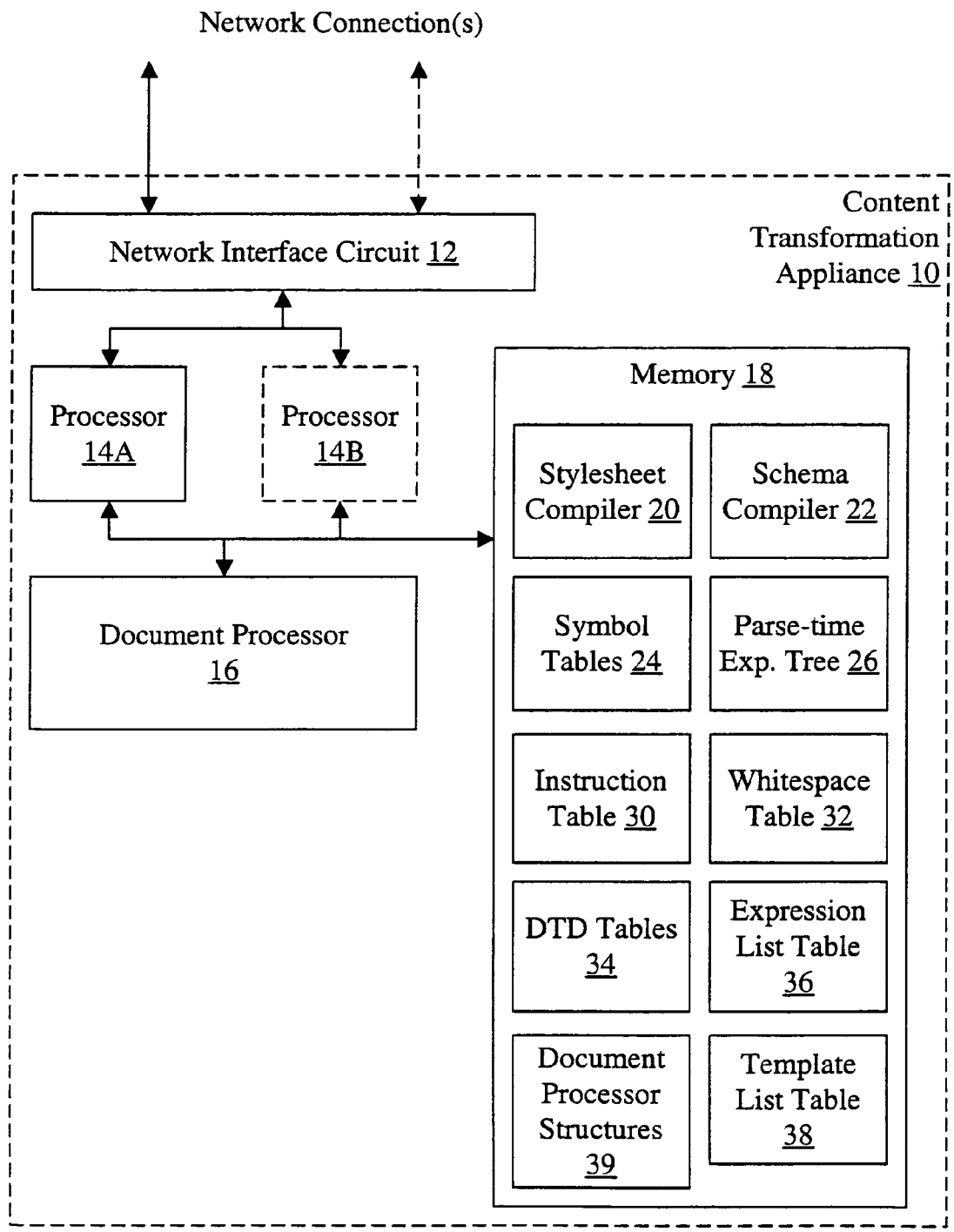
FIG. 1 is a block diagram of one embodiment of a content transformation appliance.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a content transformation appliance 10 is shown. In the embodiment of FIG. 1, the content transformation appliance 10 may include a network interface circuit 12, one or more processors such as processors 14A and optionally 14B, a document processor 16, and a memory 18. The network interface circuit 12 is coupled, via one or more network connections, to a network or networks. Various computer systems (not shown in FIG. 1) may also be coupled to the network or networks. The network interface circuit 12 is also coupled to the processors 14A-14B. The processors are coupled to the memory 18 and to the document processor 16, which is also coupled to the memory 18. In the illustrated embodiment, the memory 18 stores a stylesheet compiler 20, a schema compiler 22, one or more symbol tables 24, one or more parse-time expression trees 26, an instruction table 30, a whitespace table 32, document type definition (DTD) tables 34, an expression list table 36, a template list table 38, and various document processor data structures 39.

The content transformation appliance 10 may receive, via the network connections, stylesheets to be applied to documents, schema to be applied to documents, and/or the documents themselves (with a request to apply a stylesheet/schema to the document). In response to a request to apply a stylesheet, the content transformation appliance 10 may apply the stylesheet to the document and generate a transformed document to be transmitted through the network to the requestor. In some embodiments, the content transformation appliance 10 may also receive a request to parse a document (e.g. into a defined format such as simple application programming interface (API) for XML (SAX) or document object model (DOM)). In response to a request to apply a schema (or DTD), the content transformation appliance 10 may validate the document according to the schema or DTD and generate a success message or a fail message (with an indication of the failure) to the requestor.

In some embodiments, the content transform appliance 10 may receive an XPath expression to be used to access an XML database. In such embodiments, the expression may be compiled similar to a stylesheet (described in more detail below), and may be applied to the XML database in a manner similar to applying a stylesheet to a document.

Generally, an XML document has a hierarchical tree structure, where the root of the tree identifies the document as a whole and each other node in the document is a descendent of the root. Various elements, attributes, and document content form the nodes of the tree. The elements define the structure of the content that the elements contain. Each element has an element name, and the element delimits content using a start tag and an end tag that each include the element name. An element may have other elements as sub-elements, which may further define the structure of the content. Additionally, elements may include attributes (included in the start tag, following the element name), which are name/value pairs that provide further information about the element or the structure of the element content. XML documents may also include processing instructions that are to be passed to the application reading the XML document, comments, etc. As used herein, the term "document" refers to any content that has a corresponding defined structure that can be used to interpret the content. The content may be highly structured (such as an XML document, HTML document, pdf document, word processing document, database, etc.) or may be as simple as a plain text document (whose structure may be, e.g., a stream of characters). Generally, a "node" of a document may include structural definition (e.g. elements and/or attributes in XML) and/or document content. In one particular embodiment, a node may include elements, attributes, processing instructions, comments, and text.

An XSLT stylesheet may be viewed as a set of templates. Each template may include: (i) an expression that selects nodes in the source document's tree structure; and (ii) a body that specifies a corresponding portion of the output document's structure to be instantiated for each matching node of the source document. Applying a stylesheet to a source document may comprise attempting to find a matching template for each node in the source document, and instantiating the body of the matching template in the output document's tree. The body of the template may include one or more of: (i) literal content to be instantiated in the output document; (ii) selection of content from the matching nodes to be copied into the output document; and (iii) statements that are to be evaluated, with the result of the statements being instantiated in the output document. Together, the content to be instantiated and the statements to be evaluated may be referred to as "actions" to be performed on the nodes that match the template. The body of the template may include one or more "apply templates" statements, which include an expression selecting one or more nodes and causing the templates in the stylesheet to be applied to the selected nodes, thus effectively nesting the templates. If a match to the apply templates statement is found, the resulting template is instantiated within the instantiation of the template that includes the apply templates statement. Other statements in the body of the template may also include expressions to be matched against nodes (and the statements may be evaluated on the matching nodes). While XSLT stylesheets may be used in one example herein, generally a "stylesheet" may comprise any specification for transforming a source document to an output document. The source and output documents may be in the same language (e.g. the source and output documents may be different XML vocabularies), or may differ (e.g. XML to pdf, etc.). Another example of stylesheets may be cascading stylesheets defined for HTML and/or XML Query.

The expressions used in a stylesheet may generally comprise node identifiers and/or values of nodes, along with operators on the node identifiers to specify parent/child (or ancestor/descendant) relationships among the node identifiers and/or values. A node identifier may comprise a name (e.g. element name, attribute name, etc.) or may comprise an expression construct that identifies a node by type (e.g. a node test expression may match any node, or a text test expression may match any text node). In some cases, a name may belong to a specific namespace. In such cases, the node identifier may be a name associated with a namespace. In XML, the namespace provides a method of qualifying element and attribute names by associating them with namespace names identified by a universal resource identifier (URI). Thus, the node identifier may be the qualified name (the optional namespace prefix, followed by a colon, followed by the name). A name, as used herein (e.g. element name, attribute name, etc.) may include a qualified name. Expressions may also include predicates, which may be extra condition(s) for matching a node. A predicate is an expression that is evaluated with the associated node as the context node (defined below), where the result of the expression is either true (and the node may match the expression node) or false (and the node does not match the expression). Thus, an expression may be viewed as a tree of nodes to be matched against a document's tree. In XPath, the expression language used in XSLT, an expression may be evaluated in the context of a "context node" as well (that is, expressions may be relative to the context node, specifying node identifiers in the expression as ancestors, descendents, parents, or children of the context node as well as relationships to other node identifiers). A given document node may satisfy an expression if the given document node is selected via evaluation of the expression. That is, the expression node identifiers in the expression match the given document node's name or document node names having the same relationship to the given document node as specified in the expression, and any values used in the expression are equal to corresponding values related to the given document node. A document node may also be referred to as a "matching node" for a given expression if the node satisfies the given expression. In some cases in the remainder of this discussion, it may be helpful for clarity to distinguish nodes in expression trees from nodes in a document. Thus, a node may be referred to as an "expression node" if the node is part of an expression tree, and a node may be referred to as a "document node" if the node is part of the document being processed.

In the illustrated embodiment, applying the stylesheets to documents may be performed in the following manner: The stylesheet compiler 20 may comprise software (i.e. a plurality of instructions) executed on one of the processors 14A-14B to compile the stylesheet into one or more data structures and code for use by the document processor 16. The document processor 16 may apply the data structures to the source document and generate the output document.

Particularly, in one embodiment, the stylesheet compiler 20 may assign serial numbers to node identifiers so that expression evaluation may be performed by the document processor by comparing numbers, rather than node identifiers (which would involve character string comparisons). The stylesheet compiler 20 may store a mapping of node identifiers to serial numbers in the symbol tables 24. Additionally, the stylesheet compiler 20 may extract the expressions from the stylesheet and generate expression tree data structures to be used by the document processor for expression matching (e.g. the parse-time expression tree 26). Still further, the stylesheet compiler 20 may generate an instruction table 30 with instructions to be executed for each matching expression (and also instructions to be executed to evaluate run-time predicates, in one embodiment). The instructions in the instruction table, when executed by the document processor 16, may result in performing the actions defined to be executed when the expression is matched. In some embodiments, the instructions may comprise the actions to be performed (i.e. there may be a one-to-one correspondence between instructions and actions). In other embodiments, at least some actions may be realized by executing two or more instructions. The stylesheet compiler 20 may also generate whitespace tables 32 defining how various types of whitespace in the source document are to be treated (e.g. preserved, stripped, etc.), an expression list table 36 and a template list table 38.

The schema compiler 22 may similarly comprise instructions executed on one of the processors 14A-14B. The schema compiler 22 may compile a schema or DTD to generate one or more symbol tables 24 (replacing node identifiers with serial numbers) as well as the DTD tables 34. Generally, a DTD or schema may comprise a definition of both the permissible document structure and the required document structure. An author of the document may thus describe, with a DTD and/or schema, the required and permitted structure of a valid document. In some cases, the DTD or schema may also include default values for attributes. In one embodiment, the DTD/schema may include a variety of information: entity declarations that are used to replace entity references in the document, attributes of a given element that are required attributes for a valid document, attribute default values for attributes that may not be specified in a given element of the document, requirements for the structure of the document (e.g. a required minimum/maximum/specific number of a certain subelement, etc.), and a definition of the permissible structure of the document. The DTD tables 34 may include a table of the entity reference replacements, a table of the required attributes, a table of the attribute defaults, and a skeleton tree identifying the permissible structure (and required structure, if applicable).

The document processor 16 may comprise hardware circuitry to parse the document and to match document nodes to expression nodes in the parse-time expression tree. That is, the hardware circuitry that parses the document and matches document nodes to expression nodes may perform these operations without executing any software instructions. The hardware may generate various data structures storing the parsed content and indications, for each expression, of the matching document nodes. The hardware may then execute the instructions from the instruction table 30 for a given expression on each matching document node of that given expression, generating results which are then combined to produce the output document. Additional details of one embodiment are provided below.

As mentioned above, in the illustrated embodiment, the stylesheet compiler 20 and the schema compiler 22 are implemented in software and the document processor 16 is implemented in hardware. In some embodiments, the critical factor in the performance of the content transformation appliance 10 may be the processing of the document when a transformation request is made and the document is provided. That is, stylesheets and/or schemas may, in many cases, change relatively infrequently as compared to the number of documents being processed. A given stylesheet may be applied to multiple documents (e.g. at least on the order of tens of documents) prior to the stylesheets being changed (to an updated stylesheet or to a different stylesheet altogether). A similar relationship may hold for schema and the documents to which they are to be applied. Accordingly, capturing the relatively invariant information from the stylesheets/schema (using software) into data structures that may be efficiently accessed by dedicated, custom hardware may provide a high performance solution. Additionally, having stylesheet/schema compilation in hardware may provide, in some embodiments, flexibility to implement different stylesheet/schema languages and/or to implement changes in the language specifications without having to change the custom hardware. For example, XSLT, XPath, and XML schema may be still evolving, and new features may be added to these languages in the future. The compilers may be adapted to handle these new features. The stylesheet/schema to be used may be provided beforehand, and thus the time to compile the stylesheet/schema may be less critical. However, in other embodiments, one or both of the stylesheet compiler 20 and the schema compiler 22 may be implemented in hardware, or a combination of hardware and software.

The network interface circuit 12 may handle the low-level electrical and protocol details on the network connections, and may pass received packets to the processors 14A-14B for processing. Any type of network may be used. For example, in some embodiments, the network connections may be Gigabit Ethernet connections. More than one connection may be provided, as desired, to achieve a given level of bandwidth and/or to provide redundancy in the network connections.

The processors 14A-14B may comprise any type of processor. For example, in one embodiment, the processors 14A-14B may be PowerPC network processors. In other embodiments, the processors 14A-14B may implement other instruction set architectures such as ARM, Intel's IA-32, MIPS, etc.

Any interconnect may be used to couple the processors 14A-14B, the document processor 16, and the memory 18. Furthermore, the processors 14A-14B may be coupled to the document processor 16 separate from the connection of the processors 14A-14B and the document processor 16 to the memory 18. For example, in one implementation, the processors 14A-14B may be coupled to the document processor 16 using one or more peripheral component interconnect express (PCI-X) buses.

It is noted that, in some cases, a DTD, schema, or stylesheet may be embedded in a document (either directly or as a pointer to the schema or stylesheet). In such cases the DTD, schema, or stylesheet may be extracted from the document and processed as described for a separately-provided schema or stylesheet.

The memory 18 may comprise any type of volatile or non-volatile memory. For example, the memory 18 may include one or more of RAM (e.g. SDRAM, RDRAM, SRAM, etc.), non-volatile memory such as Flash memory or battery-backed RAM, magnetic or optical storage such as disk or CD-ROM, etc. The memory 18 may comprise multiple memories that are separately accessible (e.g. a partition or partitions accessible only to the processors 14A-14B and another partition or partitions accessible only to the document processor 16).

FIG. 1 illustrates the stylesheet compiler 20 and the schema compiler 22 stored in the memory 18. Generally, the stylesheet compiler 20 and/or the schema compiler 22 may be encoded on any computer accessible medium. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, volatile or non-volatile memory media such as RAM (e.g. SDRAM, RDRAM, SRAM, etc.), ROM, Flash memory, etc., as well as media accessible via transmission media or signals such as electrical, electromagnetic, or digital signals, conveyed via a communication medium such as a network and/or a wireless link.

In some embodiments, the computer accessible medium may be included in a separate computer system or systems which may execute the stylesheet compiler 20 and/or the schema compiler 22 to perform the compilation. The data structures/code resulting from the compilation may be communicated to the content transformation appliance 10 (e.g. through the network connection to the content transformation appliance 10).

It is noted that, while the description herein may include examples in which a stylesheet is applied to a document, other examples may include applying multiple stylesheets to a document (either concurrently or serially, as desired) and applying a stylesheet to multiple documents (either concurrently with context switching or serially, as desired).

Figure 2:
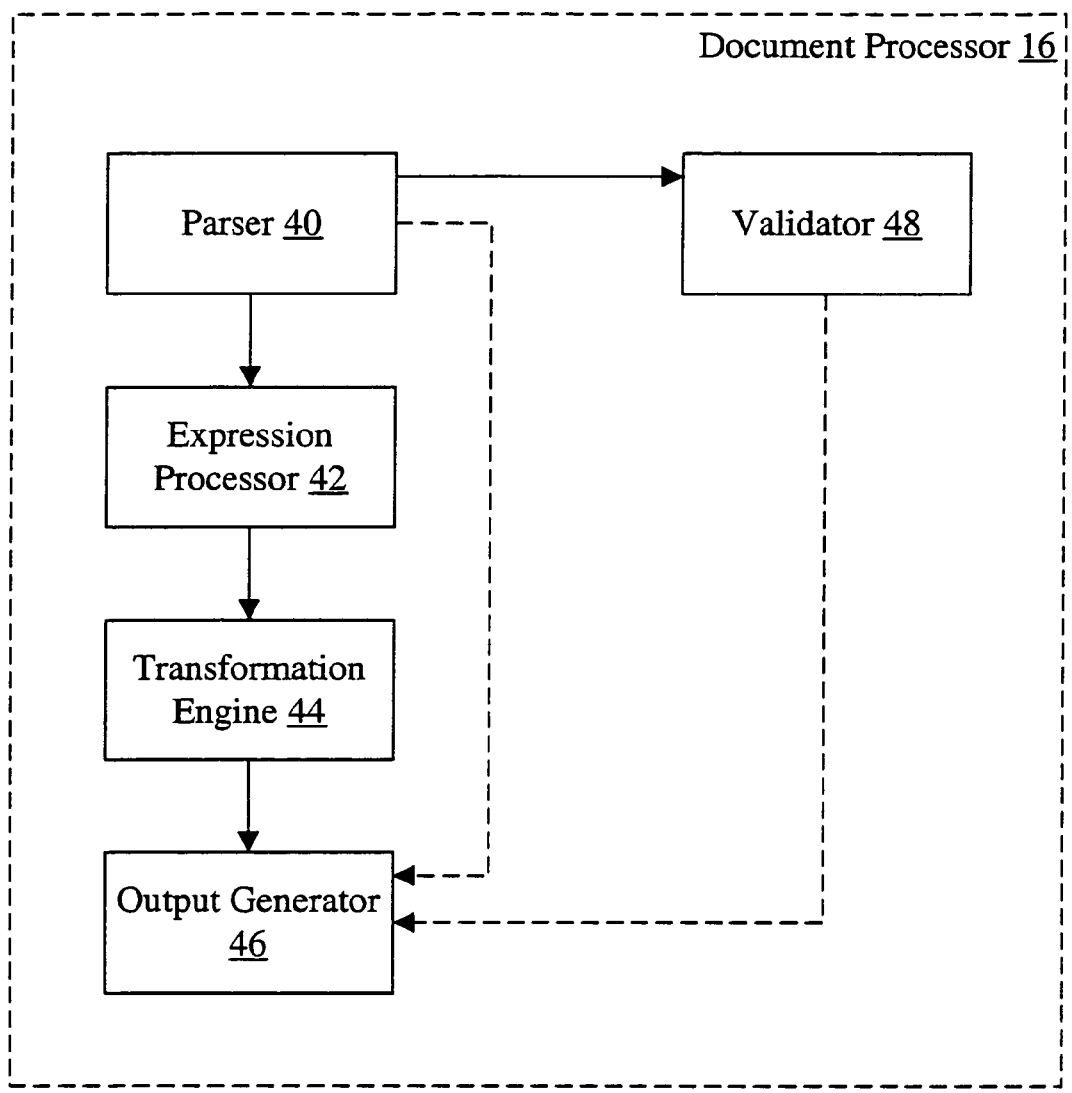
FIG. 2 is a block diagram of one embodiment of a document processor shown in FIG. 1.

Turning next to FIG. 2, a block diagram of one embodiment of the document processor 16 is shown. In the embodiment of FIG. 2, the document processor 16 includes a parser circuit 40, an expression processor 42, a transformation engine 44, an output generator 46, and a validator circuit 48. The parser circuit 40 is coupled to the expression processor 42 and to the output generator 46. The expression processor 42 is coupled to the transformation engine 44, which is coupled to the output generator 46. The validator 48 is coupled to the output generator 46. Units in FIG. 2 may be coupled to each other directly (e.g. using signal lines between the units), may be coupled through the memory 18 (e.g. a source unit may write information to be communicated to a destination unit to the memory 18, and the destination unit may read the information from the memory 18), or both.

The parser circuit 40 may receive a document and parse the document, identifying events for the expression processor 42 and the validator circuit 48, and also generating data structures with the parsed content. If the document processor 16 is to transform the document according to a style sheet, the parsed content may be stored in data structures in memory 18 for the transformation engine 44. Alternatively, if the document is to parsed only, the parser circuit 40 may provide the output generator 46 with the parsed content to be output in SAX or DOM format. The parser circuit 40 may provide the output generator 46 with the parsed content through memory 18 as well.

The expression processor 42 receives events from the parser circuit 40 (identifying document nodes parsed from the document), and compares document nodes identified by the parser circuit 40 against the parse-time expression tree. The expression processor 42 outputs lists of matching document nodes for each expression to the transformation engine 44. The transformation engine 44 receives the data structures of parsed content built by the parser circuit 40 and the lists of matching document nodes, and executes the corresponding instructions from the instruction table 30 to generate the results for the output document. In some embodiments, each instruction may be independent of the others, and thus execution may occur in any order. The output generator 46 may reassemble the results in order and may write the output document to the memory 18 (or may send the output document to the processors 14A-14B without passing through the memory 18). The processors 14A-14B may execute software to read the output document and transmit the output document to the requester.

The validator circuit 48 may also receive the events sent by the parser circuit 40 and may apply the schema/DTD (as represented by the skeleton tree and DTD tables 34), and may determine if the document is valid as indicated in the schema. If the document is valid, the validator circuit 48 may generate a success message to be transmitted to the output generator 46. If the document is not valid, the validator circuit 48 may generate a fail message (indicating the reason(s) for failure) and may transmit the fail message to the output generator 46. The output generator 46 may store the message to the memory 18 (and the processors 14A-14B may subsequently transmit the message to the requestor).

Figure 3:
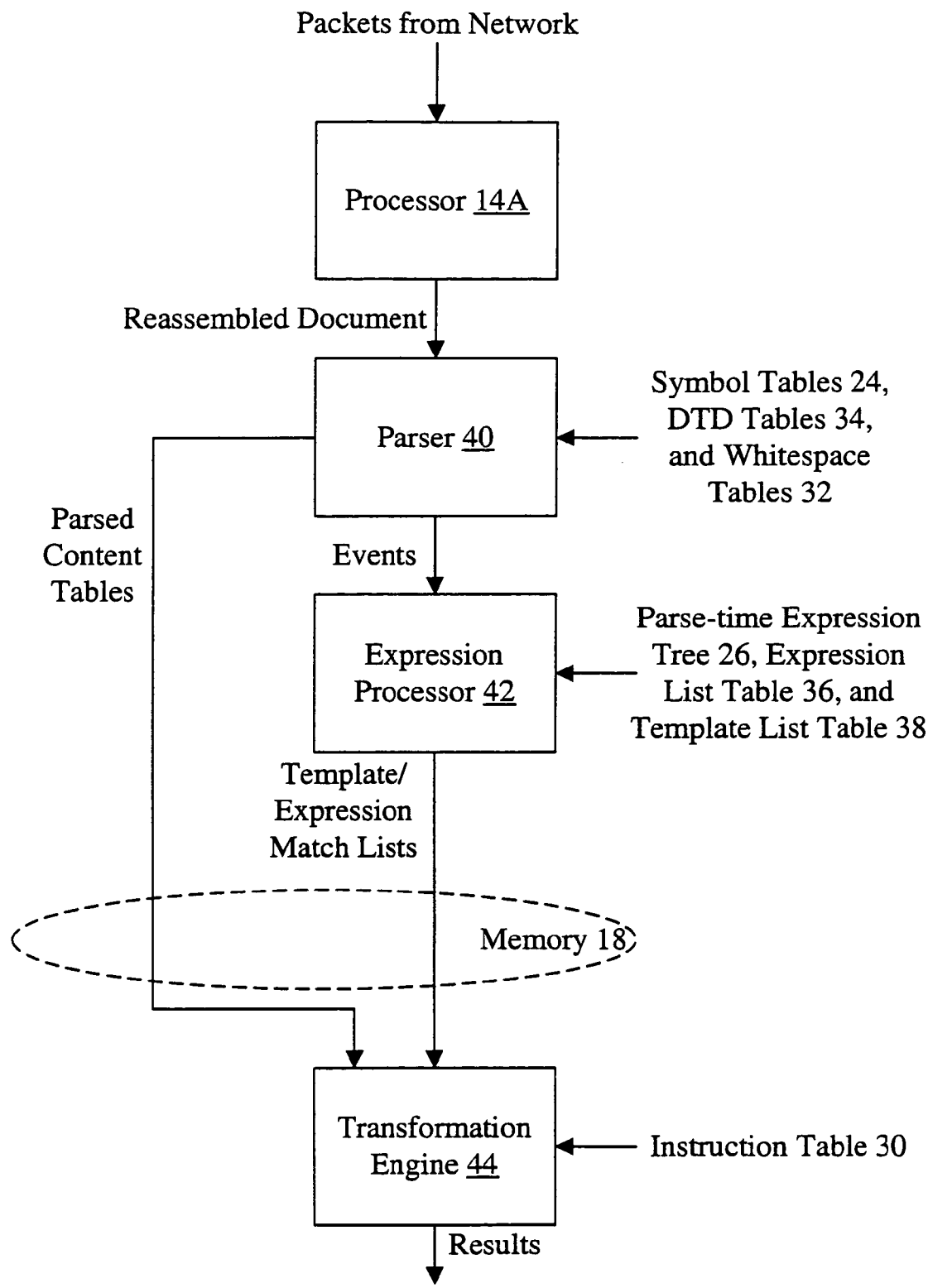
FIG. 3 is a block diagram of one embodiment of a portion of the document processor shown in FIG. 2 and a processor shown in FIG. 1, illustrating communication therebetween and inputs thereto.

Turning now to FIG. 3, a portion of the document processor 16 (specifically, the parser circuit 40, the expression processor 42, and the transformation engine 44) and the processor 14A are shown. FIG. 3 highlights in more detail the communication between the illustrated portions according to one embodiment of the content transformation appliance 10. The processor 14B may also operate in the manner described for the processor 14A.

The processor 14A may receive packets from the network(s) to which the content transformation appliance 10 is coupled. The data payload of the packets may comprise the document to be transformed by the content transformation appliance 10. Additionally, other received packets may include other communications (e.g. the stylesheet or schema, or other communications with the content transformation appliance 10). The processor 14A may reassemble the document and pass the reassembled document to the parser circuit 40.

The parser circuit 40 receives the reassembled document from the processor 14A and also accesses the symbol tables 24, the DTD tables 34, and the whitespace tables 32 from the memory 18. The parser circuit 40 parses the document and generates events related to the detected document nodes. More particularly, the parser circuit 40 converts the node identifiers in the document to the corresponding serial numbers in the symbol tables 24, and transmits the serial numbers as part of the events to the expression processor 42. Additionally, the parser circuit 40 generates parsed content tables storing the parsed content of the document for the transformation engine 44. The expression processor 42 receives the events from the parser 40, and compares the identified document nodes (based on their serial numbers) against the parse-time expression tree 26. Matching document nodes are identified and recorded in template and expression match lists to be sent to the transformation engine 44.

The transformation engine 44 receives the template and expression match lists and the parsed content tables, and also receives the instruction table 30. The transformation engine 44 evaluates any run-time expressions and eliminates document nodes from the template and expression match lists that do not satisfy the run-time expressions. Additionally, the transformation engine 44 executes instructions from the instruction table 30 for each expression on each of the document nodes that matches that expression, and outputs results to the output generator 46.

In the illustrated embodiment, the processor 14A may transmit the reassembled document inline, and the parser circuit may transmit events to the expression processor 42 inline as well. That is, as the portions of the document are received and reassembled by the processor 14A, the processor 14A passes the portion of the document to the parser circuit 40. The parser circuit 40 may thus begin parsing prior to the processor 14A receiving the entirety of the document. Similarly, the events are passed to the expression processor 42 as they are identified. On the other hand, the parsed content tables and template/expression match lists are passed through the memory 18 (indicated by the dotted oval over the communications to the transformation engine 44). As used herein, data is transmitted "inline" from a source to a receiver if the data is passed directly, not buffered in a memory such as the memory 18 (although the source or receiver may queue data temporarily for transfer). Data transmitted inline may experience less latency than transmission through memory.

Figure 4:
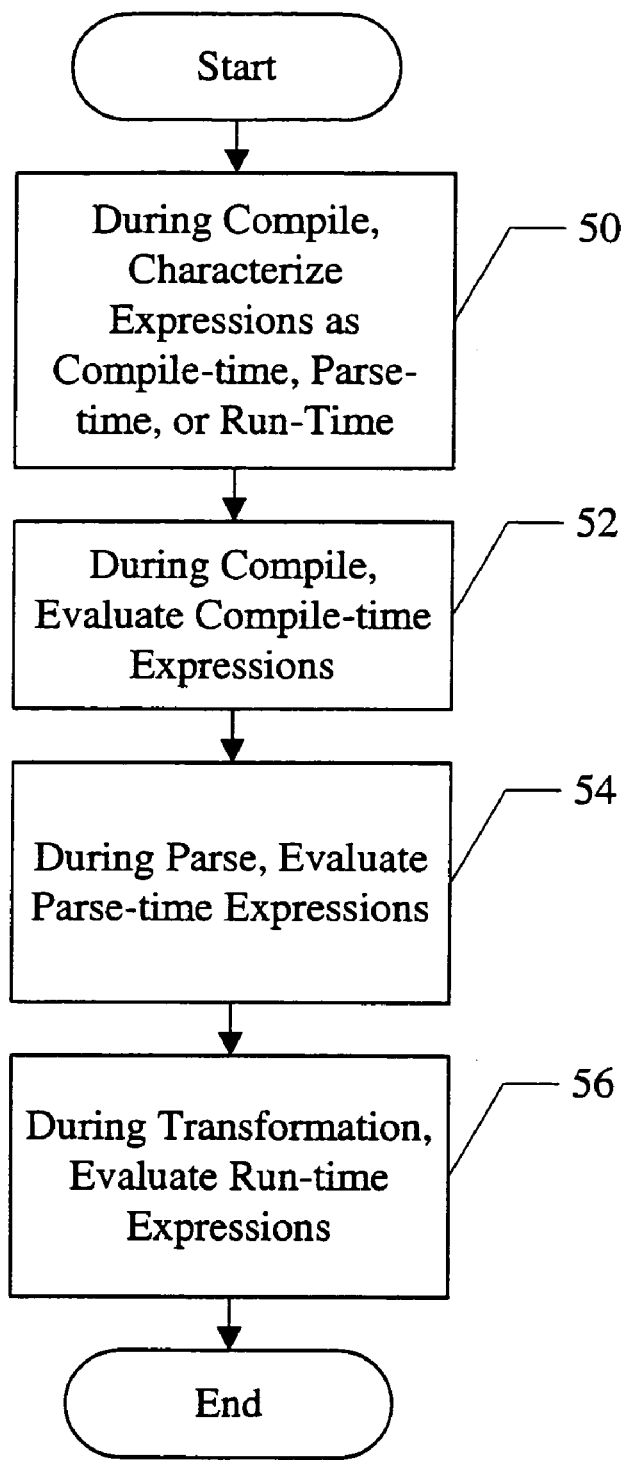
FIG. 4 is a flowchart illustrating one embodiment of a method of stylesheet compilation and expression evaluation.

Turning now to FIG. 4, a flowchart illustrating one embodiment of a method for transforming documents is shown. Generally, the method may be applied where the document transformation includes a plurality of phases. The expressions in the stylesheet may be categorized according to the earliest phase in which they can be evaluated. Then, during each phase, the expressions that can be evaluated in that phase are evaluated. Thus, each expression may be evaluated at the earliest possible phase, leaving fewer expressions to be evaluated in later phases.

In the illustrated embodiment, the phases may include a compile phase, a parse phase, and a transformation phase. In the compile phase, the expressions in the stylesheet are characterized (e.g. as either compile-time, parse-time, or run-time in this embodiment) (block 50). Additionally, in the compile phase, the compile-time expressions are evaluated (block 52). During the parse phase, the parse-time expressions are evaluated (block 54). During the transformation phase, the run-time expressions are evaluated (block 56).

In some embodiments, the run-time expressions may be divided into portions that are evaluatable earlier (e.g. parse-time) and the portions which are run-time. The portions that are evaluatable earlier may be evaluated and grouped according to the run-time portions. That is, the document nodes that match the parse-time portion of the expression and that have the same value(s) used for the run-time portion of the expression are grouped. At run-time, the run-time portion of the expression is evaluated and, if the value corresponding to a group does not satisfy the run-time portion of the expression, the group is eliminated. Only groups which do satisfy the run-time portion of the expression are retained, and the instructions are executed on the document nodes in the retained groups.

In one embodiment implementing XSLT stylesheets, an expression may be compile-time if it includes no ancestor/descendent references (//) and no predicates. An expression may be parse-time if it includes no predicates that refer to the current node, a following sibling node, or an element value. Expressions which are not compile-time or parse-time are run-time expressions (e.g. expressions that refer to the current node or contain predicates that refer to a following sibling or an element value). For run-time expressions that do not refer to the current node, the portions that do not include the predicates mentioned above may be evaluated at parse-time. In this context, the current node may be either a context node, if the expression is a template match expression, or may be nodes referred to in statements within the template body (e.g. loop constructs or other expressions within the template body).

Which expressions are parse-time versus run-time may be, in part, affected by the inline nature of the expression processor 42. That is, document nodes are identified and passed to the expression processor 42 inline. By contrast, if expression processing were not inline, past and future document nodes may possibly be located while processing a particular node. Thus, if expression processing were not inline, only expressions that refer to the current node may not be handled. For inline processing, matching document nodes against the expression trees may generally include retaining information about which expression nodes in the expression tree have been matched with previous document nodes. Then, if a child or descendent of the previous document node is identified by the parser circuit 40, such child/descendent document nodes may be compared to the next levels in the expression tree that are linked to the previously matched expression nodes in the expression tree.

Evaluating a compile-time expression may be applied to expressions in an "apply templates select" statement. As mentioned above, an "apply templates" statement selects a set of nodes in the context of a template body, and applies the templates to the nodes. An "apply templates select" statement includes an expression that selects a set of nodes. The set of nodes are then applied to the templates in the stylesheet. If the expression in the "apply templates select" statement meets the compile-time definition given above, then the compiler may determine which templates (if any) the nodes in the set may match. Thus, the template matching may be eliminated in such cases. In one embodiment, the compiler may perform an algebraic match up between the expressions in the apply templates select statement and the expressions comprising the template match conditions. Evaluating parse-time and run-time expressions may comprise determining which nodes satisfy the expressions.

In one embodiment, the algebraic matching of XPath expressions in the context of XML documents described by an XML schema may be performed as described below. The following definitions may be useful in describing the algebraic matching algorithm for XPath expressions and an XML schema. If P is an XPath expression and S is an XML schema, P may be defined for S if and only if each element and attribute name occurring in P is declared in S and has the same type (element or attribute) in S. If P and Q are two XPath expressions, P may be referred to as matching Q for S if and only if each node in any input document D based on S that satisfies P also satisfies Q. A "simple" expression may be an expression that excludes the "//" operator and the "." operator. Given these definitions, the algebraic matching in one embodiment may be performed as follows for an expression P and a set of one or more simple expressions E. First, the expressions may be normalized. An expression that begins with "/" is in normal form. If an expression Q does not begin with "/", it is normalized as follows: (i) if Q is within the scope of any loops, preprend Q with the select expressions for each loop (separating each select expression and Q by the / operator), with the innermost loop select expression being nearest Q and proceeding to the outermost loop select expression as the beginning of the prepended expression; (ii) prepending the expression formed from (i) with the template match condition of the template in which Q occurs; and (iii) if the template match condition is not "/", prepend the expression formed from (i) and (ii) with "//". An expression tree if the simple expressions E (normalized as described above) may be formed, similar to the parse-time expression tree 26, except that predicates are ignored. Expressions that are identical (with the possible exception of predicates) may thus be mapped to the same path in the expression tree and are associated with the same leaf node in the expression tree. P is matched against the expression tree (that is, a match occurs if each node identifier or operator in P matches the expression tree in the same position). If a leaf node is reached in the expression tree at the same time that P is exhausted, the expressions associated with that leaf node are the expressions in E that match P. These matching expressions may be compile-time expressions that may be eliminated.

Figure 5:
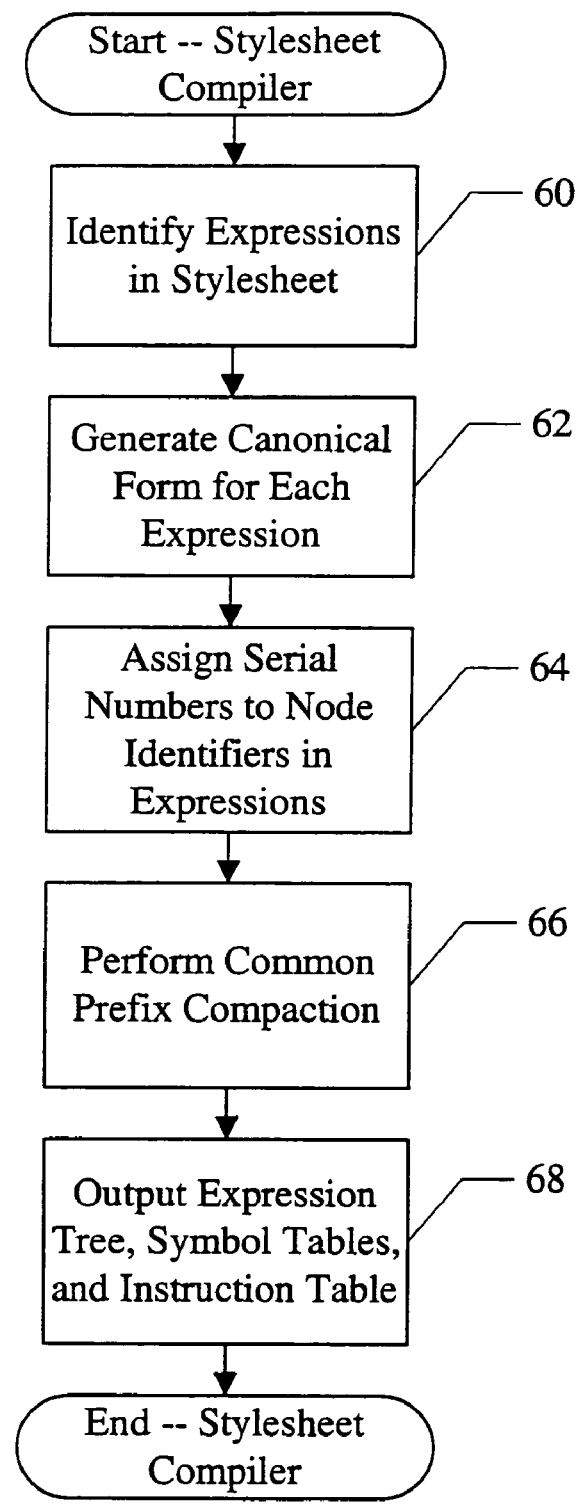
FIG. 5 is a flowchart illustrating operation of one embodiment of a stylesheet compiler.

Turning now to FIG. 5, a flowchart illustrating one embodiment of the stylesheet compiler 20 is shown. In embodiments in which the stylesheet compiler 20 is implemented in software, the stylesheet compiler 20 comprises instructions which, when executed, implement the functions shown in FIG. 5. It is noted that, while the blocks in FIG. 5 illustrate the function of the stylesheet compiler 20, the flowchart is not intended to imply that the compiler performs the functions in the order listed, nor that one function is executed to completion on the stylesheet as a whole before commencing the next function.

The stylesheet compiler 20 identifies expressions in the stylesheet (block 60), and categorizes the expressions as compile-time, parse-time, or run-time. The expressions may be in the template match statements, in apply templates statements, and in various other statements in the stylesheet. The stylesheet compiler 20 generates the canonical form of each expression (block 62). In general, there may be many different ways to represent a given expression, even though the different ways are logically equivalent. The canonical form specifies a particular way to represent a given expression, to simplify the process of identifying equivalent expressions (or parts of expressions that are equivalent). The stylesheet compiler 20 assigns serial numbers to node identifiers in the expressions (block 64).

The stylesheet compiler 20 may perform common prefix compaction on the expressions to build the parse-time expression tree (block 66). As mentioned above, expressions may generally include a hierarchical list of node identifiers that are to be matched to node identifiers in the document. Thus, various expressions may have portions in common (particularly, expression nodes that are higher in the hierarchy (that is closer to the root), may be the same for various expressions). The portions that are common may thus be in the first part of the expressions (the "prefix" of the expressions). By compacting such expressions together in the parse-time expression tree, the common portion may be represented once in the parse-time expression tree and, once expressions begin to differ, the remainder of the expressions become children of the common portion. Accordingly, multiple expressions that may match a document node may be evaluated in parallel, in the common portion of the parse-time expression tree, and may diverge in the tree when differences occur. The parse-time expression tree may be more compact, and may be processed more rapidly, in such cases.

For example, two expressions (after serial numbers are assigned) may be /10/15/20/25 and /10/15/20/30/35. These two expressions have /10/15/20/ in common. Accordingly, these two expressions may be expressed in the parse-time expression tree as a common portion comprising a node 10 with a node 15 as a child, and the node 15 having the node 20 as a child. The node 20 may have two children (25 and 30). The node 30 may have the node 35 as a child. As document nodes are parsed and passed to the expression processor 42, the expressions may be evaluated against the document nodes in parallel until the node 20 is reached. The next child document node may then match against zero or one of the expression nodes 25 or 30.

As mentioned previously, the stylesheet compiler 20 may divide run-time expressions into portions that may be evaluated at parse-time and portions that are evaluated at run time. The parse-time portions may be included in the parse-time expression tree. At each level in the parse-time expression tree where a run-time predicate occurs, the stylesheet compiler 20 may note that the matching nodes are to be grouped (and the information used by the run-time predicate may be retained) so that the predicate can be evaluated at run-time and the matching document nodes may be either retained or discarded dependent on whether they satisfy the run-time predicate. A given run-time expression may include more than one run-time predicate at various levels in the expression, and thus multiple levels of grouping may occur. At each grouping level, document nodes having the same value corresponding to the run-time predicate are grouped together. When the run-time predicate is evaluated, if the value does not match the run-time predicate, the group (and any subgroups of that group) of document nodes are discarded. Groups for which the value matches the evaluated run-time predicate are retained and processed by the transformation engine 44.

The stylesheet compiler 20 may output several data structures used by the parser circuit 40 and/or the expression processor 42 to the memory 18 (block 68). The parse-time expression tree may be output, as well as one or more symbol tables 24 which map node identifiers to serial numbers. For example, in one embodiment, separate symbol tables may be output for element names and for attribute names. In other embodiments, a single symbol table may be output. Additionally, the stylesheet compiler 20 may output an instruction table 30 having a set of instructions for each template, which the transformation engine 44 may execute to effect the template body. The stylesheet 20 may further output instructions for each run-time predicate which, when executed in the transformation engine, evaluate the run-time predicate. Still further, the stylesheet compiler 20 may output the template list table 38 and expression list table 36 as described below.

In some embodiments, a given stylesheet may include one or more other stylesheets and/or import one or more other stylesheets. An included stylesheet is treated as if the included stylesheet is physically moved into the including stylesheet (e.g. similar to the treatment of a #include statement in the C language). That is, the body of the included stylesheet may essentially replace the include statement in the including stylesheet. If there are conflicts between the included stylesheet and the including stylesheet (e.g. global variable declarations), the definition in the including stylesheet as used. In XSLT stylesheets, an included stylesheet may be set forth in an xsl:include element in the including stylesheet. On the other hand, an imported stylesheet is treated as a separate stylesheet that may be explicitly referenced by a statement in the including stylesheet. The explicit reference may occur, e.g., in a template match statement (in which case a template from the imported stylesheet is used). If the explicit reference is elsewhere in the importing stylesheet, then a matching template in the importing stylesheet takes precedence over a matching template in the imported stylesheet. If there are multiple imported stylesheets and a matching template occurs in more than one imported stylesheet, the order in which the imported stylesheets are listed in the importing stylesheets controls which matching template is selected (e.g. the first-listed imported stylesheet having a match is used). In an XSLT stylesheet, an imported stylesheet may be set forth by in an xsl:import element.

A "main" (importing or including) stylesheet and each imported or included stylesheet may be compiled independently by the stylesheet compiler 20. In the case of an included stylesheet, the data structures for the main stylesheet and the included stylesheet may be merged into one set of data structures used by the expression processor 42. In the case of an imported stylesheet, the data structures may remain separate and the expression processor 42 may apply the data structures to a document concurrently. Such an embodiment may be similar to the embodiment of the expression processor 42, except that conflicts in matching expressions may be handled with conflict resolution logic implementing the conflict resolution described above.

In some embodiments, a stylesheet may include statements that refer to one or more documents other than the document to which the stylesheet is being applied. The stylesheet may further include statements to process the referenced documents. In one implementation, the stylesheet compiler 20 may identify which referenced documents are used unconditionally (that is, in each case that the stylesheet is applied to any document, the referenced documents may be used). The content transformation appliance 10 may fetch the unconditionally referenced documents when processing of an input document is started, and the unconditionally referenced documents may be parsed in the order they are referenced in the stylesheet. If the transformation engine 44 is to execute an instruction that uses a referenced document, and that referenced document's parsing has not yet been started, the transformation engine 44 may context switch to a different task. For conditionally referenced documents, the content transformation appliance 10 may fetch the document in response to the transformation engine 44 attempting to execute an instruction that uses the document, and the document may be parsed at that time as above for the unconditionally referenced documents. In other implementations, the content transformation appliance 10 may fetch all referenced documents corresponding to a stylesheet when that stylesheet is invoked on an input document or may fetch each referenced document in response to the transformation engine 44 attempting to execute an instruction that uses that referenced document.

Figure 6:
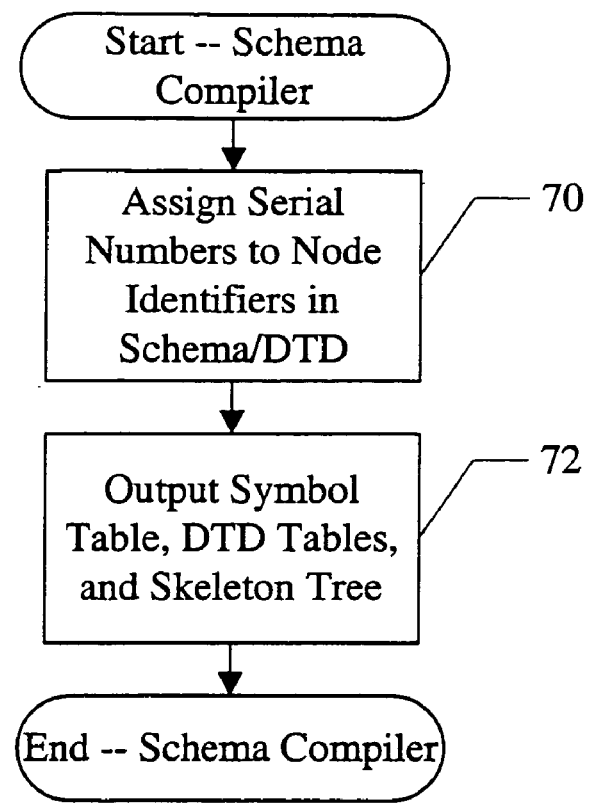
FIG. 6 is a flowchart illustrating operation of one embodiment of a schema compiler.

FIG. 6 is a flowchart illustrating one embodiment of the schema compiler 22. In embodiments in which the schema compiler 22 is implemented in software, the schema compiler 22 comprises instructions which, when executed, implement the functions shown in FIG. 6. It is noted that, while the blocks in FIG. 6 illustrate the function of the schema compiler 22, the flowchart is not intended to imply that the compiler performs the functions in the order listed, nor that one function is executed to completion on the stylesheet as a whole before commencing the next function.

Similar to the stylesheet compiler 20, the schema compiler 22 may assign serial numbers to the node identifiers in the schema (or DTD) (block 70). The serial numbers assigned to a given node identifier by the stylesheet compiler 20 may not be the same as the serial numbers assigned by the schema compiler.

The schema compiler 22 may generate a number of tables for use by the parser circuit 40. For example, entity references may be included in a document, and the schema/DTD may define the value of the entities. A DTD entity reference table may be created to map entity references to corresponding values. Additionally, a schema/DTD may specify default values for attributes if a given element that could include the attribute does not include the attribute. A DTD default attribute list may be created to record the attributes and defaults. Additionally, a skeleton tree may be created which identifies the permissible and required document structure, to be used by the validator to determine if a document is valid (as defined in the schema/DTD). The schema compiler 22 outputs the symbol table, DTD tables, and skeleton tree to the memory 18 (block 72).

Figure 7:
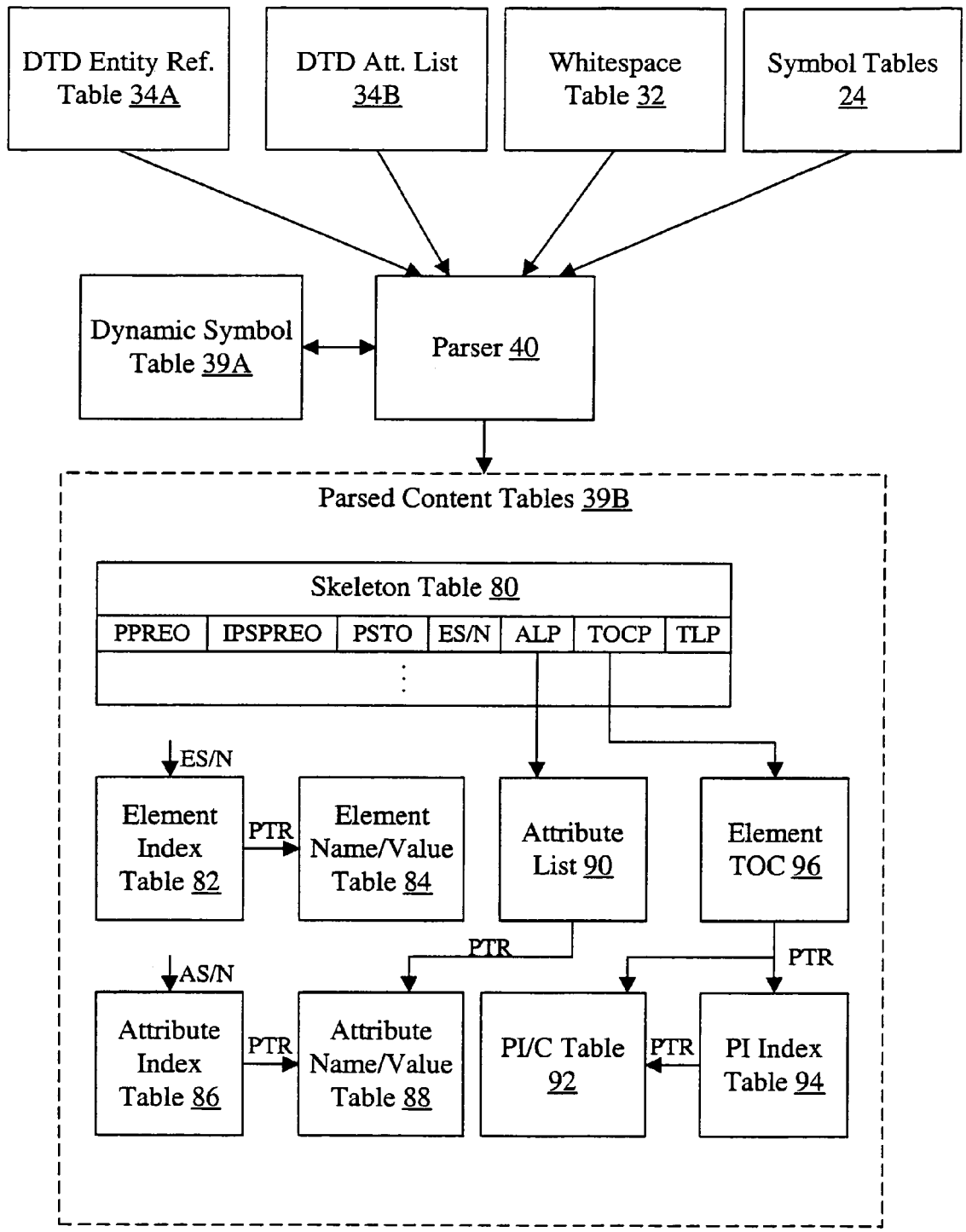
FIG. 7 is a block diagram illustrating one embodiment of input data structures and output data structures for one embodiment of the parser shown in FIGS. 2 and 3.

Turning now to FIG. 7, a block diagram illustrating the parser circuit 40, input data structures, and output data structures for one embodiment of the parser circuit 40 are shown. In the illustrated embodiment, input data structures used by the parser circuit 40 may include a DTD entity reference table 34A and a DTD attribute list 34B (which may be portions of the DTD tables 34), the whitespace table 32, and the symbol tables 24. The parser 40 may create and use a dynamic symbol table 39A (part of the document processor structures 39) and a set of parsed content tables 39B (part of the document processor structures 39). More particularly, in the illustrated embodiment, the parsed content tables 39B may include a skeleton table 80, an element index table 82, an element name/value table 84, an attribute index table 86, an attribute name/value table 88, an attribute list 90, a processing instruction/comment (PI/C) table 92, a PI index table 94, and an element table of contents (TOC) 96. The parsed content tables 39B may be used for document transformation in the transformation engine 44. In some embodiments, the parser circuit 40 may also be configured to output parsed content in SAX or DOM formats for parse-only requests.

The parser circuit 40 may be configured to parse a document as it is received from the processor 14A (not shown in FIG. 7) to generate the parsed content tables 39B. Generally, the parsed content tables 39B may comprise tables for various types of document content, with pointers linking the information to various nodes. More detail regarding the parsed content tables 39B as shown in FIG. 7 is provided below. Additionally, the parser circuit 40 may: (i) generate preorder and postorder numbers for each node in the document; (ii) replace entity references with the entity value from the DTD/schema; (iii) replace predefined entity references (as described in the XML specification) with the corresponding characters; (iv) add default attributes and/or attribute values from the DTD/schema; (v) replace CDATA sections with characters; (vi) strip or preserve whitespace as directed by the stylesheet and normalize whitespace; and (vii) identify embedded DTD/stylesheets or embedded references to DTD/stylesheets.

To replace entity references with entity values, the parser 40 may use the DTD entity reference table 34A. If an entity reference is encountered in the document, the parser circuit 40 may lookup the entity reference in the DTD entity reference table 34A and read the corresponding entity value from the DTD entity reference table 34A. The entity value replaces the entity reference in the parsed content output by the parser circuit 40 for the document. In one embodiment, the DTD entity reference table 34A may contain an initial section having a plurality of entries, where each entry stores a hashed entity reference (e.g. a cyclical redundancy code (CRC)-16 hash) and a pointer into a second section of the DTD entity reference table 34A where the character string comprising the entity value is stored. The parser circuit 40 may hash the entity reference detected in the document and compare the hash to the hash values in the initial section of the DTD entity reference table 34A to locate the matching entity value in the second section.

To add default attributes or attribute values to the document, the parser circuit 40 may use the DTD attribute list 34B. The DTD attribute list 34B may contain default attributes and/or attribute values for various element names, and the parser circuit 40 may look up element names detected in element start tags within the document to determine if any default attributes or attribute values are included for the element. If defaults are included, the parser 40 may track attributes included in the element start tag until the element close is detected. If an attribute and/or attribute value in the DTD attribute list 34B is not included in the element, the parser circuit 40 may insert the attribute/attribute value form the DTD attribute list 34B. In one embodiment, the DTD attribute list 34B may have an initial section comprising hashed element names (e.g. a CRC-16 hash) and pointers into a second section of the DTD attribute list 34B. The second section may include hashed attribute names (e.g. a CRC-16 hash) and pointers into a third section of the DTD attribute list 34B where the default attribute name/value is stored as a character string. The parser circuit 40 may hash an element name, lookup the hash in the initial section, and read the hashed attribute names and pointers from the second section if a match is found in the first portion. As each attribute name is detected, the parser circuit 40 may hash the attribute names and compare them to the hashed attribute names from the DTD attribute list 34B. When the element close is detected, any hashed attribute names not detected by the parser circuit 40 in the document may be attributes for which a default is needed, and the defaults may be read from the third section of the DTD attribute list 34B and inserted into the parsed content tables 39B.

The whitespace table 32 may indicate which element names are to have whitespace stripped as specified in the stylesheet. In one embodiment, each element name for which whitespace is to be stripped may be hashed (e.g. a CRC-16 hash algorithm) and the hash value stored in the table. When the parser circuit 40 detects an element name in the document, the parser circuit 40 may hash the element name and look it up in the whitespace table 32. If a match is found, the parser circuit 40 may strip whitespace from the element. Otherwise, the parser circuit 40 may preserve the whitespace in the element.

Figure 8:
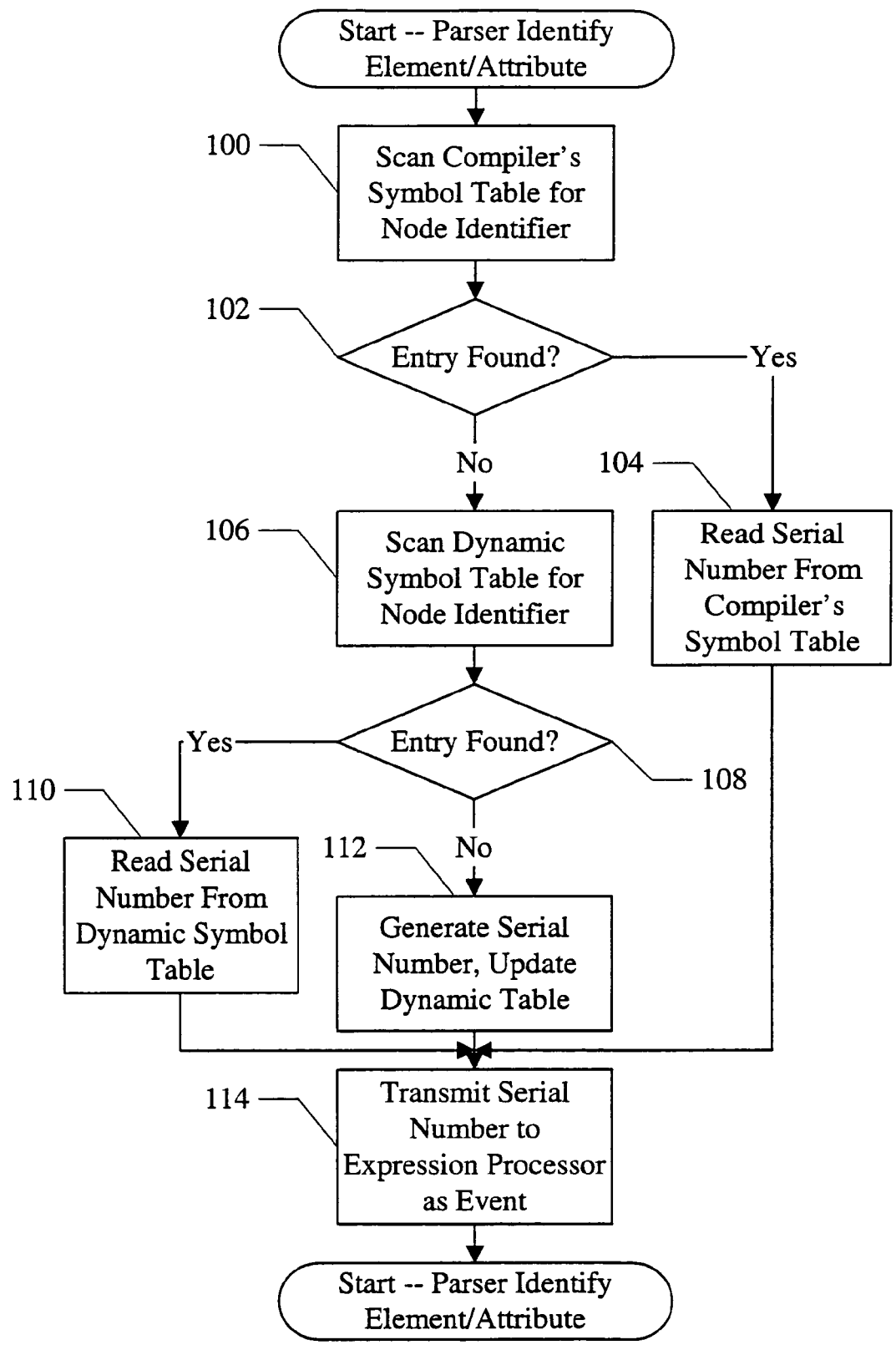
FIG. 8 is a flowchart illustrating operation of one embodiment of the parser shown in FIG. 7 for assigning serial numbers to node identifiers.

As mentioned above, the symbol tables 24 may map node identifiers to serial numbers assigned by the stylesheet compiler. The parser circuit 40 may use the symbol tables 24 to convert element or attribute names (qualified by namespace prefixes, if namespaces are used) in the document to serial numbers to pass to the expression processor 42. However, it is possible that the document may contain elements or attributes that are not represented in the stylesheet. In such cases, the parser circuit 40 may assign a serial number and store the serial number in the dynamic symbol table 39A. The flowchart of FIG. 8 illustrates one embodiment of the operation of the parser circuit 40 when detecting an element or attribute in a document.

The parser circuit 40 may scan the compiler's symbol tables 24 for the node identifier (e.g. the element/attribute name, optionally prefixed with a namespace prefix) (block 100). If an entry is found (decision block 102, "yes" leg), the parser circuit 40 may read the serial number from the compiler's symbol table 24 (block 104). If an entry is not found (decision block 102, "no" leg), the parser circuit 40 may scan the dynamic symbol table 39A for the node identifier (block 106). If an entry is found (decision block 108, "yes" leg), the parser circuit 40 may read the serial number from the dynamic symbol table (block 110). If an entry is not found (decision block 108, "no" leg), the parser circuit 40 may generate a unique serial number (a serial number not already recorded in either the compiler's symbol tables 24 nor the dynamic symbol table 39A) and may update the dynamic symbol table 39A with the generated serial number and node identifier (block 112). In any case, the parser circuit 40 may transmit the serial number in an event to the expression processor 42 (block 114).

It is noted that an element often has several children (elements or attributes) that have the same name (e.g. multiple instances of the same subelement or attribute). Thus, when a node identifier has been detected in the input, it is possible that the next node identifier is the same (or that the node identifier will recur within the next few names detected). In some embodiments, the parser circuit 42 may retain one or more of the most recently detected names and corresponding serial number, and may compare a newly-detected node identifier to these names before searching the symbol tables 24 and the dynamic symbol table 39A.

In some embodiments, an optimization may be applied for nodes that do not match in the compiler's symbol tables 24. Since the compiler assigns serial numbers to each node identifier in the stylesheet, a node that does not match the compiler's symbol tables 24 is known not to match any nodes in the parse-time expression tree 36. The parser circuit 40 may include an indication in each event of whether or not the serial number is from the compiler's symbol tables 24 or from the dynamic symbol table 39A. If the serial number is not from the compiler's symbol tables 24, the expression processor 42 may not compare the event to the parse-time expression tree 36. The expression processor 42 may make note of the event for other purposes (e.g. any "/" expression node children may not be matched by subsequent events, for some event types).

In one embodiment, there may be several events that the parser circuit 40 may generate and transmit to the expression processor 42 with the serial number (and preorder number in some embodiments). An element start event may be generated if an element start tag is detected, and the serial number may be the serial number corresponding to the element name. An element end event may be generated if an element end tag is detected, and the serial number may be the serial number corresponding to the element name. An attribute name event may be generated if an attribute name is detected in an element start tag, and the serial number may be the serial number of the attribute name. An element close event may be generated when the end of the element start tag is detected, and the serial number may be the serial number of the element. A configuration event may also be generated to establish the desired stylesheet/document context for the expression processor 42.

In one embodiment, the symbol tables 24 may be arranged as a tree of individual characters. Each entry in the table may include a character, a leaf node indication, an end of level indication, and either a pointer to the first child of the entry or the serial number if the entry is the last letter of a node identifier. Beginning at the top of the table, each unique first character of a name or names is provided in an entry, the entry is indicated as a non-leaf node, and the pointer is set to the first entry storing the next character of the name. Grouped in a series of entries at the pointer is each unique second character of a name having the first character, with pointers to the first child (third character), etc. When the last character of a given name is reached, the leaf node indication indicates that the entry is a leaf and the pointer field is the serial number. When the last unique character in a level is reached, the end of the series is indicated by the end of level indication. Similarly, the end of the first level of entries (for the first characters of names) may be marked using the end of level indication. Thus, scanning the symbol tables 24 may comprise comparing, character by character down the tree, the detected name with the characters in the symbol tables 24.

In one embodiment, the dynamic symbol table 39A may be organized slightly differently. Names are stored in "bins" based on the first character in the name. Each possible first character of a name may be used as an offset into the dynamic symbol table 39A. Each entry at these offsets may include a bin pointer and a "last entry in the bin" pointer. At the bin pointer is a character string comprising the rest of a name (that is, characters 2 through the end of the name), the serial ID, and a pointer to the next bin entry (that is, the bin entries may be a linked list). The detected name may be compared to the string in the bin entry and, if a match is detected, the serial ID may be used. Otherwise, the pointer to the next bin entry is used to read the next bin entry. If the end of the bin is reached without detecting a match, then a new entry is added for the name in the bin (and a serial number is assigned). In one specific implementation, each bin entry may comprise one or more subentries configured to store a plurality of characters (e.g. 2) and a code defining either that all the characters are valid or locating the end of string character within the plurality of characters. The "last entry in the bin" pointer may point to the last entry in the bin, and may be used to update the next bin pointer when a new entry is added.

The parsed content tables 39B are now described in further detail for one embodiment. The parser circuit 40 identifies the document structure/content, and writes document content to various data structures in the parsed content tables 39B based on the detected structure/content. For example, the parser circuit 40 may store detected element names (and corresponding element values/text nodes) in the element name/value table 84 and may store detected attribute names (and corresponding values) in the attribute name/value table 88 as character strings. Corresponding index tables 82 and 86 may store pointers to the beginning of corresponding character strings in the tables 84 and 88, respectively. The index tables 82 and 86 are addressed using the serial number of the element (ES/N in FIG. 7) or attribute (AS/N in FIG. 7) respectively.

The processing instruction/comment (P/C) table 92 stores character strings corresponding to processing instructions and comments. Comments may be stored as a character string located by a pointer stored in the element TOC 96. Processing instructions may include two string values: a processing instruction target portion (the expanded name) and processing instruction value portion (the remainder of the processing instruction from the document). Processing instruction targets and processing instruction values may be located with a pair of pointers from an entry in the PI index table 94, which is indexed by a pointer from the element TOC 96. The PI index table 94 entries may include the pair of pointers and the serial number assigned to the processing instruction.

The parser circuit 40 may also generate an attribute list 90 for each element in the document. The attribute list 90 may be a list of attributes (by serial number) that correspond to that element, with pointers to the attribute name and attribute value (if any) in the attribute name/value table 88. Additionally, the parser circuit 40 may generate the element TOC 96 for each element. The element TOC 96 identifies child nodes of the corresponding element (e.g. child elements, text nodes, comment nodes, and processing instruction nodes). Each entry in the element TOC 96 may include a node position (identifying the position of the child element as compared to other child elements within the node), a node type (identifying the child node as element, text, comment, or processing instruction), a field that is either a node content pointer (for comment, processing instruction, or text nodes)

or a preorder number of the child (for an element node). The node content pointer is a pointer into the PI/C table 92 for a comment node, a pointer into the PI index table 94 for a processing instruction node, or a pointer into the element name/value table 84 for a text node. In one embodiment, the element TOC 96 may be a linked-list of entries and thus each entry my further include a pointer to the next entry in the list.

The skeleton table 80 may include an entry for each element node in the document, and may be indexed by the preorder number of the element node. In the illustrated embodiment, any entry of the skeleton table includes the preorder number of the parent node (PPREO), the preorder number of the immediate previous sibling for the element node (IPSPREO), the postorder number of the element node (PSTO), which may also indicate the last preorder number in the subtree that is a descendent of the element node), the element serial number (ES/N), an attribute list pointer (ALP) to the attribute list 90 for the element node, a table of contents pointer (TOCP) to the element TOC 96 for the element node, and a template list pointer (TLP) that points to an entry in the template list table 38 at which matching templates for the element node are listed (if any).

It is noted that, various data structures described above include character strings. In one embodiment, the string length (e.g. number of characters) may be stored as the first "character" of the string, and the parser circuit 40 may use the string length to determine how many characters to read.

The above example of the parser circuit 40 and its output data structures may be used for XML documents. In one embodiment, the parser circuit 40 includes hardware circuitry designed to parse XML documents. In some embodiments, the parser circuit 40 may also include hardware circuitry designed to parse relational database structures (such as SQL, Oracle, etc.). The parser circuit 40 may output the parsed relational database structure in a data structure similar to that shown in FIG. 7, and thus the expression processor 42 and the transformation engine 44 need not know whether the input is XML or relational database.

In some embodiments, the parser circuit 40 may be programmable to parse other types of documents. The parser circuit 40 may be programmable with one or more input type descriptors. An input type descriptor may, for example, describe the structure delimiters in the document; indicate whether the document is hierarchical or tabular in nature; indicate whether or not hierarchical documents have explicit endings to each level of structure; defining how to detect the end of a structure if the ending is not explicit; defining internal structure within a given structural unit, if any.

In some embodiments, a preparser circuit may also be included which filters the document supplied by the CPUs 14A-14B to generate a filtered document to the parser circuit 40. That is, the parser circuit 40 may receive only a portion of the document that passes through the filter, and the parser circuit 40 may treat the received portion as the entirety of the document to be parsed. The preparser may be used, e.g., if a relatively large input document is provided but only a subset of the document is of interest. The preparser may be programmed to filter the document in any desired fashion (e.g. to skip a certain number of characters from the beginning of the document and then to capture a number of characters, or up to the end of the document; to filter up to a certain element, or number of elements, before capturing document content; and/or more complicated expressions (e.g. XPath expressions) identifying the portions of the document to be captured), etc. The preparser may be programmed by a user, by the stylesheet compiler 20 if a stylesheet has the effect of discarding document content, etc.

Figure 9:
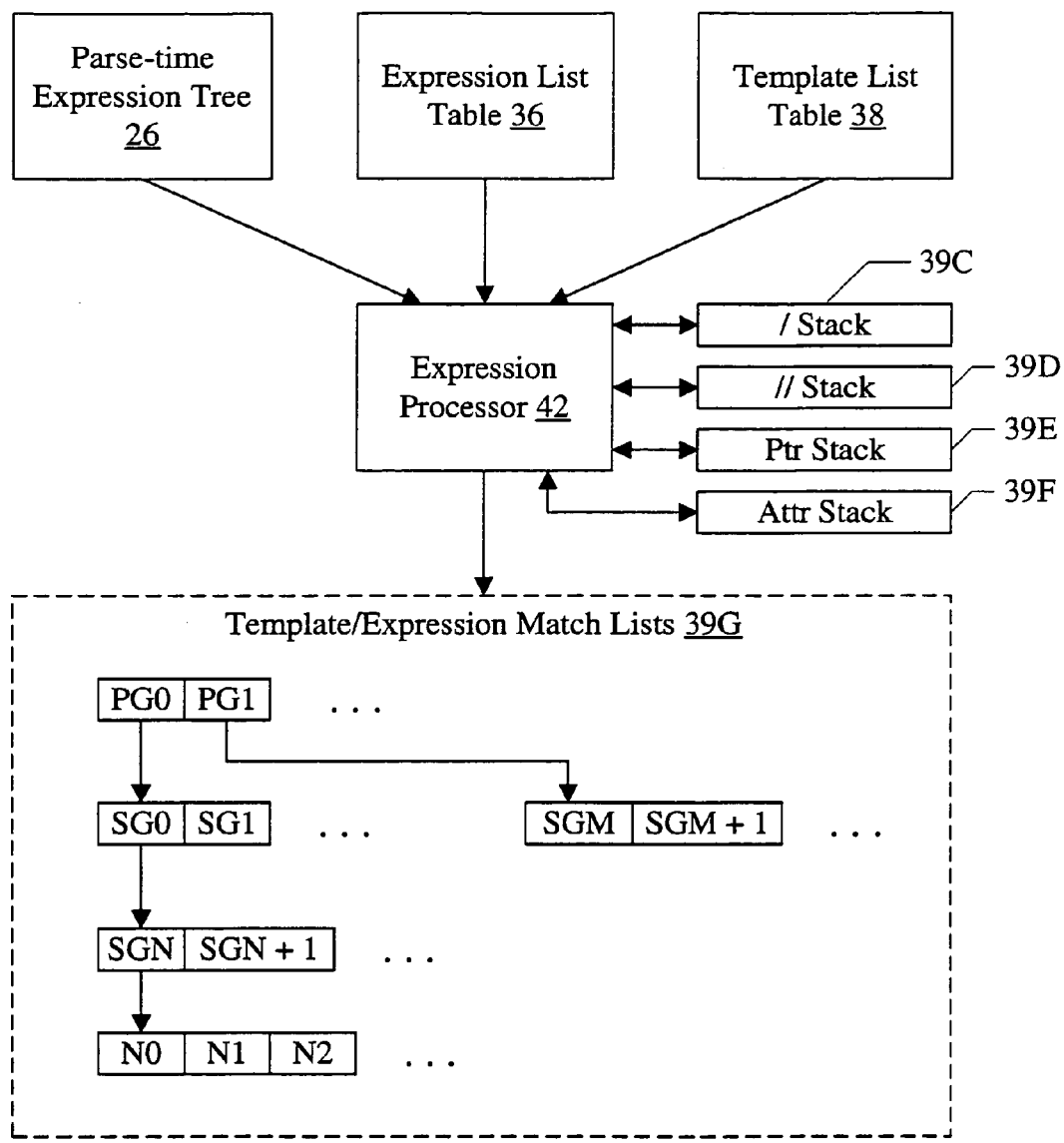
FIG. 9 is a block diagram illustrating one embodiment of input data structures and output data structures for one embodiment of the expression processor shown in FIGS. 2 and 3.

Turning next to FIG. 9, a block diagram illustrating the expression processor 42, input data structures, and output data structures for one embodiment of the expression processor 42 are shown. In the illustrated embodiment, input data structures used by the expression processor 42 include the parse-time expression tree 26, the expression list table 36, and the template list table 38. The expression processor 42 may also generate and use several document processor structures 39 (particularly a / stack 39C, a // stack 39D, a pointer (Ptr) stack 39E, and an attribute (Attr) stack 39F). The expression processor 42 may output template/expression match lists 39G to the transformation engine 44.

Generally, the expression processor 42 receives events from the parser circuit 40 and matches the document nodes identified therein to expression nodes in the parse-time expression tree 26. The document nodes are received as they are parsed, inline. Thus, at any given point in time, the previously received document nodes may have matched portions of the parse-time expression tree but a leaf of the tree (where the entire expression has been matched to a set of document nodes provided by the parser circuit 40) has not yet been reached. The expression processor 42 may use the stacks 39C-39F to store the portion of the parse-time expression tree 26 that has been matched against previous document nodes, effectively retaining the position in the parse-time expression tree 26 to which the next document node may be compared.

The illustrated embodiment may be used for XPath expressions, where the operators between nodes may include the parent/child operator ("/") and the descendent/ancestor operator ("//"). Thus, a given expression node may have one or more / children and one or more // children. If the given expression node has a / child and matches a document node, the given expression node may be pushed onto the / stack 39C. Similarly, if the given expression node has a // child and matches a document node, the given expression node may be pushed onto the // stack 39D. If a document node is an attribute, the attribute may be stored on the Attr stack 39F. In some embodiments, the top of stack pointers are saved at the start of processing an event, so that the state of the stacks prior to processing the event may be recovered. The Ptr stack 39E may be used to store the pointers.

In embodiments in which expressions having run-time portions are partially evaluated in the expression processor 42, information regarding the run-time portions may be retained in the match lists 39G so that the run-time evaluation may be performed and the document nodes in the match lists 39G that do not satisfy the run-time portion of the expression may be discarded. Thus, the match lists 39G may be grouped at each portion of the expression that has a run-time evaluation. Each document node that has the same value used by the run-time portion may be included in a given group.

As illustrated in FIG. 9, the match lists 39G may comprise a hierarchical array of groups of document nodes that form the node set for an expression. There may be such a structure for each expression in the parse-time expression tree (that is, the structure shown in FIG. 9 may correspond to one expression). The primary group (e.g. PG0 and PG1 in FIG. 9) may correspond to the a top level node in the parse-time expression tree, and there may be different primary groups for each different document node that matches the top level node and that either itself is a member of the node set or that has a descendent that is a member of the node set. Each subgrouping level may corresponding to a run-time evaluation (e.g. a run-time predicate, in an embodiment). The values used for the run-time predicate may be retained as well as a pointer to the next level of grouping (or to the node list itself). When a match for an expression occurs, the node is placed in the group based on its values of the subgrouping levels. That is, at a given level, the node is either included in the subgroup for which its value matches the subgroup or a new subgroup is created for the node. In the illustrated example, the first level of subgroups (corresponding to a first run-time predicate) includes subgroups 0 and 1 (SG0 and SG1) from the primary group 0 (PG0). Similarly, the primary group 1 (PG1) includes subgroups SGM and SGM+1 corresponding to the first run-time predicate. A second run-time predicate corresponds to a second level of subgroups, including SGN and SGN+1 as subgroups of the subgroup SG0. In this example, there are two run-time predicates in the expression and thus the subgroups SGN and SGN+1 each point to lists of potentially matching document nodes (e.g. nodes N0, N1, and N2 in the illustrated example). In one embodiment, the document nodes may be represented in the match lists 39G by their preorder number as assigned by the parser 40.

Using the hierarchical structure, the transformation engine 44 may select a primary group, evaluate the first run-time predicate and compare the first run-time predicate to each subgroup of the primary group (discarding any subgroups that do not satisfy the first run-time predicate). The transformation engine 44 may evaluate the second run-time predicate and compare the second run-time predicate to each subgroup of the first level subgroups that were not discarded and discard subgroups that do not satisfy the second run-time predicate, etc. The nodes remaining in the structure after each run-time predicate is evaluated is the node set that satisfies the corresponding expression. The transformation engine 44 may lookup the instructions in the instruction table 30 that correspond to the expression, and execute those instructions on each of the nodes in the node set.

In one embodiment, if a first expression in the parse-time expression tree 26 is a suffix of a second expression (that is, the second expression includes a prefix that is not included in the first expression, but the entirety of the first expression is the same as the end of the second expression), then a separate match list 39G may not be created for the first expression. Instead, the match list 39G for the second expression is created and includes a grouping for the top-level node of the first expression. A pointer corresponding to the first expression may point to the grouping for the top-level node of the first expression within the match list 39G for the second expression.

In one embodiment, the nodes that match a given expression may themselves be manipulated by the corresponding template body, or the values of the nodes (e.g. an attribute values or the content of an element) may be manipulated. The stylesheet compiler 20 may be configured to indicate, for each leaf node in the parse-time expression tree 26, whether the node or the value of the node is desired. In some embodiments, the expression processor 42 may also output, for each node, a list of templates that the node matches.

The expression list table 36 may be a list of expressions included in the stylesheet. The stylesheet compiler may assign expression numbers to the expressions, and may store the expression numbers in the expression list. A pointer in the parse-time expression tree leaf nodes may point to an entry in the expression list. Each entry may store an expression number and a group signature indicating the levels of the expression tree at which grouping is required. For example, in one embodiment, the group signature may comprise a bit for each level of the expression tree, with a zero indicating no grouping at that level and a one indicating grouping. In some embodiments, more than one expression may correspond to a given leaf node. For example, compile-time expressions that are removed due to matching with another expression may result in both expressions begin matched by a leaf node. Additionally, a given stylesheet may have an equivalent expression in more than one place. For such embodiments, the list of matching expression numbers may be stored in consecutive entries of the expression list table 36, and the entries may include a last expression indication which may identify the last matching expression for a given leaf node. If there is only one matching expression, the last expression indication in the first entry pointed to by the expression pointer may have its last entry indication in a state indicating the last entry.

The template list table 38 may similarly include entries having a template number and a last template indication to permit multiple matching templates for a given leaf node. The leaf nodes in the parse-time expression tree 36 may similarly include a pointer to the template list table for one or more matching templates. The template list table 38 may further include a template type field (e.g. imported or not, whether or not the template has a mode number, and whether or not the template has one or more run-time predicates), mode number, an import identifier identifying the stylesheet from which the template is imported for imported types, a template body instruction pointer into the instruction table 30 identifying the instructions to be executed for the template, and a predicate pointer into the instruction table 30 identifying instructions to be executed to evaluate one or more run-time predicates.

Figures 10, 11:
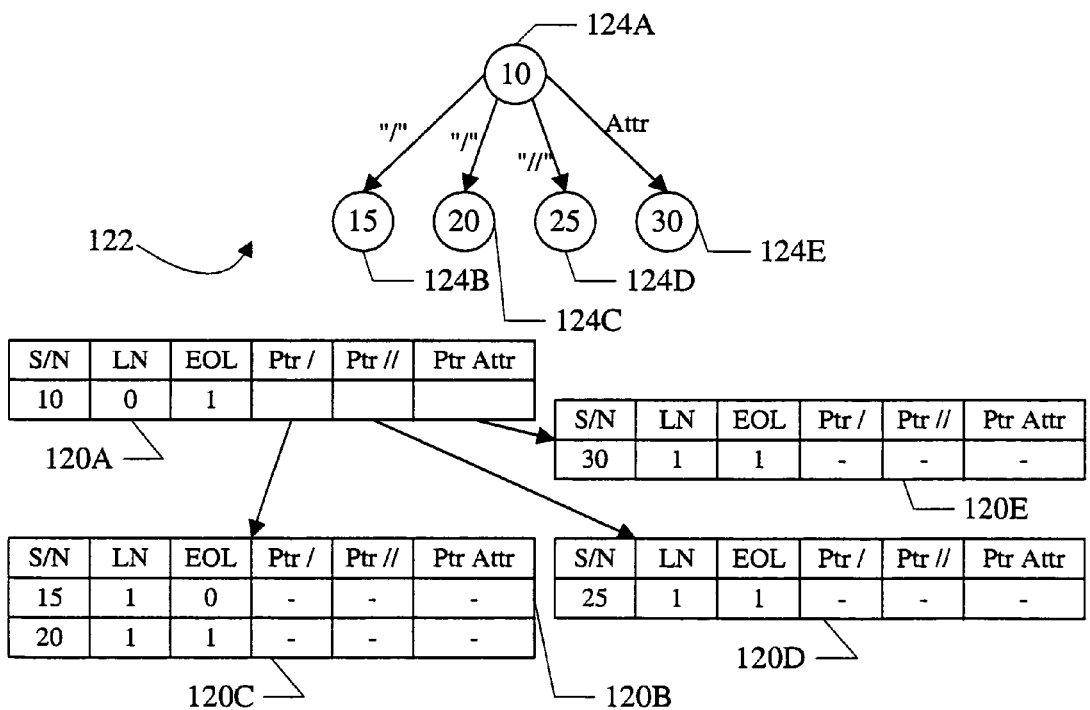
FIG. 10 is a block diagram of one embodiment of the parse-time expression tree shown in FIGS. 2 and 9.
FIG. 11 is an example of a portion of an expression tree and the parse-time expression tree entries corresponding thereto.

FIG. 10 illustrates a block diagram of one embodiment of the parse-time expression tree 26 data structure. In the illustrated embodiment, the parse-time expression tree may comprise a table having a plurality of entries such as entry 120, each entry corresponding to an expression node in the expression tree. Each expression node may have zero or more children of up to three different types in this embodiment: (1) / children, which are children of the node in the document tree; (2) // children, which are descendents of the node in the document tree (either direct child, or indirectly through a subtree of one or more nodes); or (3) attribute children (attributes of an element node). Additionally, a given expression node may be either a top-level node or not a top-level node. In one embodiment, the parse-time expression tree 26 may comprise a "forest" of multiple trees, each of which has a root. A top-level node is the root of one of the trees, and the tree may represent one or more expressions that begin with the top-level node. The top-level nodes may be grouped at the top of the parse-time expression tree data structure, with pointers to the nodes at the next level, as described in more detail below with respect to the entry 120.

The fields of the entry 120 are next described. The entry 120 includes a top-level type (TLT) field used for top-level expression nodes. The top level type may be encoded as relative, absolute, or ancestor. A relative top-level node is an expression node that starts one or more expressions that are evaluated relative to the context node in the document tree, whereas an absolute top-level node is an expression node that starts one or more expressions that are evaluated from the root node of the document tree (that is, the expression or expressions begin with a / followed by the top-level node identifier). An ancestor top-level node is the beginning of an expression that references ancestors of the context node (that is, the expression or expressions begin with a // followed by the top-level node identifier).

The entry 120 includes a serial number (S/N) field that stores the serial number of the expression node. The S/N field is compared to the serial numbers of document nodes identified in events transmitted by the parser circuit 40 to detect a match (serial numbers equal) or mismatch on the expression node stored in the entry 120. The entry 120 further includes a leaf node (LN) field that identifies whether the expression node stored in the entry 120 is a leaf node (i.e. whether or not the end of an expression has been reached). A match on a leaf node causes the document node to be recorded in the match lists 39G for each expression/template that corresponds to the leaf node. The LN field may, e.g., be a bit indicative, when set, that the expression node is a leaf node and indicative, when clear, that the expression node is not a leaf node. Other embodiments may reverse the set and clear meanings of the bit or use other encodings.

The path type field may identify the type of path links from the expression node stored in the entry 120 (e.g. either /, //, or both). For example, the path type field may include a bit for each type, which may be set to indicate that the type of path occurs from this node and may be clear to indicate that the type of path does not occur. Other embodiments may reverse the set and clear meanings of the bit or use other encodings. The path type field may validate the "Ptr /" and "Ptr //" fields. The Ptr / field may store a pointer to the first / child of the expression node (and each of the / children may be grouped in consecutive entries of the parse time expression tree data structure beginning at the entry indicated by the Ptr / pointer). Similarly, the Ptr II field may store a pointer to the first // child of the expression node (and each of the // children may be grouped in consecutive entries of the parse time expression tree data structure beginning at the entry indicated by the Ptr // pointer). The Ptr Attr field may store a pointer to the first attribute node in the parse-time expression tree (and each of the attributes may be grouped in consecutive entries of the parse-time expression tree data structure beginning at the entry indicated by the Ptr Attr pointer).

The EOL field stores an indication of whether or not the entry 120 stores the expression node that is the end of the current tree level. For example, the first entry from the top of the parse-time expression tree data structure that indicates end of level may indicate the last top-level node. Beginning at each pointer (e.g. Ptr /, Ptr //, or Ptr Attr), entries are children of the entry containing the pointer until an entry having the EOL field indicating end of level is reached. The EOL field may, e.g., be a bit indicative, when set, that the expression node is the end of the level, and indicative, when clear, that the expression node is not the end of the level. Other embodiments may reverse the set and clear meanings of the bit or use other encodings.

The entry 120 further includes an expression list pointer (XLP) field storing an expression list pointer that points to an entry in the expression list table 36, and a template list pointer (TLP) field storing a template list pointer that points to an entry in the template list table 38, as described above. The XLP and TLP fields may be valid for leaf nodes.

Some predicates may be evaluatable at parse-time in the present embodiment, and the predicate type (Pr TP) field and predicate data (Pr DT) field may be used to represent such predicates. For example, the predicate type field may be encoded to indicate no evaluatable predicate, positional predicate, or attribute name predicate. The predicate data field may store the predicate data from the expression (e.g. the position number for a positional predicate, or the attribute name or serial number for the attribute name for an attribute name predicate).

FIG. 11 is a block diagram of an exemplary expression tree 122 and corresponding portions of parse-time expression tree entries 120A-120E corresponding to the expression tree 122. The expression tree 122 includes an expression node 124A have serial number 10, which has two / children nodes 124B and 124C (serial numbers 15 and 20), one // child node 124D (serial number 25), and an attribute child 124E (serial number 30). Thus, the expression tree 122 represents the following expressions (assuming node 124A is a relative top-level node): 10/15, 10/20, 10//25, and 10/attribute::30.

The entries 120A-120E illustrate the S/N, LN, EOL, Ptr /, Ptr //, and Ptr Attr fields of the parse-time expression tree entries. Entry 120A corresponds to node 124A, and thus includes the serial number 10. The node 124A is not a leaf node, so the LN field is zero in the entry 120A. For this example, the EOL field is a 1 since the node 124A is the only node at its level in the tree 122. The Ptr / field of the entry 120A points to the entry 120B (the first / child). The Ptr // field of the entry 120A points to the entry 120D, and the Ptr Attr field of the entry 120A points to the entry 120E.

The entry 120B includes 15 in the S/N field, and the LN field is 1 since the node 124B is a leaf node of the expression tree 122. The EOL field is 0, however, since there is another / child at this level. The Ptr /, Ptr //, and Ptr Attr fields of the entry 120B are null since this is a leaf node. The entry 120C includes 20 in the SIN field, and the LN field is 1 since the node 124C is a leaf node of the expression tree 122. The EOL field is also 1 since the node 124C is the last / child at this level. Again, since the entry 120C is a leaf node, the Ptr /, Ptr //, and Ptr Attr fields of the entry 120C are null.

The entry 120D includes 25 in the S/N field, and the LN field is 1 since the node 124D is a leaf node of the expression tree 122. The EOL field is also 1 since the node 124D is the last // child at this level. Since the entry 120D is a leaf node, the Ptr /, Ptr //, and Ptr Attr fields of the entry 120D are null.

The entry 120E includes 30 in the S/N filed, and the LN field is 1 since the node 124E is a leaf node of the expression tree 122. The EOL field is 1 since the node 124E is the last attribute child at this level. Since the entry 120E is a leaf node, the Ptr /, Ptr //, and Ptr Attr fields of the entry 120E are null.

Turning next to FIGS. 12A-12B, 13, 14A-14B, and 15, flowcharts are shown illustrating operation of one embodiment of the expression processor 42 for each of the events that may be generated by the parser circuit 40. Each event may include the serial number of the document node that has been detected (and, in some embodiments, the preorder number of the document node). The expression processor 42 may be implemented in hardware, and thus the flowcharts may represent operation of the hardware even though various blocks may be performed in parallel in the hardware or pipelined in the hardware, as desired. The flowcharts may generally refer to matching document nodes and expression nodes. As mentioned previously, such matching may comprise matching serial numbers of the document nodes and expression nodes. Furthermore, the flowcharts may refer to outputting nodes to the match lists. As mentioned previously, nodes may be represented in the match lists by preorder number, in some embodiments.

Figure 12A:
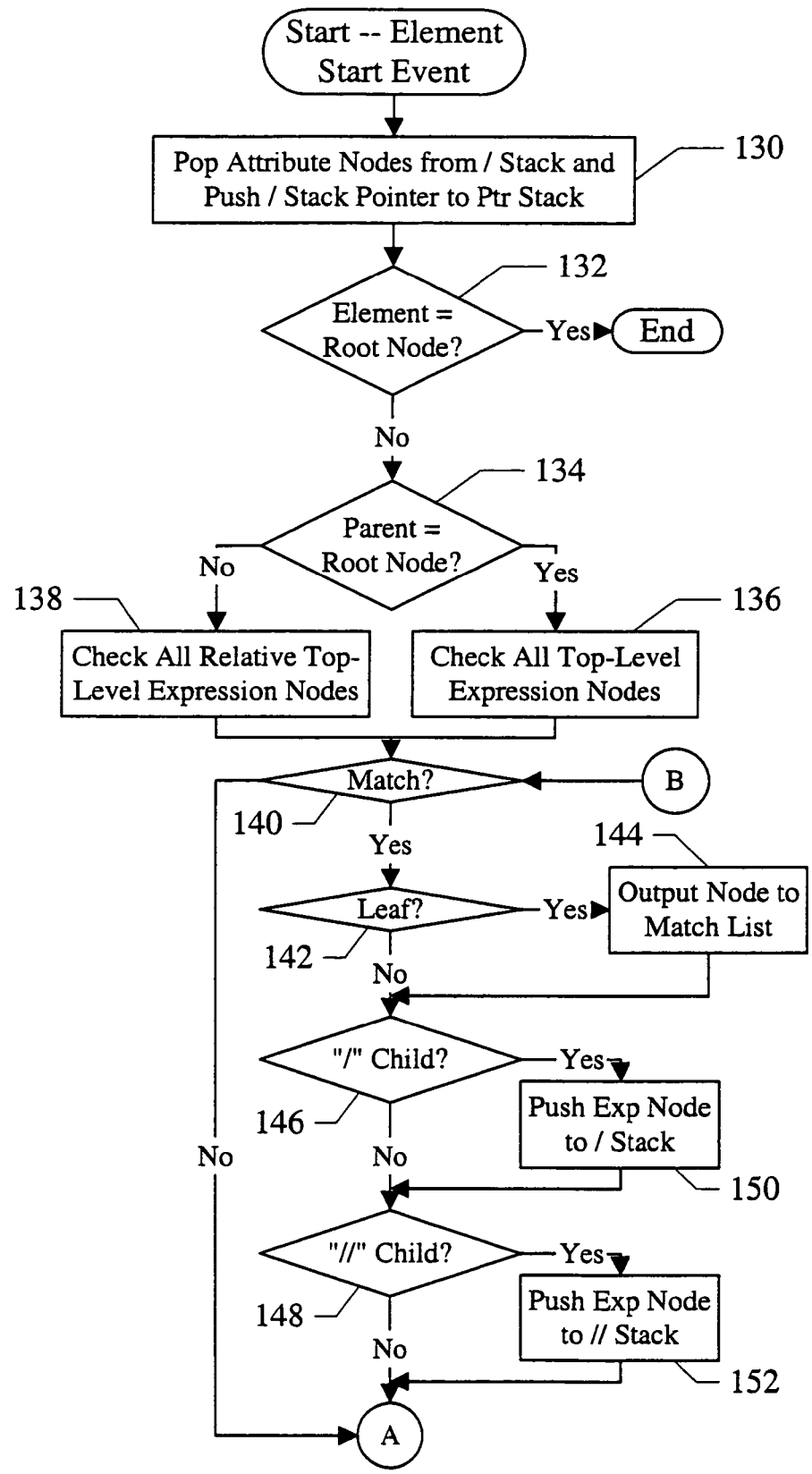
FIGS. 12A-12B are a flowchart illustrating operation of one embodiment of the expression processor in response to an element start event.
Figure 12B:
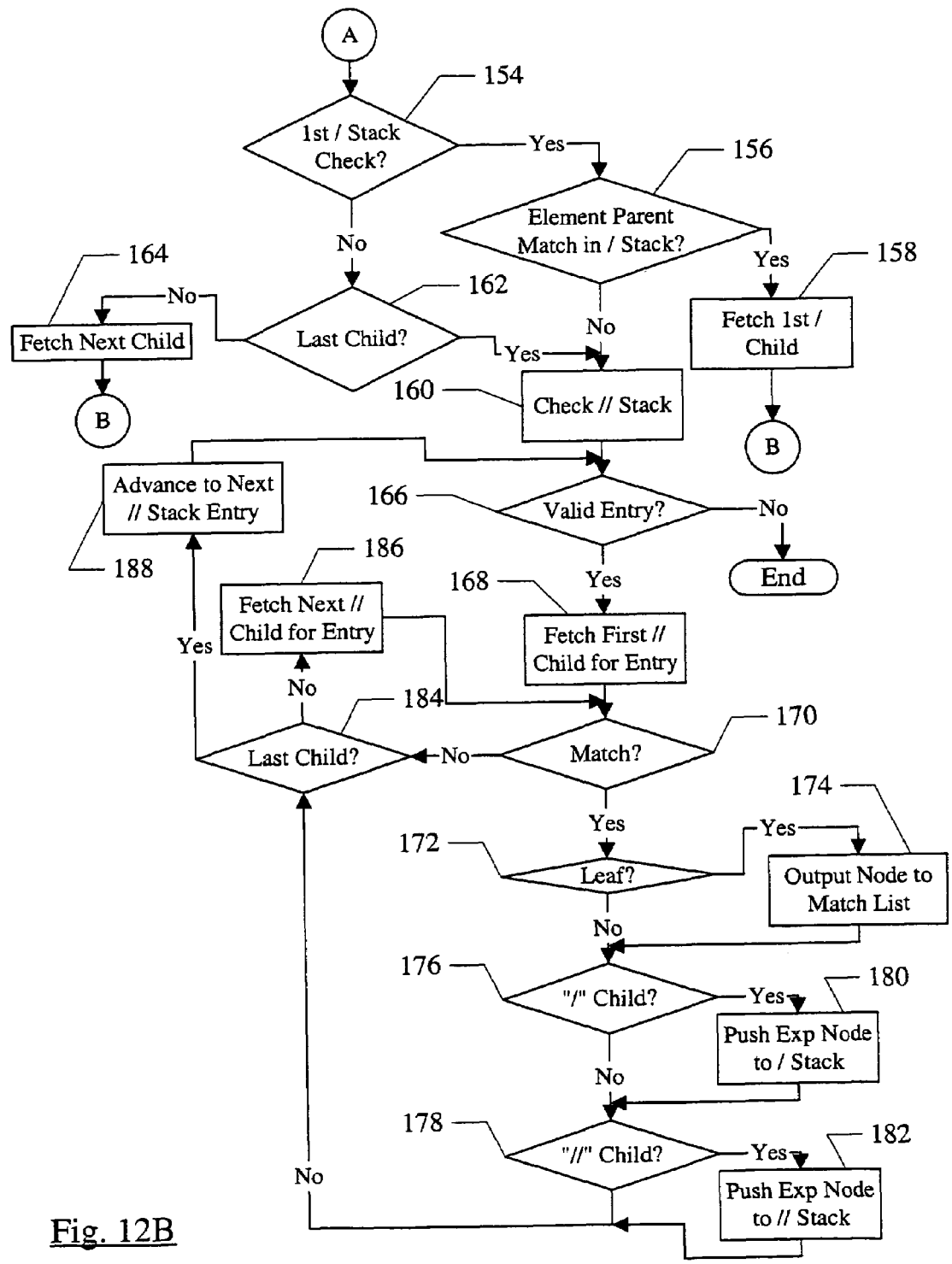

FIGS. 12A-12B illustrate operation of one embodiment of the expression processor 42 in response to an element start event. The element start event may be transmitted in response to detecting an element start tag in the document.

The expression processor 42 may pop any attribute expression nodes that may be stored on the / stack 39C, and may push the / stack pointer to the pointer stack 39E (block 130). Since a new element is being started, any attribute expression nodes on the / stack will not be matched and thus are not needed. If the element identified by the element start event (referred to more succinctly in the description of FIGS. 12A-12B as the element) is the root node of the document, then no additional processing is performed (decision block 132, "yes" leg). The root node may not match any of the nodes in the parse-time expression tree 26, and any top level nodes may match the children of the root. If the element is not the root node (decision block 132, "no" leg), but the parent of the element is the root node (decision block 134, "yes" leg), the expression processor 42 may check each top-level expression node in the parse-time expression tree 26 since a match may be detected even against absolute top-level nodes for a child of the root node (block 136). On the other hand, if the parent element of the element node is the root node (decision block 134, "no" leg), the expression processor 42 may check each relative top-level expression node in the parse-time expression tree 26 since a match may not be detected against absolute top-level nodes for a node that is not the child of the root node (block 138).

If a match is not detected against any of the top-level nodes (decision block 140, "no" leg), the flowchart continues at reference A in FIG. 12B. If a match is detected (decision block 140, "yes" leg), and the expression node is a leaf node (decision block 142, "yes" leg), the element node is output to the match list corresponding to the expression(s) and/or template(s) pointed to by the XLP and TLP pointers in the expression node's entry of the parse time expression tree 26 (block 144). If the matched expression node is not a leaf node (decision block 142, "no" leg), the expression processor 42 determines if the matched expression node has any / or // children (decision blocks 146 and 148, respectively), and pushes the matched expression on the / stack 39C and/or the // stack 39D, respectively, if the matched expression node does have any / or // children (blocks 150 and 152, respectively). Additionally, the / stack 39C and the // stack 39D may include an evaluated field used for managing the matching of parse-time predicates (indicated via the Pr TP and Pr DT fields in the parse-time expression tree entry). If there is a parse-time predicate (as indicated by the Pr TP field), the evaluated field may be set to 0. Otherwise, the evaluated field may be set to 2. The flowchart continues at reference A in FIG. 12B.

At reference A in FIG. 12B, the flowchart operates differently depending on whether or not this pass through the flowchart is the first check of the / stack 39C for this element (decision block 154). If this is the first check of the / stack 39C for this element (decision block 154, "yes" leg), the expression processor 42 determines if the element's parent is a match in the / stack 39C (decision block 156). If the element's parent is a match in the / stack 39C (decision block 156, "yes" leg), then one of the / children of the matched expression node may match the element. The expression processor 42 may fetch the first / child of the matched expression node as indicated by the Ptr / in the matched expression node's parse-time expression tree entry (block 158) and may return to reference B in FIG. 12A to determine if a match is detected on the / child (and to process as shown in blocks 142-152 in FIG. 12A if a match is detected). If the element's parent is not a match in the / stack (decision block 156, "no" leg), the expression processor 42 may check the // stack 39D (block 160). Similarly, if this pass is not the first check of the / stack 39C for this element (decision block 154, "no" leg) and the last / child has been fetched from the matched expression node in the / stack (decision block 162, "yes" leg), the expression processor 42 may check the // stack 39D (block 160). If this pass is not the first check of the / stack 39C for this element (decision block 154, "no" leg) and the last / child has not been fetched from the matched expression node in the / stack (decision block 162, "no" leg), the expression processor 42 may fetch the next / child of the matched expression node in the / stack and the flowchart may continue at reference B in FIG. 12A to determine if a match is detected for the element. Thus, through the operation of blocks 154-164 (and returning to blocks 140-152 in FIG. 12A), each / child of an expression node that matches the parent of the element may be searched for match by the element.

In some embodiments, the parent element of an element may be maintained by the expression processor 42 (e.g. the expression processor 42 may keep a stack of elements for which an element start event has occurred but for which an element end event has not occurred). Alternatively, in other embodiments, the parent element may be maintained by the parser circuit 40 and may be included in the element start event.

Searching the // stack 39D may involve somewhat different processing than searching the / stack 39C in the present embodiment. A node may match a // child of any expression node on the // stack 39D (since the // operator selects any descendent of the expression node and entries on the // stack 39D have matched a previous element that is a parent or ancestor of the element identified in the element start event). Thus, the flowchart of FIG. 12B illustrates searching the // children of each valid entry on the // stack 39D.

If the // stack 39D has no valid entries (or no more valid entries) (decision block 166, "no" leg), the // stack processing is complete and processing of the element start event is complete. If the // stack 39D has a valid entry (decision block 166, "yes" leg), the expression processor 42 fetches the first // child of the entry, as indicated by the Ptr // in the entry (block 168). The expression processor 42 compares the // child to the element to determine if a match is detected (decision block 170). If a match is detected (decision block 170, "yes" leg), and the // child node is a leaf node (decision block 172, "yes" leg), the element is output to the match lists, similar to block 144 (block 174). Similar to blocks 146-152, if the // child node is not a leaf node and a match is detected, the expression processor 42 determines if the // child node has any / or // children itself (decision blocks 176 and 178, respectively), and pushes the // child node on the / stack 39C and/or the // stack 39D, respectively, if the // child node does have any / or // children (blocks 180 and 182, respectively). Additionally, the evaluated field in the / or // stack 39C-39D may be set as described above with regard to blocks 146-152.

If the last child of the current // stack entry has not been processed (decision block 184, "no" leg), the expression processor 42 fetches the next // child of the current // stack entry (block 186) and the flowchart continues at decision block 170 for the next // child. If the last child has been processed (decision block 184, "yes" leg), the expression processor 42 advances to the next entry in the // stack 39D (block 188), and the flowchart continues at decision block 166 for the next // stack entry.

Figure 13:
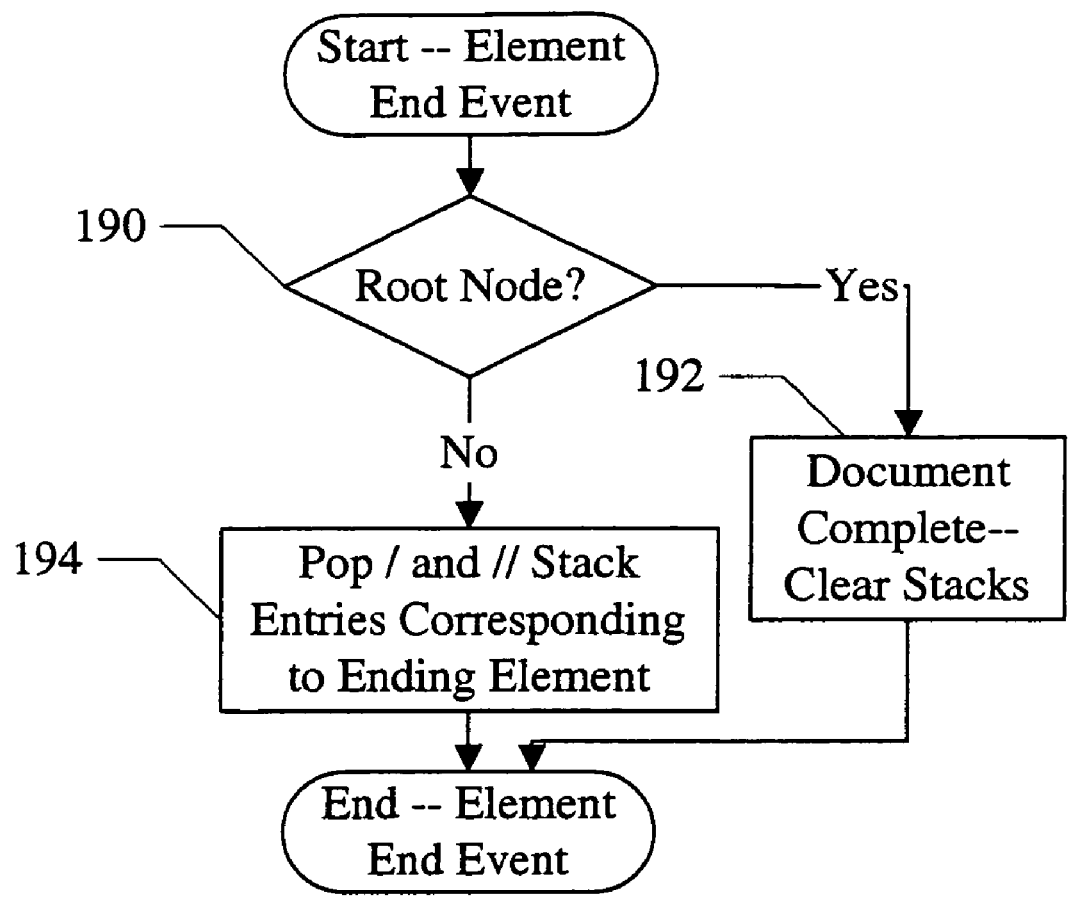
FIG. 13 is a flowchart illustrating operation of one embodiment of the expression processor in response to an element end event.

FIG. 13 illustrates operation of one embodiment of the expression processor 42 in response to an element end event. The element end event may be transmitted by the parser circuit 40 in response to detecting an element end tag in the document.

If the element end event is for the root node of the document (decision block 190, "yes" leg), the document is complete (block 192). The expression processor 42 may clear the stacks 39C-39F. If the element end event is not for the root node of the document (decision block 190, "no" leg), the expression processor 42 may pop the / and // stack entries that correspond to the ending element (block 194). Since the element is being closed, all children of the element have previously been parsed. Accordingly, any entries in the / and // stack that correspond to the element (that is, entries that have the element's serial number) can not be matched by subsequently-detected nodes.

Figure 14A:
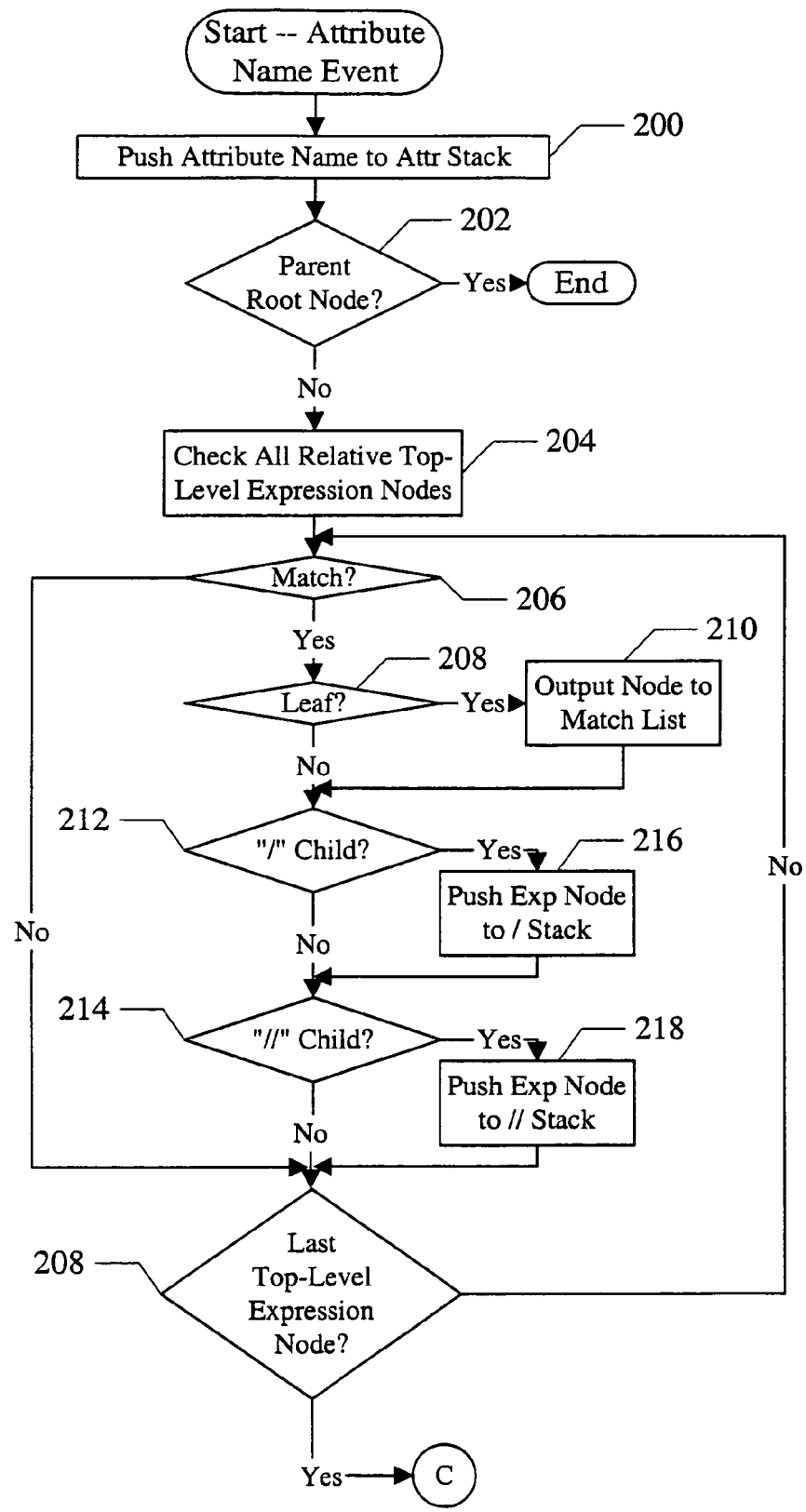
FIGS. 14A-14B are a flowchart illustrating operation of one embodiment of the expression processor in response to an attribute name event.
Figure 14B:
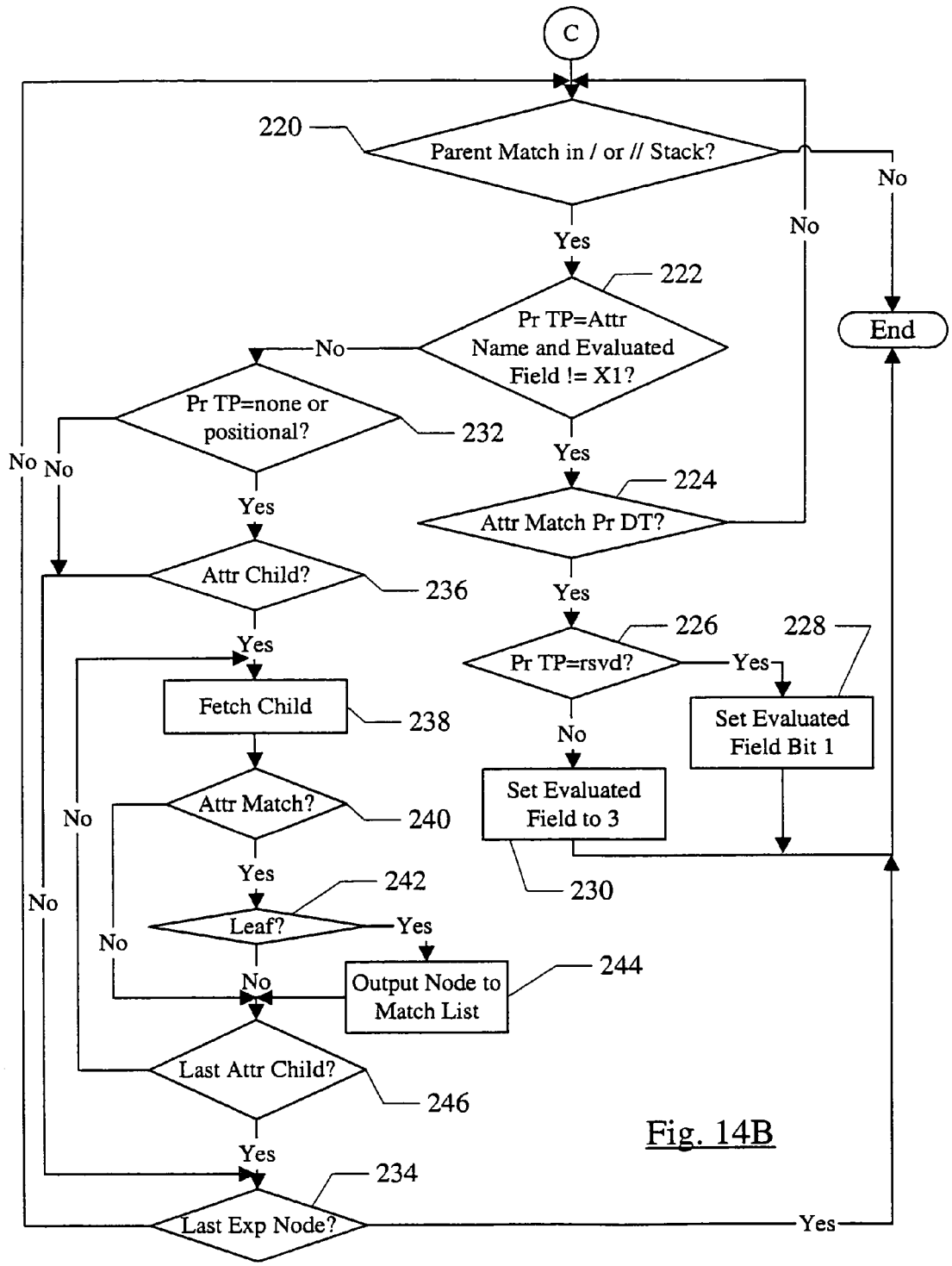

FIGS. 14A-14B illustrate operation of one embodiment of the expression processor 42 in response to an attribute name event. The attribute name event may be transmitted by the parser circuit 40 in response to detecting an attribute name within an element start tag in the document. The attribute name may be represented by its serial number.

Figure 15:
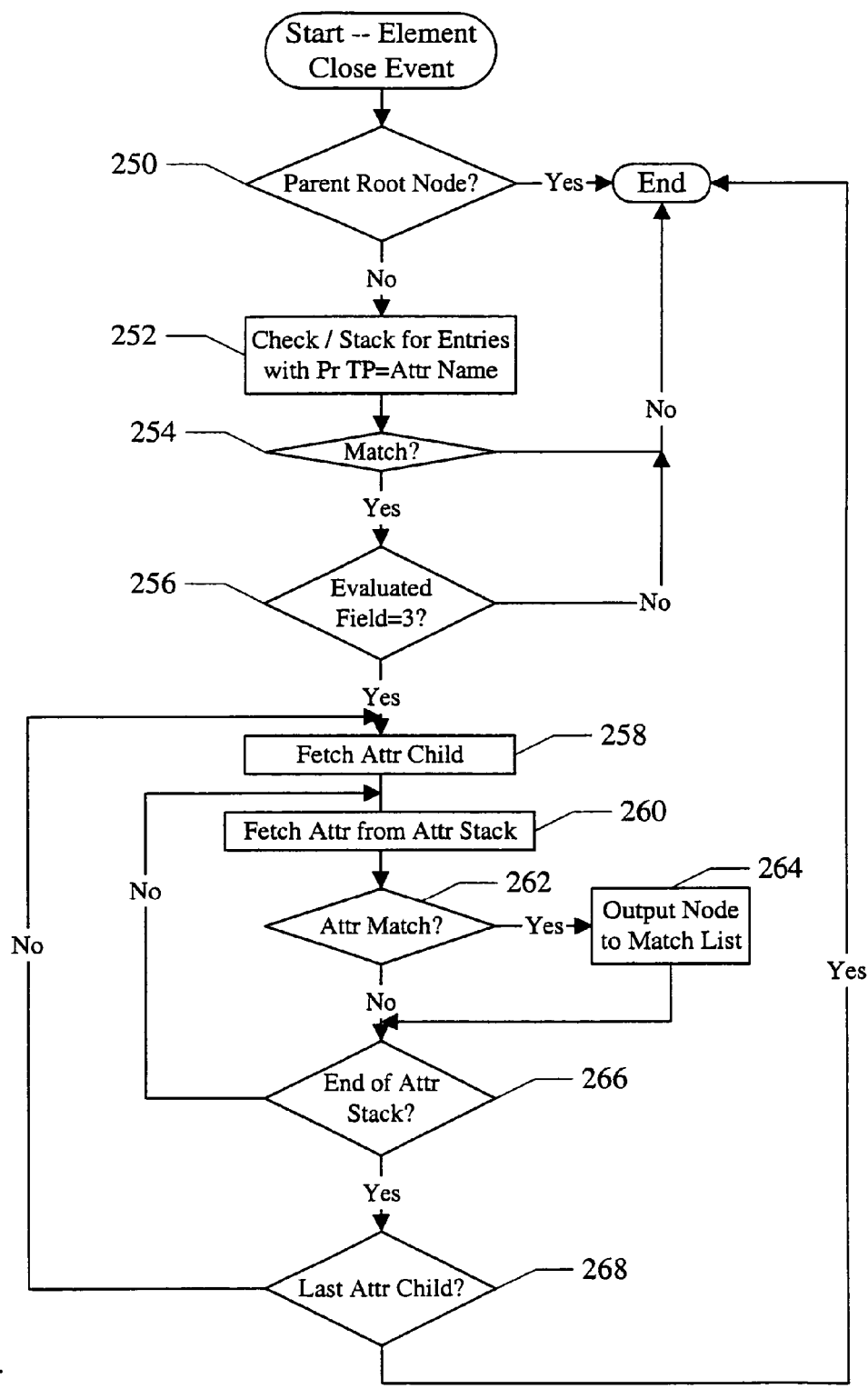
FIG. 15 is a flowchart illustrating operation of one embodiment of the expression processor in response to an element close event.

The expression processor 42 may push the attribute name (that is, its serial number) to the Attr stack 39F. The Attr stack 39F accumulates attribute names for the element close command processing (FIG. 15). If the parent node of the attribute is the root node (decision block 202, "yes" leg), then there is no additional processing to perform (since the root node does not have attributes). On the other hand, if the parent node of the attribute is not the root node (decision block 202, "no" leg), the expression processor 42 continues.

The expression processor 42 may check each of the relative top-level expression nodes for a match against the attribute name (again, matching by serial number) (block 204). If there is not a match with a given relative top-level expression node (decision block 206, "no" leg), processing continues with the next relative top-level expression node until the top-level expression nodes have been exhausted (decision block 208, "no" leg). Once the top-level expression nodes have been exhausted (decision block 208, "yes" leg), processing continues in FIG. 14B at reference C.

If a match is detected (decision block 206, "yes" leg) and the node is a leaf node (decision block 210, "yes" leg), the attribute node is output to the match lists 39G (block 210). The expression processor 42 determines if the matched expression node has any / or // children (decision blocks 212 and 214, respectively), and pushes the matched expression node on the / stack 39C and/or the // stack 39D, respectively, if the matched expression node does have any / or // children (blocks 216 and 218, respectively).

Continuing at reference C in FIG. 14B, the expression processor 42 checks for a match of the parent node of the attribute name in the / or // stack 39C-39D (decision block 220). If no matches are detected (decision block 220, "no" leg), processing of the attribute name event is complete. If a match is detected, the expression processor 42 checks the Pr TP field of the matching expression node's expression tree entry to determine if the matching expression node has an attribute name predicate (or a reserved encoding, in one embodiment). If the matching expression node has an attribute name predicate and the least significant bit of the evaluated field is clear (that is, the evaluated field is either 0 or 2) (decision block 222, "yes" leg), the expression processor 42 may compare the attribute name to the Pr DT field of the matching expression node's expression tree entry. If the attribute does not match (decision block 224, "no" leg), the expression processor 42 continues with the next matching node in the / or // stack 39C-39D, if any. If the attribute does match (decision block 224, "yes" leg), in one embodiment, the expression processor 42 checks to see if the Pr TP field has a reserved encoding (decision block 226). In other embodiments, decision block 226 may be eliminated. If the Pr TP field has the reserved encoding (decision block 226, "yes" leg), the expression processor 42 may set bit one of the evaluated field for the matching expression node in the / or // stack 39C-39D (block 228). If the Pr TP field does not have the reserved encoding (decision block 226, "no" leg), the expression processor 42 may set the evaluated field to 3 (block 230). In either case, processing of the attribute name event may be complete. The reserved encoding may be used, in some embodiments, if the expression processor 42 attempts to perform attribute value matching. Other embodiments may not perform such matching, and in such embodiments blocks 226 and 228 may be eliminated.

If decision block 222, "no" leg is followed, the expression processor 42 determines if the Pr TP field indicates no parse-time predicate or a positional predicate (decision block 232). That is, the expression processor 42 determines whether or not the Pr TP field indicates attribute name. If the Pr TP field is not coded to none or positional (decision block 232, "no" leg), the expression processor 42 either moves to the next matching / or // stack entry or ends processing if there are no more matching entries (decision block 234, "yes" and "no" legs, respectively). If the Pr TP field is coded to none or positional, the expression processor 42 determines if the expression node has an attribute child (decision block 236). If the expression node does not have an attribute child (decision block 236, "no" leg), the expression processor 42 either moves to the next matching / or // stack entry or ends processing if there are no more matching entries (decision block 234, "yes" and "no" legs, respectively). If the expression node does have an attribute child (decision block 236, "yes" leg), the expression processor 42 fetches the attribute child (block 238) and compares the attribute child to the attribute name (serial number). If the attribute child matches the attribute name (decision block 240, "yes" leg) and the attribute child node is a leaf node (decision block 242, "yes" leg), the expression processor 42 outputs the attribute name node to the match lists 39G. Whether or not an attribute match is detected, if there are additional attribute children nodes (that is, the EOL indication of the attribute child node does not indicate end of level), then the expression processor 42 fetches the next attribute child node (block 238) and continues with blocks 240-244 (decision block 246, "yes" leg). Otherwise (decision block 246, "no" leg), the expression processor 42 either moves to the next matching / or // stack entry or ends processing if there are no more matching entries (decision block 234, "yes" and "no" legs, respectively).

FIG. 15 illustrates operation of one embodiment of the expression processor 42 in response to an element close event. The element close event may be transmitted by the parser circuit 40 in response to detecting the close of an element start tag (and thus all attributes of the element have been detected in the document for this element). In response to the element close event, the expression processor 42 checks the attribute names previously identified by the parser circuit 40 against the attribute children of any matching nodes in the / stack 39C.

If the parent node of the element being closed is the root node (decision block 250, "yes" leg), no additional processing is performed. If the parent node of the element being closed is not the root node (decision block 250, "no" leg), the expression processor checks the / stack 39C for entries having the Pr TP field indicating attribute name (block 252). If no matching entries are found (decision block 254, "no" leg), processing is complete. If a matching entry is found (decision block 254, "yes" leg), and the evaluated field of the matching entry is not 3 (decision block 256, "no" leg), processing is also complete. If a matching entry is found (decision block 254, "yes" leg), and the evaluated field of the matching entry is 3 (decision block 256, "yes" leg), processing continues at block 258.

The expression processor 42 fetches an attribute child of the matching expression node (block 258). Additionally, the expression processor 42 fetches an attribute name for the attribute stack 39F (block 260). The expression processor 42 compares the attribute names. If a match is detected (decision block 262, "yes" leg), the attribute node is output to the match lists 39G (block 264). In either case, if the end of the attribute stack 39F has not been reached (decision block 266, "no" leg), processing continues at block 260 for the next attribute in the attribute stack 39F. If the end of the attribute stack 39F has been reached (decision block 266, "yes" leg), and the last attribute child of the matching expression node has not been processed (decision block 268, "no" leg), processing continues at block 258 for the next attribute child of the matching expression node. If the end of the attribute stack 39F has been reached (decision block 266, "yes" leg), and the last attribute child of the matching expression node has been processed (decision block 268, "yes" leg), processing of the element close event is complete.

It is noted that, at various points in the above description of FIGS. 12A-12B, 13, 14A-14B, and 15, the flowcharts refer to outputting a node to the match lists 39G. The operation of outputting a node may include inserting the node into the node set structure(s) of the expressions/templates corresponding to the matched leaf node in the parse-time expression tree 26. The operation of outputting the node may further include updating the skeleton tree generated by the parser circuit 40 with the template number (or list) as indicated by the template list pointer in the leaf node of the parse-time expression tree 26.

It is noted that, at various points above, an expression node may be referred to as being pushed onto the / stack 39C or the // stack 39D. Pushing an expression node onto a stack 39C-39D may include pushing the node's expression tree entry 120 onto the stack (or a portion of the expression tree entry used in expression matching). Additional information may be included in the entry, as desired (e.g. various status variables indicating the progress of matchings, such as the evaluated field).

Figure 16:
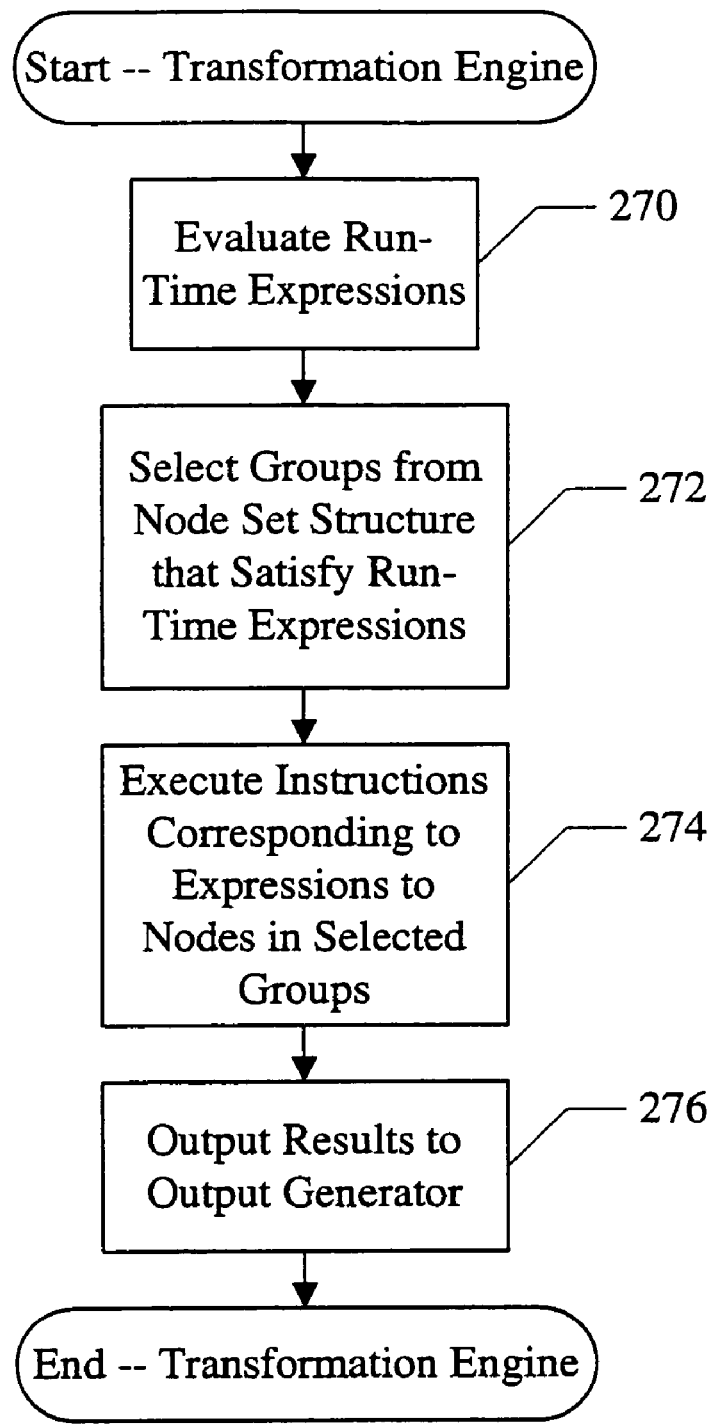
FIG. 16 is a flowchart illustrating operation of one embodiment of the transformation engine.

Turning next to FIG. 16, a flowchart is shown illustrating operation of one embodiment of the transformation engine 44 in response to receiving the parsed content tables 39B and the match lists 39G for a document. The transformation engine 44 may be implemented in hardware, and thus the flowchart may represent operation of the hardware even though various blocks may be performed in parallel in the hardware or pipelined in the hardware, as desired.

For each expression, the transformation engine 44 may evaluate any run-time portions of the expression (e.g. run-time predicates, in one embodiment—block 270). For example, in one embodiment, a pointer in the template list table 38 may indicate instructions in the instruction table 30 that are to be executed by the transformation engine 44 to evaluate the run-time predicates. In other embodiments, the run-time predicates may be identified in other fashions (e.g. a run-time expression tree similar to the parse-time expression tree 26). In response to the run-time predicate evaluation, the transformation engine 44 may select groups from the node set structure that satisfy the run-time expressions (block 272). The transformation engine 44 may execute the instructions from the instruction table 30 that correspond to the expressions (e.g. the instructions may be located by the template body pointer in the template list table 38). The instructions may be executed on each of the nodes in the selected groups (block 274), and the results may be output to the output generator 46 (block 276).

In one embodiment, the transformation engine 44 may comprise a plurality of hardware processors designed to execute the instructions generated by the stylesheet compiler 20. That is, the instruction set of the processors may be defined, and the stylesheet compiler 20 may generate instructions in the instruction set. In some embodiments, the instruction set is designed to accommodate extensions to the XSLT language. The transformation engine 44 may, for example, dispatch the instructions to be executed on a particular node to one of the processors, which may execute the instruction on that node to generate the results.

In one embodiment, the instructions executed to evaluate run-time predicates may be ordered so that predicates that are similar (e.g. predicates that have common prefix portions) are evaluated simultaneously, so that fetching of nodes to evaluate the predicate may be minimized. For example, predicates that are based on following nodes of the matching node may be grouped together and evaluate simultaneously.

In some cases, variables and/or parameters in a stylesheet may be declared using an expression, and later instructions may use the variables/parameters. The expressions defining the variables/parameters may be included in the parse-time expression tree 26, and thus the expressions may be evaluated (or if the expressions include run-time predicates, partially evaluated) by the expression processor 42. Run-time predicates may be evaluated similar to other run-time predicates. In some embodiments, the stylesheet compiler 20 may attempt to order the instructions for evaluating the variables/parameters well ahead of the instructions that use the variables/parameters, to reduce the likelihood that an instruction will be attempted by the transformation engine 44 prior to the variables/parameters being evaluated. The transformation engine 44 may, e.g., include a wait queue into which instructions that use the variables/parameters and that are attempted prior to the variables/parameters being evaluated may be placed, and the instructions may be reattempted and replaced into the wait queue until the variables/parameters are evaluated. In other embodiments, the stylesheet compiler 20 may explicitly identify instructions that depend on the various variables/parameters, and the transformation engine 44 may check for such dependencies before attempting to execute each instruction. In yet other embodiments, the stylesheet compiler 20 may rearrange the instructions to ensure that a given instruction does not execute before its dependencies are satisfied. For example, the stylesheet compiler 20 may construct a topologically sorted data dependency graph of the instructions, and may assign a group number to each instruction at a given level. The transformation engine 44 may not select a given instruction having a given group number for execution until all instructions in previous groups have been selected for execution.

It is noted that the pointers to various data structures (and within various data structures) described above may be full pointers (that alone specify the address of the data being pointed to) or may be offsets from a base address of the structure containing the data being pointed to, as desired.

Expression Processor, Additional Embodiment

Another embodiment of the expression processor 42 is next described with respect to FIGS. 17-24B. This embodiment may use a somewhat different parse-time expression tree structure, and may handle additional expressions. XML node constructs are used in this example, although other embodiments may employ other markup languages. The embodiment illustrated via FIGS. 17-24B may match on any nodes (e.g. elements, attributes, processing instructions, comments, text, etc.), including predicates that may be evaluated using nodes found in the document order. The flowcharts may generally refer to matching document nodes and expression nodes. As mentioned previously, such matching may comprise matching serial numbers of the document nodes and expression nodes. Furthermore, the flowcharts may refer to outputting nodes to the match lists. As mentioned previously, nodes may be represented in the match lists by preorder number, in some embodiments.

FIG. 17 is a block diagram illustrating another embodiment of the parse-time expression tree 26, including an entry 300. The entry 300 is shown as two rows in FIG. 17 for space reasons in the drawing. The entry 300 may correspond to one expression node in the parse-time expression tree 26, and thus there may be an entry similar to the entry 300 for each expression node.

The entry 300 includes a top-level type (TLT) field, a serial number (S/N) field, a leaf node (LN) field, an end of level (EOL) field, an expression list pointer (XLP) field, a template list pointer (TLP) field, a predicate type (PrTP) field, and a predicate data (PrDT) field similar to the entry 120 shown in FIG. 10. Additionally, the entry 300 may include a node type (NT) field, a child descriptor (CD) field, a Ptr / field, a Ptr // field, a Ptr / Attr field, a Ptr // Attr field, a Ptr / PI field, and a Ptr // PI field. It is noted that the order of fields shown in FIG. 17 may not correspond to the order of the fields in memory. Rather, the fields of entry 300 are merely shown to illustrate the contents of one embodiment of a parse-time expression tree entry.

The expression node corresponding to the entry 300 may have various types of child expression nodes. The CD field of the entry 300 may store an indication of which types of child expression nodes the expression node has. For example, FIG. 18 includes a table 302 illustrating one embodiment of the encoding of the CD field. In the embodiment illustrated in FIG. 18, the CD field may include a bit for each child node type and for a / or // child of that type. For example, there are six child node types in the illustrated embodiment (element, attribute, text, comment, processing instruction (PI), and processing instruction with a literal (PI-literal)). Each type may be either a / child or a // child of the expression node, and thus the CD field comprises 12 bits in this embodiment. If the corresponding bit is set, then the expression node has at least one child expression node of the given type (and / or //). For example, if the expression node has at least one / child element node, bit 11 of the CD field may be set. If the expression node has at least one // child element node, bit 10 of the CD field may be set. Other embodiments may reverse the meaning of the set and clear states or may use any desired encoding. The CD field may be used to determine if a given expression node has any children of a given type, as part of the expression matching process.

The NT field may store a node type identifying the type of the expression node corresponding to the entry 300. For example, FIG. 18 includes a table 304 illustrating exemplary encodings for the NT field. In the exemplary embodiment, the NT field may comprise a three bit encoding, the binary values of which are shown in the left column of the table 304. The right column lists the various node types for this embodiment (e.g. element, attribute, text, comment, PI, node, and PI with target). Other embodiments may use any other encoding, and support any subset or superset of the types shown.

In the illustrated embodiment, the entry 300 may include six pointers to child node entries in the parse-time expression tree 26. The Ptr / Attr pointer may point to attribute nodes that are / children of the expression node. The / attribute child nodes may be grouped in the parse-time expression tree 26 beginning at the entry indicated by the Ptr / Attr pointer. The Ptr // Attr pointer may point to attribute nodes that are // children of the expression node. The // attribute child nodes may be grouped in the parse-time expression tree 26 beginning at the entry indicated by the Ptr // Attr pointer. The Ptr / PI pointer may point to PI nodes that are / children of the expression node. The / PI child nodes may be grouped in the parse-time expression tree 26 beginning at the entry indicated by the Ptr / PI pointer. The Ptr // PI pointer may point to attribute nodes that are // children of the expression node. The // PI child nodes may be grouped in the parse-time expression tree 26 beginning at the entry indicated by the Ptr // PI pointer. Other / child nodes (i.e. not attribute or PI nodes) of the expression node are grouped in the parse-time expression tree 26 at the Ptr / pointer (for / children of the expression node) and the Ptr // pointer (for // children of the expression node).

While the illustrated embodiment provides separate sets of pointers to locate attribute children, processing instruction children, and remaining children, other embodiments may implement different sets of pointers. For example, an embodiment may include only one set of pointers: a / pointer and a // pointer to locate all / children and all // children, respectively. Other embodiments may implement / and // pointers for each node type, or may group the nodes at pointers in other fashions, as desired.

The PrTP field may have an encoding, in this embodiment, as shown in table 306 in FIG. 18. The predicate types may include, in this embodiment, no predicate (or more particularly, no parse-time evaluatable predicate), a positional predicate, an element child predicate, an attribute name predicate, a PI node test with name predicate, a node test predicate, a comment node test predicate, a PI node test predicate, and a text node test predicate. The node test predicate may simply test that there is a node (of any type) as a child or descendent of the expression node. The comment node test, PI node test (without name), and text node test predicates may test for the existence of a node of the given type. The PI node test with name may test for the existence of a PI node with a PI target having the name. Other embodiments may use any other encoding, and may support any subset or superset of the predicate types shown.

In some embodiments, the expression list table 36 and the template list table 38 may have similar construction to that described above with regard to FIG. 9. Additionally, in one embodiment, each template list table entry may include a node ID which identifies which child node (if applicable) is being referenced in the template match expression corresponding to that template list table entry. For example, the template list table 38 may be organized according to the last element that is matched for a given expression or expressions (that is, the table may include a list, for the last element, of the expressions matched by the element even if the expression includes non-element children of the element). Attribute, text, comment, or processing instruction child nodes that may be in included in some of the expressions in the expression list for that element node may be identified by the node ID. The node ID may identify the type of child node. Additionally, for attributes and processing instructions, the node ID may identify the position with respect to other attributes and processing instructions, respectively, within the node. A node ID of zero may indicate that there is no child of the element node for the corresponding expression.

In this embodiment, the parser circuit 40 may generate the following events for the expression processor 42: a top level element start event, an element start event, an element end event, an attribute name event, a text event, a comment event, a processing instruction event, and a configuration event. The configuration event may be generated to establish the desired stylesheet/document context for the expression processor 42.

The top level element start event may identify the start of an element that is the child of the root. The start of elements that are children of other elements than the root are identified by the element start event. For example, in embodiments employing XML, the element start events may indicate that an element start tag has been detected. Each event may include the serial number of the element. In some embodiments, the events may also include the child position of the element and/or the element's pre-order number. These events may cause the expression processor 42 to attempt to match the element to expressions in the parse-time expression tree 26.

The element end event may be generated in response to detecting the end of the element (e.g. that an element end tag has been detected in embodiments employing XML). The expression processor 42 may flush any expression branches that were matched by the element in response to its element end event.

The attribute name event may be generated in response to detecting an attribute name. The attribute name event may include the serial number of the attribute name, and may, in some embodiments, include the pre-order number of the attribute to which the element corresponds. The expression processor 42 may attempt to match the attribute name to expressions in the expression tree in response to the attribute name event.

The text event may be generated in response to detecting text in the document. The text event may include the corresponding element's pre-order number, and may cause the expression processor 42 to check the expressions in the expression tree for a match on a text node test or a text expression node. Similarly, the comment event may be generated in response to detecting a comment node in the document. The comment event may include the corresponding element's pre-order number, and may cause the expression processor 42 to check the expressions in the expression tree for a match on a comment node test or a comment expression node.

The processing instruction event may be generated in response to detecting a processing instruction. The processing instruction event may include the serial number of the processing instruction and may, in some embodiments, include the corresponding element's pre-order number. The expression processor 42 may attempt to match the processing instruction to the processing instruction node test, with or without a literal, or to a processing instruction expression node.

Figure 19A:
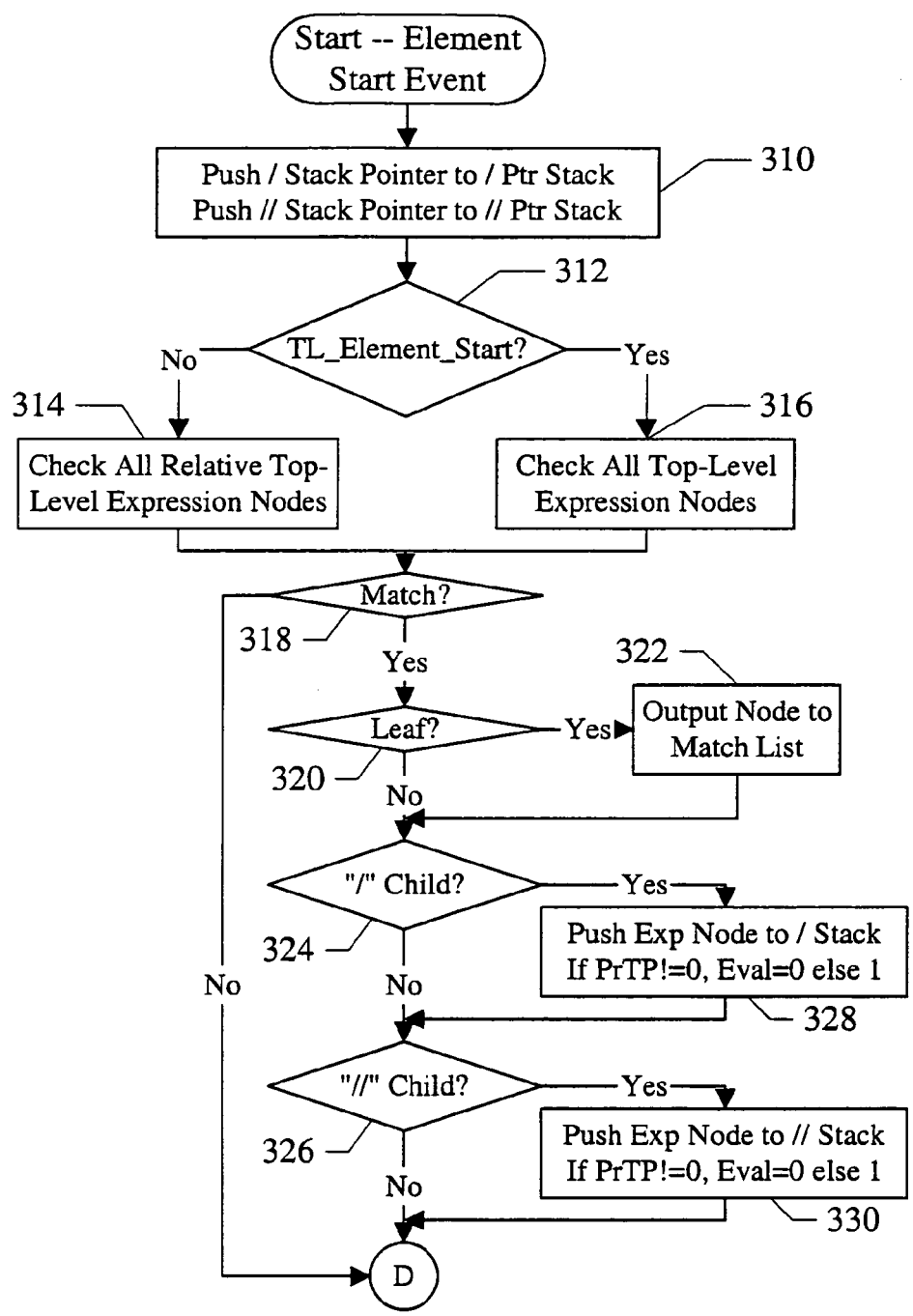
FIGS. 19A-19B are a flowchart illustrating operation of one embodiment of the expression processor in response to an element start event.
Figure 19B:
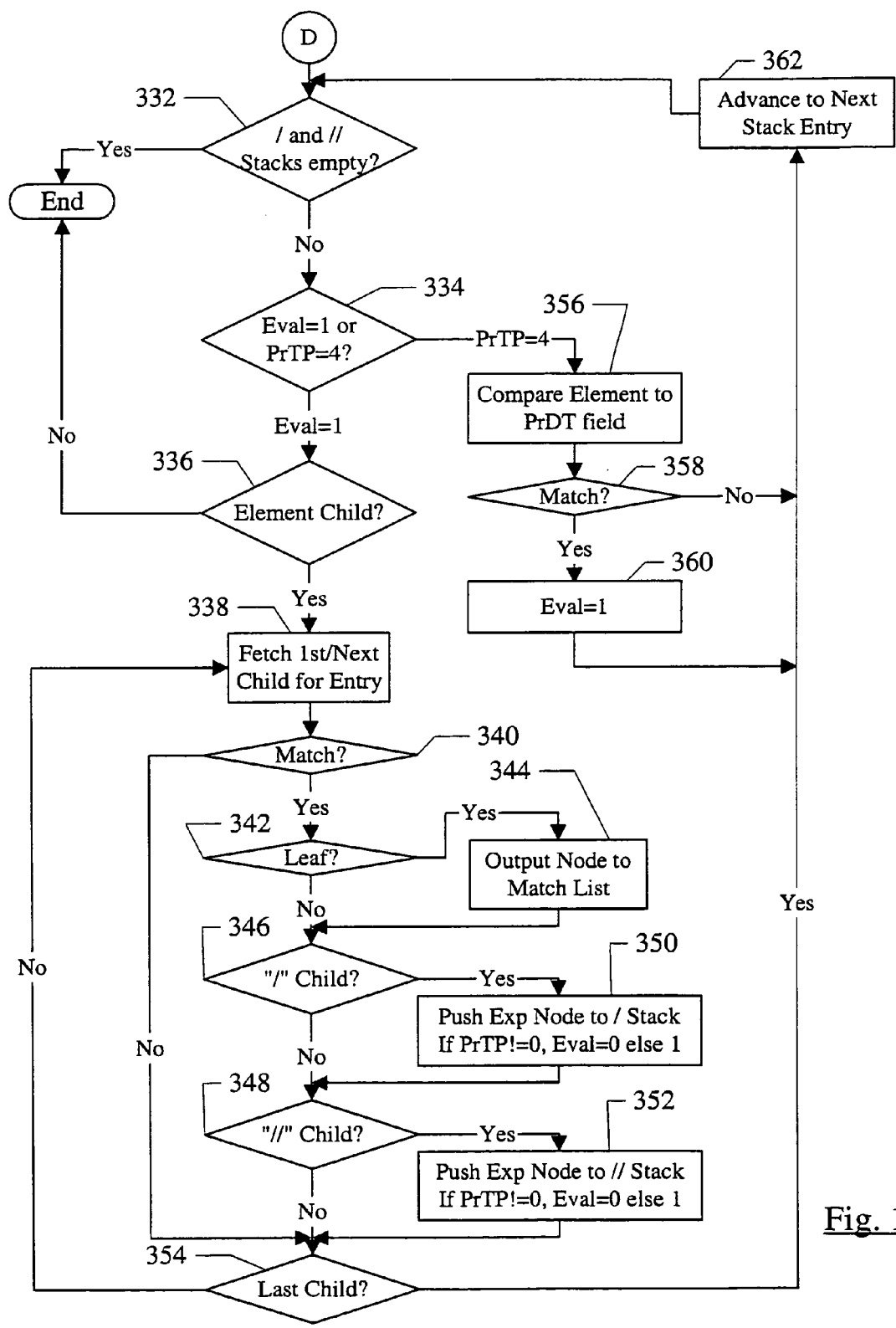

Turning next to FIGS. 19A-19B, a flowchart is shown illustrating operation of one embodiment of the expression processor 42, using the parse-time expression tree 26 shown in FIG. 17, responsive to an element start event (including both element start and top level element start events). Generally, the processing may include checking relative top level expression nodes (and non-relative top level expression nodes, if the event is a top level element start event) for a match with the element, as well as checking whether the element satisfies a predicate of an expression node on the / and // stacks 39C and 39D or is an element child of such an expression node.

The expression processor 42 may push the / and // stack pointers to the pointer stack 39E (block 310). More particularly, in the illustrated embodiment, the pointer stack 39E may comprise a / Ptr stack and a // Ptr stack for / stack pointers and // stack pointers, respectively. Alternatively, other embodiments may push both pointers onto the same stack. The pointers may subsequently be popped when the corresponding element end event occurs, to restore the state of the / stack 39C and the // stack 39D to the state prior to detection of the element (permitting matching of another element to the expressions as matched prior to the element that is being ended). The element identified by the element start event will be referred to more succinctly in the description of FIGS. 19A-19B as the element. Depending on whether or not a top level element start event has been received (decision block 312), the expression processor 42 may either check each top-level expression node (e.g. including absolute and ancestor top-level expression nodes) (block 316) or each relative top-level expression node (block 314) in the parse-time expression tree for a match. That is, if the event is a top level element start event (decision block 312, "yes" leg), the expression processor 42 may check each top-level expression node in the parse-time expression tree 26 since a match may be detected even against absolute top-level nodes for a child of the root node (block 316). On the other hand, if the event is not a top level element start event (decision block 312, "no" leg), the expression processor 42 may check each relative top-level expression node in the parse-time expression tree 26 since a match may not be detected against absolute top-level nodes (block 314).

If a match is not detected against any of the top-level nodes (decision block 318, "no" leg), the flowchart continues at reference D in FIG. 19B. If a match is detected (decision block 318, "yes" leg), and the expression node is a leaf node (decision block 320, "yes" leg), the element node is output to the match list corresponding to the expression(s) and/or template(s) pointed to by the XLP and TLP pointers in the expression node's entry of the parse time expression tree 26 (block 322). The expression processor 42 determines if the matched expression node has any / or // children (decision blocks 324 and 326, respectively), and pushes the matched expression node on the / stack 39C and/or the // stack 39D, respectively, if the matched expression node does have any / or // children (blocks 328 and 330, respectively). The expression processor 42 may, e.g., use the CD field of the expression node's entry in the parse time expression tree 26 to detect whether or not there are an / or // children. Additionally, the / stack 39C and the // stack 39D may include an eval field used for managing the matching of parse-time predicates (indicated via the PrTP and Pr DT fields in the parse-time expression tree entry 300). If there is a parse-time predicate (as indicated by the PrTP field being not equal to zero), the eval field may be set to 0. Otherwise, the eval field may be set to 1. The flowchart continues at reference D in FIG. 19B.

At reference D in FIG. 19B, the / and // stacks are searched to see if the element matches a child or a predicate of a previously-matched expression node (stored in one of the / or // stack entries). If the / and // stacks are empty (decision block 332, "yes" leg), the matching ends for this element. Otherwise (decision block 332, "no" leg), a stack entry is selected. If the eval field in the entry is set to one, the corresponding expression node in the selected stack entry either does not have a predicate or the predicate has been satisfied by a previously parsed document node. Accordingly (decision block 334, "eval=1" leg), the expression processor may check any element children of the expression node in the selected stack entry to determine if the element matches any of the element children. Both / element children and // element children may be considered. More particularly, if the expression node does not have an element child (as indicated, e.g., in the CD field of the parse-time expression tree entry 300) (decision block 336, "no" leg), the matching process ends for the element. Alternatively, the expression processor 42 may advance to the next stack entry (block 362) for processing. If the expression node does have an element child (decision block 336, "yes" leg), the expression processor 42 fetches the first element child of the expression node (block 338). For example, the Ptr / or Ptr // pointers of the entry may be used to locate element children (along with the NT type field in the child expression tree entries). If the child element node matches the element (block 340, "yes" leg), and the child element node is a leaf node (decision block 342, "yes" leg), the node is output to the match list (block 344). Additionally, if the matched child element node has / or // children, respectively (decision blocks 346 and 348), the matched child element node is pushed to the / stack 39C or the // stack 39D, respectively (block 350 and 352) and the eval field is initialized as described above with regard to blocks 324-330. Whether or not the child element node matches the element, the expression processor 42 determines if the last element child has been processed (decision block 354). If not, the next child element node is fetched (block 338) and processed in a similar fashion. If the child element node is the last element child of the current stack entry (decision block 354, "yes" leg), the expression processor 42 may advance to the next stack entry (block 362) and process both element children and predicates.

If the PrTP field of the selected stack entry is equal to four, or element child, then it is possible that the element may satisfy the predicate of the expression node in the selected stack entry. Thus (decision block 334, "PrTP=4" leg), the expression processor 42 may compare the element serial number to the PrDT field of the selected stack entry (block 356). If the element matches the PrDT field (decision block 358, "yes" leg), the element satisfies the predicate and the expression processor 42 sets the eval field of the selected stack entry to one (block 360). In either case, the expression processor 42 may advance to the next stack entry (block 362).

It is noted that a given stack entry may have the eval field equal to zero and the PrTP field not equal to four. In such cases, the expression processor 42 may advance to the next stack entry (block 362).

Figure 20:
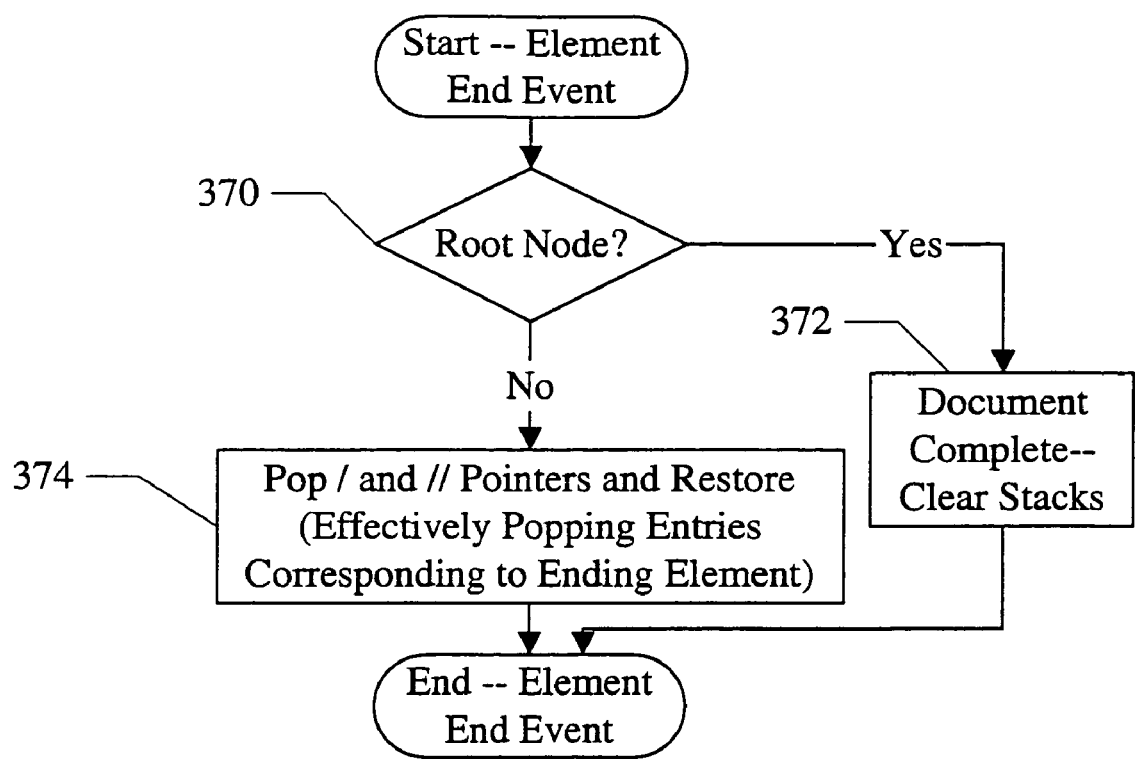
FIG. 20 is a flowchart illustrating operation of one embodiment of the expression processor in response to an element end event.

Turning now to FIG. 20, a flowchart is shown illustrating operation of one embodiment of the expression processor 42, using the parse-time expression tree 26 shown in FIG. 17, responsive to an element end event.

If the element end event is for the root node of the document (decision block 370, "yes" leg), the document is complete (block 372). The expression processor 42 may clear the stacks 39C-39F. If the element end event is not for the root node of the document (decision block 370, "no" leg), the expression processor 42 may pop the / and if stack pointers from the Ptr stack 39E (block 374). Since the element is being ended, all children of the element have previously been parsed. Accordingly, any entries in the / and // stack that correspond to the element (that is, entries that have the element's serial number) can not be matched by subsequently-detected nodes. Effectively, restoring the / and // stack pointers that were pushed when the element start event for the element was detected pops the entries on the / and // stacks 39C-39D that correspond to the ending element and restore their state to the state prior to processing that element (which may be the correct state for processing the next-detected element).

Figure 21A:
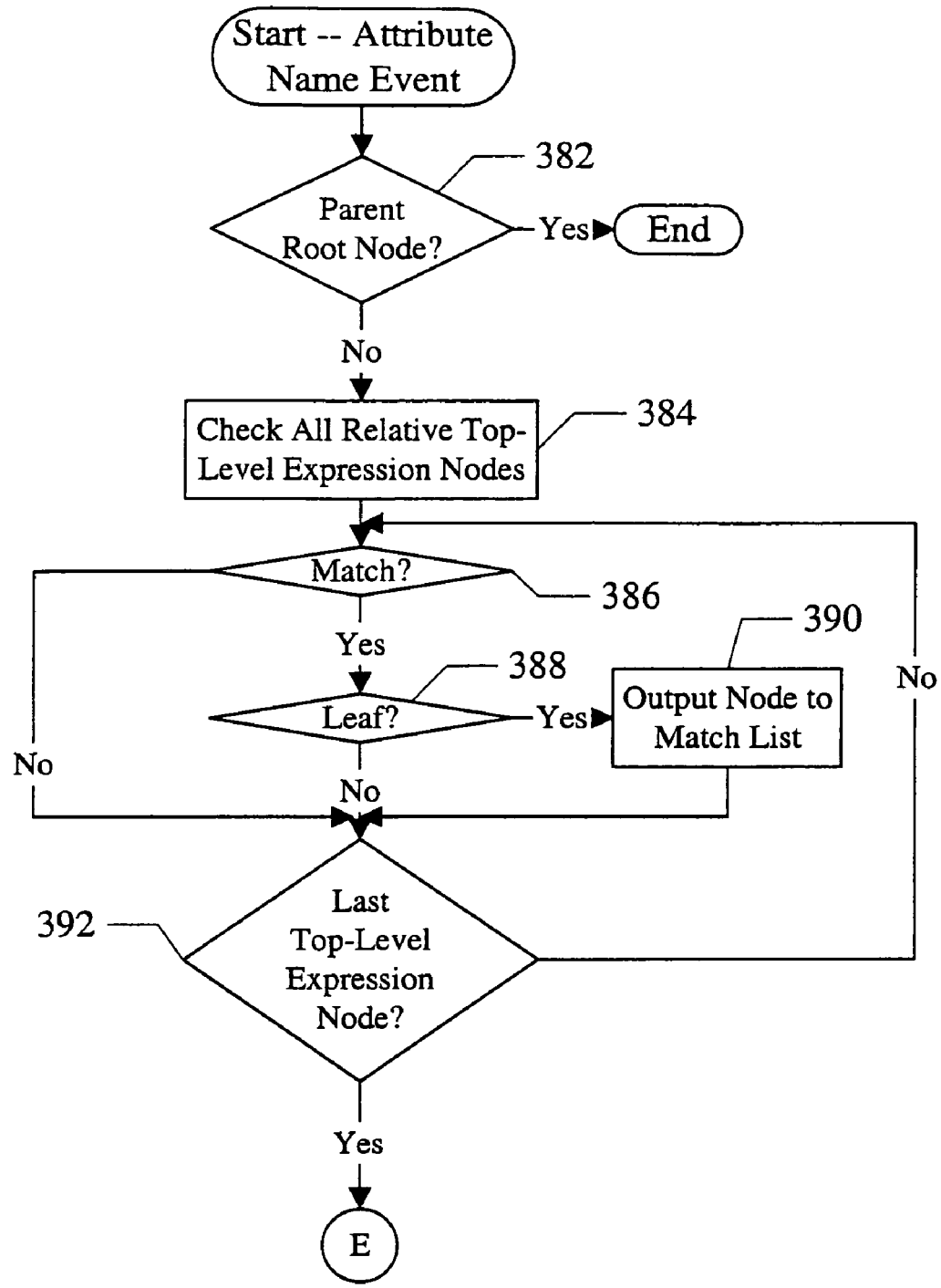
FIGS. 21A-21B are a flowchart illustrating operation of one embodiment of the expression processor in response to an attribute name event.
Figure 21B:
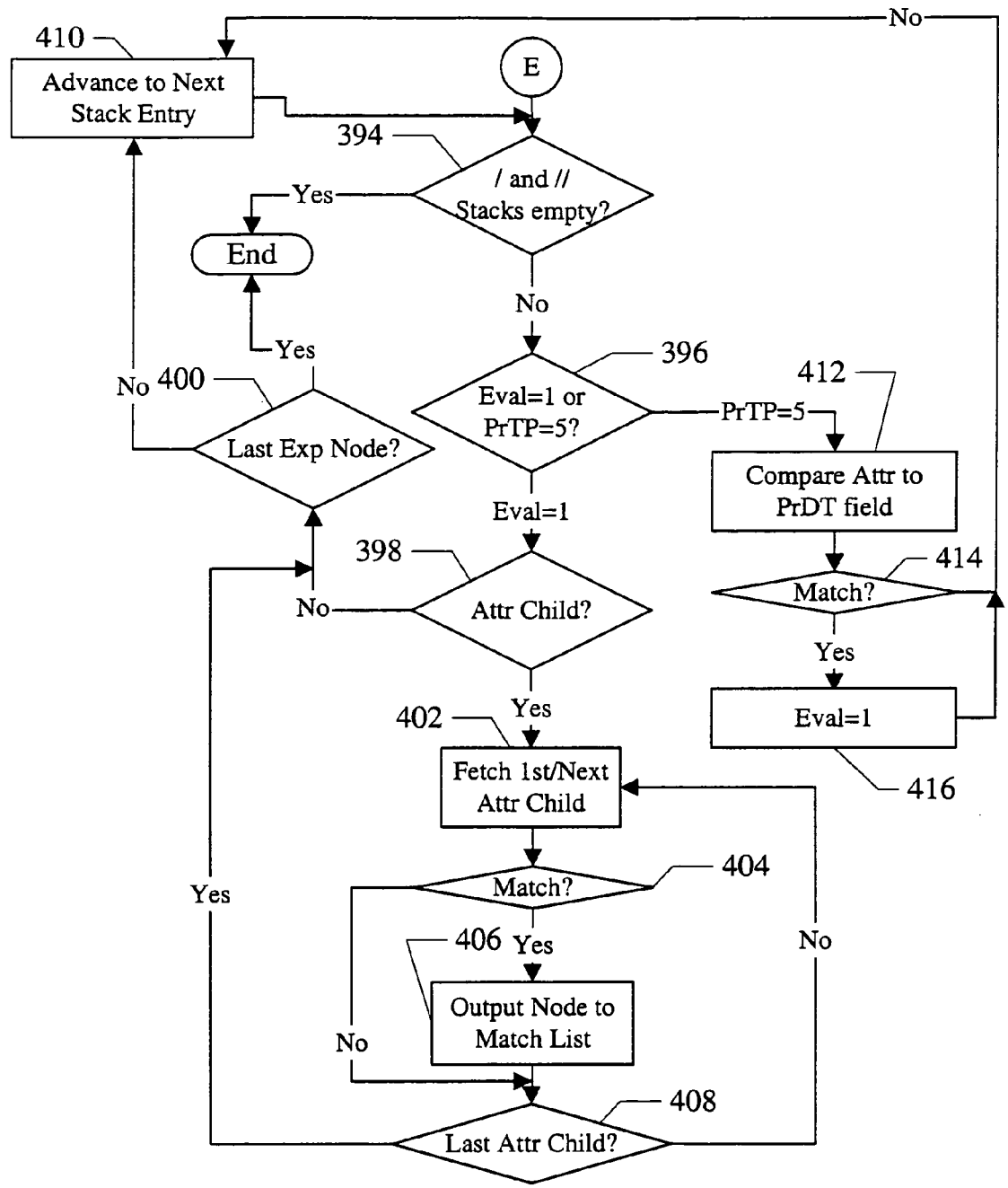

Turning now to FIGS. 21A-21B, a flowchart is shown illustrating operation of one embodiment of the expression processor 42, using the parse-time expression tree 26 shown in FIG. 17, responsive to an attribute name event. The attribute identified by the attribute name event may be referred to in the description on FIGS. 21A-21B as "the attribute". Generally, the processing may include checking relative top level expression nodes for a match with the attribute, as well as checking whether the attribute satisfies a predicate of an expression node on the / and // stacks 39C and 39D or is an attribute child of such an expression node.

If the parent node of the attribute is the root node (decision block 382, "yes" leg), then there is no additional processing to perform (since the root node does not have attributes). On the other hand, if the parent node of the attribute is not the root node (decision block 382, "no" leg), the expression processor 42 continues.

The expression processor 42 may check each of the relative top-level expression nodes for a match against the attribute (block 384). If there is a match with a given relative top-level expression node (decision block 386, "yes" leg), and the node is a leaf node (decision block 388, "yes" leg), the attribute node is output to the match lists 39G (block 390). Whether or not there is a match, processing may continue with the next relative top-level expression node until the top-level expression nodes have been exhausted (decision block 392, "no" leg). Once the top-level expression nodes have been exhausted (decision block 392, "yes" leg), processing continues in FIG. 21B at reference E.

Continuing at reference E in FIG. 21B, the / and // stacks are searched to see if the attribute matches a child or a predicate of a previously matched expression node (stored in one of the / or // stack entries). If the / and // stacks are empty (decision block 394, "yes" leg), the matching ends for this attribute. Otherwise (decision block 394, "no" leg), a stack entry is selected. If the eval field in the entry is set to one, the corresponding expression node in the selected stack entry either does not have a predicate or the predicate has been satisfied by a previously-parsed document node. Accordingly (decision block 334, "eval=1" leg), the expression processor 42 may check any attribute children of the expression node in the selected stack entry to determine if the attribute matches any of the attribute children. Both / and // attribute children may be considered. More particularly, if the expression node in the selected stack entry does not have an attribute child (as indicated, e.g., in the CD field of the parse-time expression tree entry 300) (decision block 398, "no" leg), the expression processor 42 may determine if the last expression node in the stacks has been processed (decision block 400). If so (decision block 400, "yes" leg) processing ends for the attribute. Otherwise (decision block 400, "no" leg), the expression processor 42 may advance to the next stack entry (block 410) for processing. If the expression node in the selected stack entry does have an attribute child (decision block 398, "yes" leg), the expression processor 42 fetches the first attribute child of the entry (block 402). For example, the Ptr / Attr or Ptr // Attr pointers of the entry may be used to locate attribute children. If the child attribute node matches the attribute (block 404, "yes" leg), the node is output to the match list (block 406). Whether or not the child attribute node matches the attribute, the expression processor 42 determines if the last attribute child has been processed (decision block 408). If not, the next attribute child node is fetched (block 402) and processed in a similar fashion. If the child attribute node is the last attribute child of the expression node in the selected stack entry (decision block 408, "yes" leg), the expression processor 42 may determine if the last expression node has been processed (decision block 400) and may advance to the next stack entry (block 410) or terminate processing accordingly.

If the PrTP field of the selected stack entry is equal to five, or attribute name, then it is possible that the attribute may satisfy the predicate of the expression node in the selected stack entry. Thus (decision block 396, "PrTP=5" leg), the expression processor 42 may compare the attribute serial number to the PrDT field of the selected stack entry (block 412). If the attribute matches the PrDT field (decision block 414, "yes" leg), the attribute satisfies the predicate and the expression processor 42 sets the eval field of the selected stack entry to one (block 416). In either case, the expression processor 42 may advance to the next stack entry (block 410). The expression processor 42 may determine if there are any remaining expression nodes (decision block 400) before advancing, if desired.

It is noted that a given stack entry may have the eval field equal to zero and the PrTP field not equal to five. In such cases, the expression processor 42 may advance to the next stack entry (block 410).

Figure 22A:
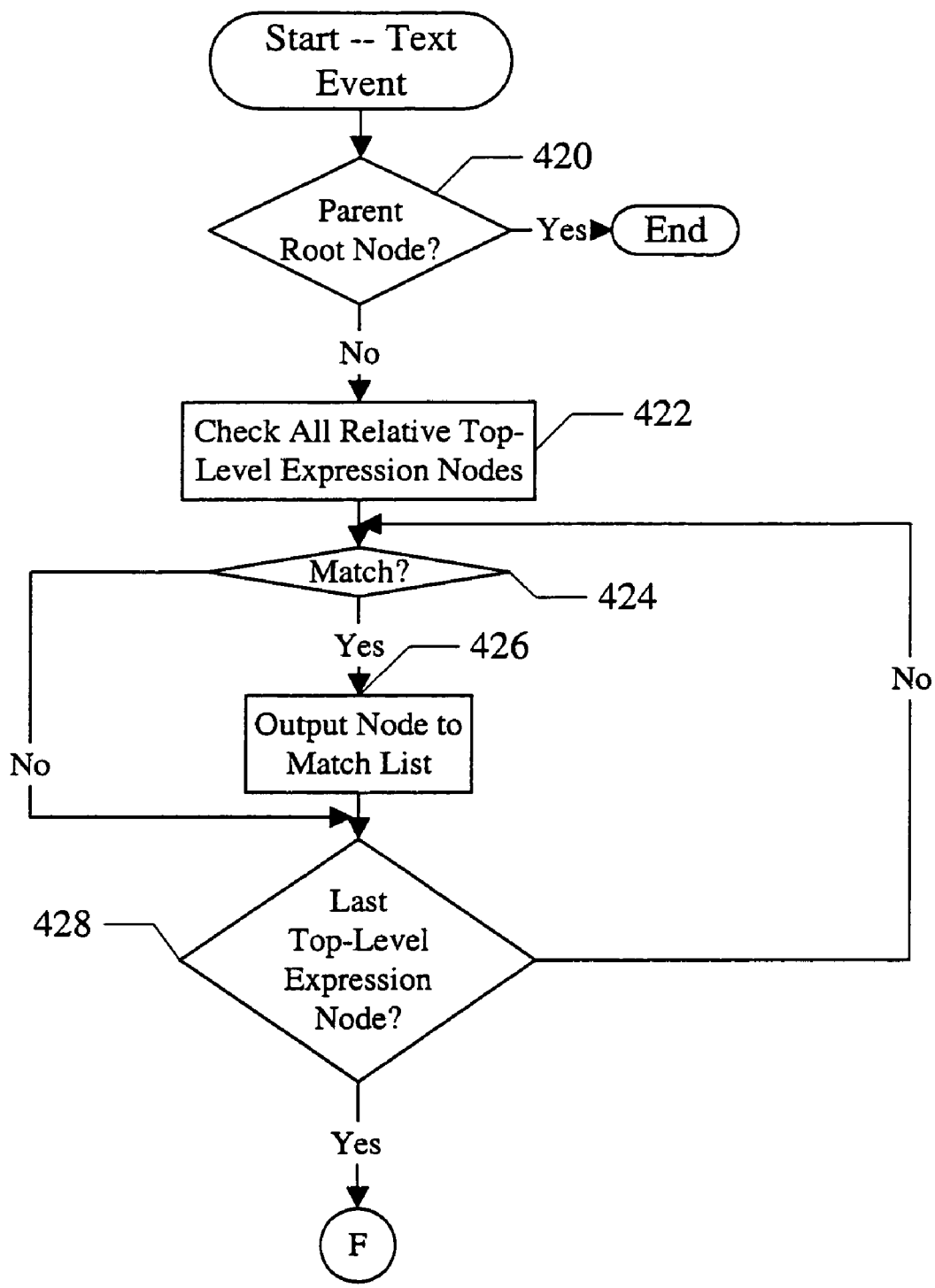
FIGS. 22A-22B are a flowchart illustrating operation of one embodiment of the expression processor in response to a text event.
Figure 22B:
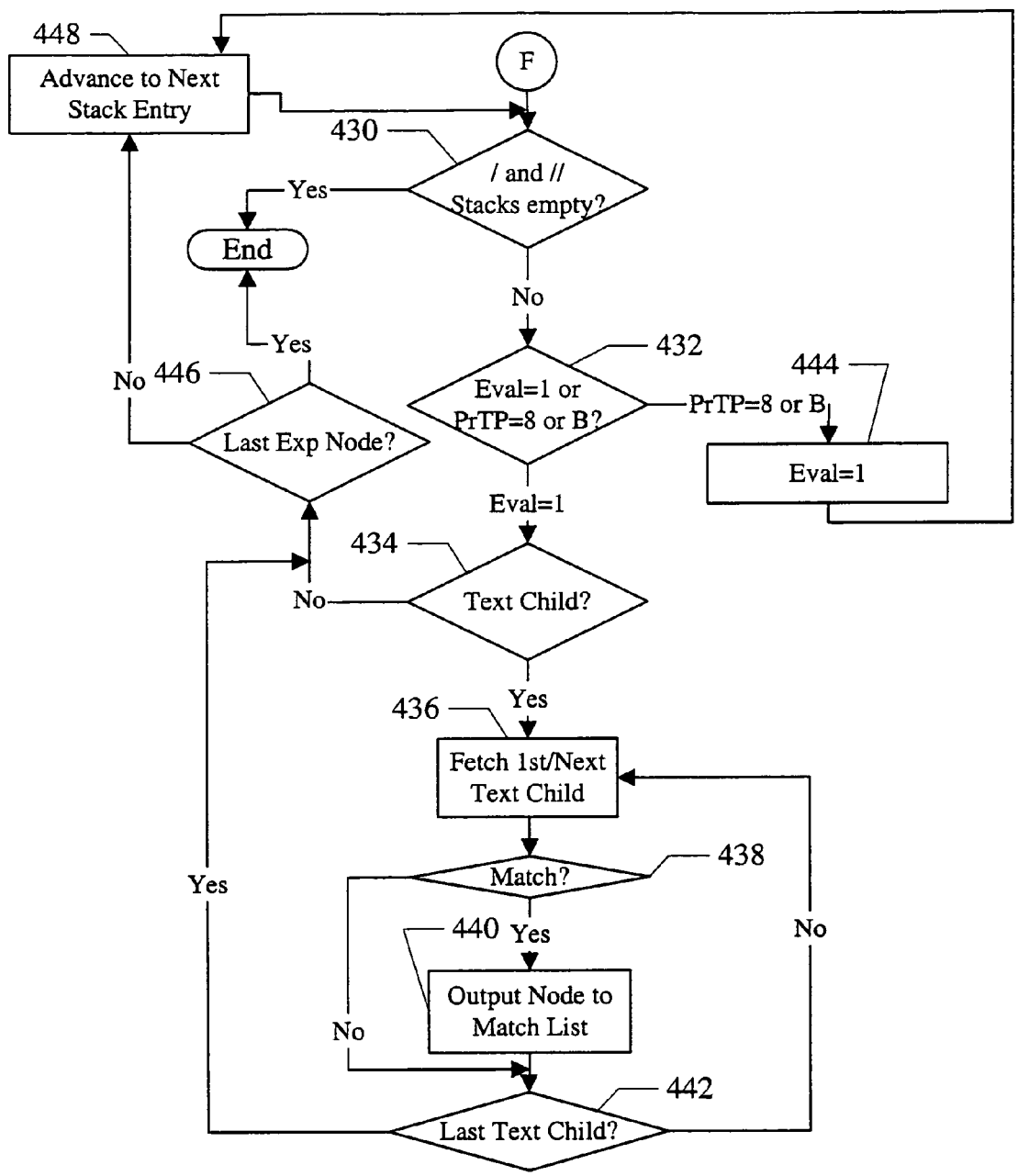

Turning now to FIGS. 22A-22B, a flowchart is shown illustrating operation of one embodiment of the expression processor 42, using the parse-time expression tree 26 shown in FIG. 17, responsive to a text event. The text node identified by the text event may be referred to in the description of FIGS. 22A-22B more succinctly as "the text node". Generally, the processing may include checking relative top level expression nodes for a match with the text node, as well as checking whether the text node satisfies a predicate of an expression node on the / and // stacks 39C and 39D or is a text child of such an expression node.

If the parent node of the text node is the root node (decision block 420, "yes" leg), then there is no additional processing to perform. On the other hand, if the parent node of the text node is not the root node (decision block 420, "no" leg), the expression processor 42 continues.

The expression processor 42 may check each of the relative top-level expression nodes for a match against the text node (block 422). If there is a match with a given relative top-level expression node (decision block 424, "yes" leg), the text node is output to the match lists 39G (block 426). Whether or not there is a match, processing may continue with the next relative top-level expression node until the top-level expression nodes have been exhausted (decision block 428, "no" leg). Once the top-level expression nodes have been exhausted (decision block 428, "yes" leg), processing continues in FIG. 22B at reference F.

Continuing at reference F in FIG. 22B, the / and // stacks are searched to see if the text node matches a child or a predicate of a previously matched expression node (stored in one of the / or // stack entries). If the / and // stacks are empty (decision block 430, "yes" leg), the matching ends for this text node. Otherwise (decision block 430, "no" leg), a stack entry is selected. If the eval field in the entry is set to one, the corresponding expression node in the selected stack entry either does not have a predicate or the predicate has been satisfied by a previously-parsed document node. Accordingly (decision block 432, "eval=1" leg), the expression processor 42 may check any text children of the expression node in the selected stack entry to determine if the text node matches any of the text children. More particularly, if the expression node does not have a text child (as indicated, e.g., in the CD field of the parse-time expression tree entry 300) (decision block 434, "no" leg), the expression processor 42 may determine if the last expression node in the stacks has been processed (decision block 446). If so (decision block 446, "yes" leg) processing ends for the text node. Otherwise (decision block 446, "no" leg), the expression processor 42 may advance to the next stack entry (block 448) for processing. If the expression node does have a text child (decision block 434, "yes" leg), the expression processor 42 fetches the first text child of the expression node (block 436). For example, the Ptr / or Ptr // pointers of the entry may be used to locate text children (along with the NT field in each child node). If the child text node matches the text node (block 438, "yes" leg), the node is output to the match list (block 440). Whether or not the child text node matches the text node, the expression processor 42 determines if the last text child has been processed (decision block 442). If not, the next text child node is fetched (block 436) and processed in a similar fashion. If the child text node is the last text child of the expression node in the selected stack entry (decision block 442, "yes" leg), the expression processor 42 may determine if the last expression node has been processed (decision block 446) and may advance to the next stack entry (block 448) or terminate processing accordingly.

If the PrTP field of the selected stack entry is equal to either 8 (node test) or B (text node test), then the text node satisfies the predicate of the expression node in the selected stack entry (decision block 432, "PrTP=8 or B" leg). Thus, the expression processor 42 sets the eval field of the selected stack entry to one (block 444). The expression processor 42 may advance to the next stack entry (block 448). The expression processor 42 may determine if there are any remaining expression nodes (decision block 446) before advancing, if desired.

It is noted that a given stack entry may have the eval field equal to zero and the PrTP field not equal to 8 or B. In such cases, the expression processor 42 may advance to the next stack entry (block 448).

Figure 23A:
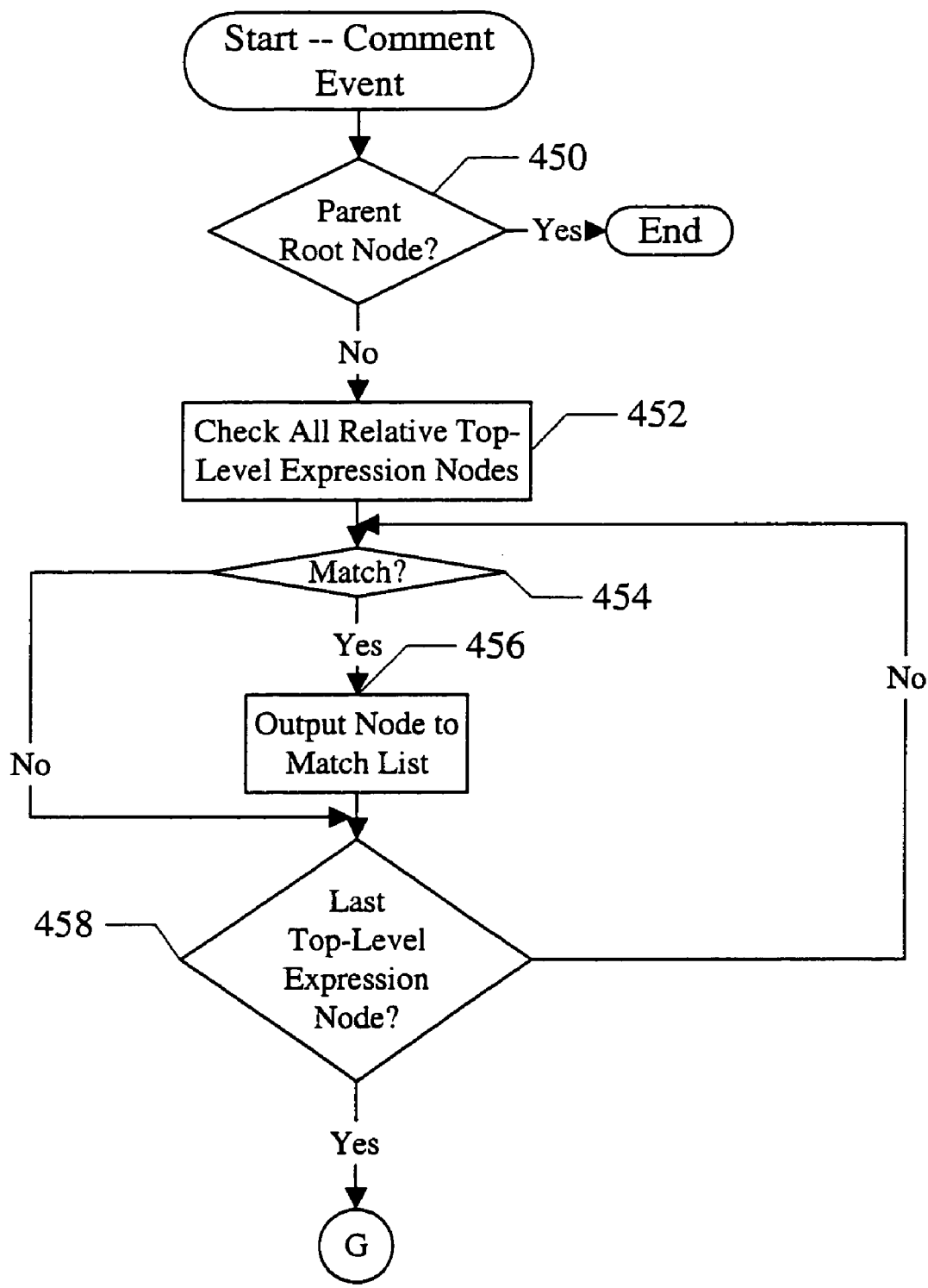
FIGS. 23A-23B are a flowchart illustrating operation of one embodiment of the expression processor in response to a comment event.
Figure 23B:
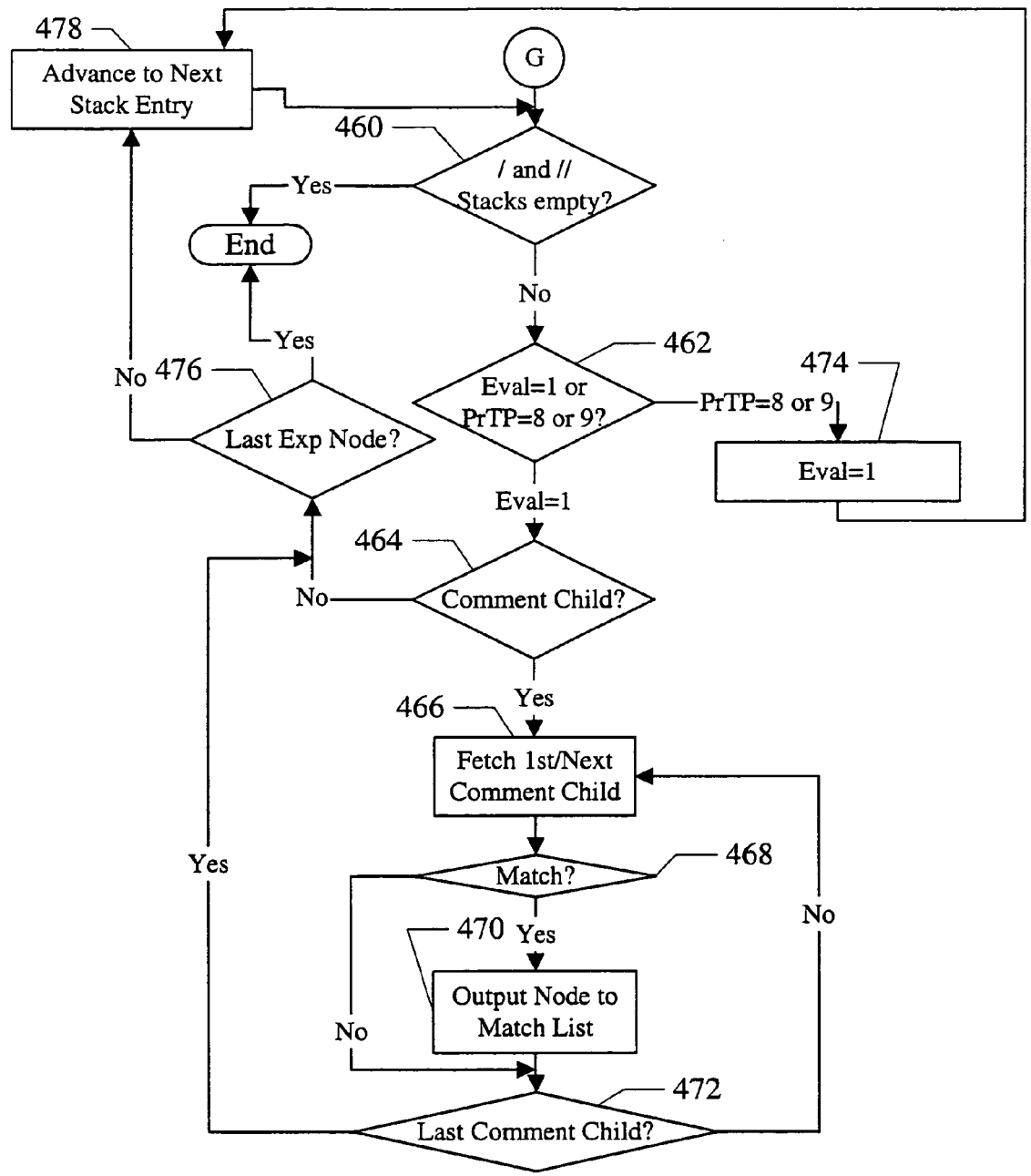

Turning now to FIGS. 23A-23B, a flowchart is shown illustrating operation of one embodiment of the expression processor 42, using the parse-time expression tree 26 shown in FIG. 17, responsive to a comment event. The comment node identified by the comment event may be referred to in the description of FIGS. 23A-23B more succinctly as "the comment node". Generally, the processing may include checking relative top level expression nodes for a match with the comment node, as well as checking whether the comment node satisfies a predicate of an expression node on the / and // stacks 39C and 39D or is a comment child of such an expression node.

If the parent node of the comment node is the root node (decision block 450, "yes" leg), then there is no additional processing to perform. On the other hand, if the parent node of the comment node is not the root node (decision block 450, "no" leg), the expression processor 42 continues.

The expression processor 42 may check each of the relative top-level expression nodes for a match against the comment node (block 452). If there is a match with a given relative top-level expression node (decision block 454, "yes" leg), the comment node is output to the match lists 39G (block 456). Whether or not there is a match, processing may continue with the next relative top-level expression node until the top-level expression nodes have been exhausted (decision block 458, "no" leg). Once the top-level expression nodes have been exhausted (decision block 458, "yes" leg), processing continues in FIG. 23B at reference G.

Continuing at reference G in FIG. 23B, the / and // stacks are searched to see if the comment node matches a child or a predicate of a previously-matched expression node (stored in one of the / or // stack entries). If the / and // stacks are empty (decision block 460, "yes" leg), the matching ends for this comment node. Otherwise (decision block 460, "no" leg), a stack entry is selected. If the eval field in the entry is set to one, the corresponding expression node in the selected stack entry either does not have a predicate or the predicate has been satisfied by a previously-parsed document node. Accordingly (decision block 462, "eval=1" leg), the expression processor 42 may check any comment children of the expression node in the selected stack entry to determine if the comment node matches any of the comment children. More particularly, if the expression node in the selected entry does not have a comment child (as indicated, e.g., in the CD field of the parse-time expression tree entry 300) (decision block 464, "no" leg), the expression processor 42 may determine if the last expression node in the stacks has been processed (decision block 476). If so (decision block 476, "yes" leg) processing ends for the comment node. Otherwise (decision block 476, "no" leg), the expression processor 42 may advance to the next stack entry (block 478) for processing. If the expression node does have a comment child (decision block 464, "yes" leg), the expression processor 42 fetches the first comment child of the expression node (block 456). For example, the Ptr / or Ptr // pointers of the entry may be used to locate comment children (along with the NT field in each child node). If the child comment node matches the comment node (block 468, "yes" leg), the node is output to the match list (block 470). Whether or not the child comment node matches the comment node, the expression processor 42 determines if the last comment child has been processed (decision block 472). If not, the next comment child node is fetched (block 466) and processed in a similar fashion. If the child comment node is the last comment child of the expression node in the selected stack entry (decision block 472, "yes" leg), the expression processor 42 may determine if the last expression node has been processed (decision block 476) and may advance to the next stack entry (block 478) or terminate processing accordingly.

If the PrTP field of the selected stack entry is equal to either 8 (node test) or 9 (comment node test), then the comment node satisfies the predicate of the expression node in the selected stack entry (decision block 462, "PrTP=8 or 9" leg). Thus, the expression processor 42 sets the eval field of the selected stack entry to one (block 474). The expression processor 42 may advance to the next stack entry (block 478). The expression processor 42 may determine if there are any remaining expression nodes (decision block 476) before advancing, if desired.

It is noted that a given stack entry may have the eval field equal to zero and the PrTP field not equal to 8 or 9. In such cases, the expression processor 42 may advance to the next stack entry (block 478).

Figure 24A:
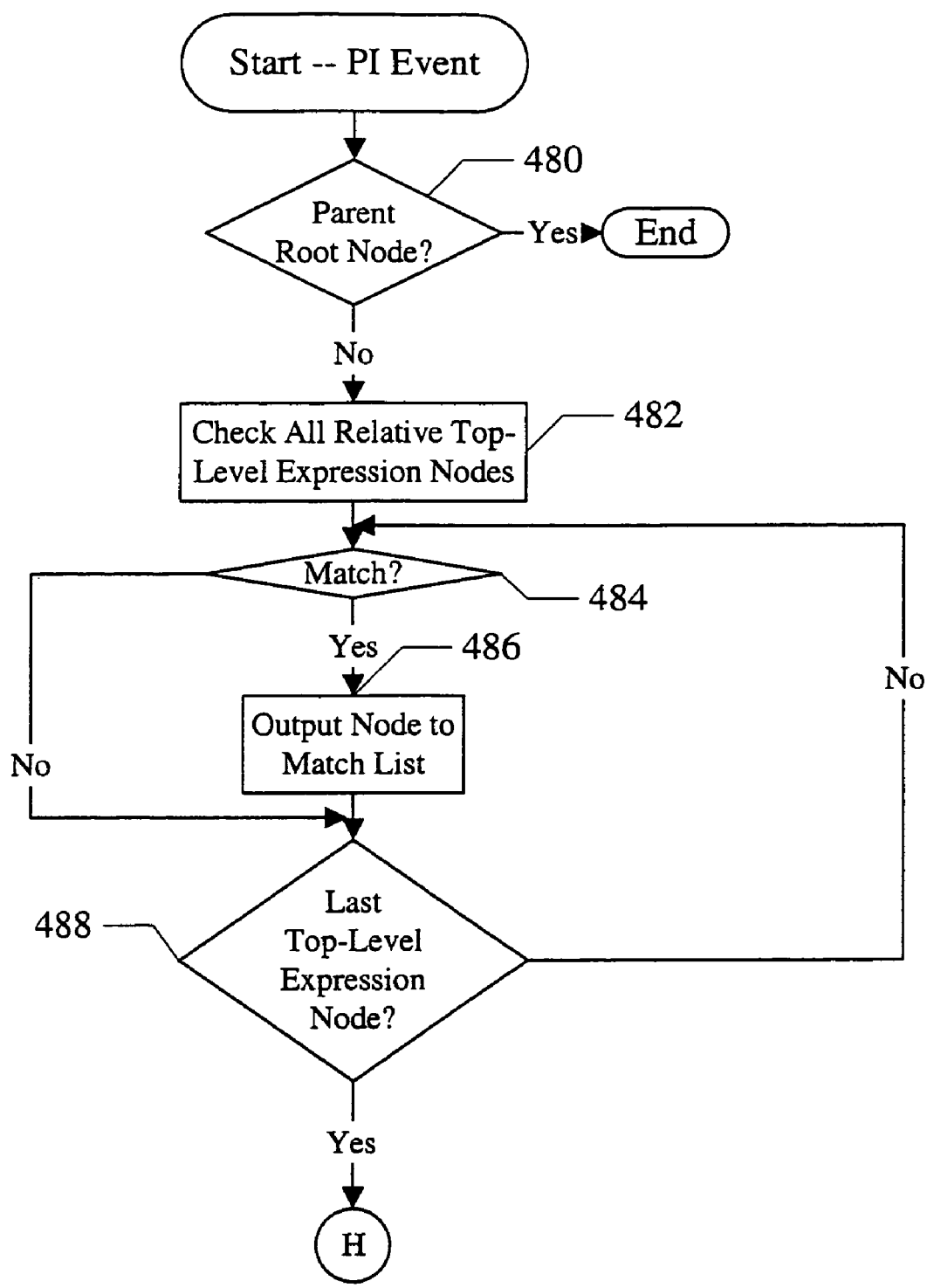
FIGS. 24A-24B are a flowchart illustrating operation of one embodiment of the expression processor in response to a processing instruction event.
Figure 24B:
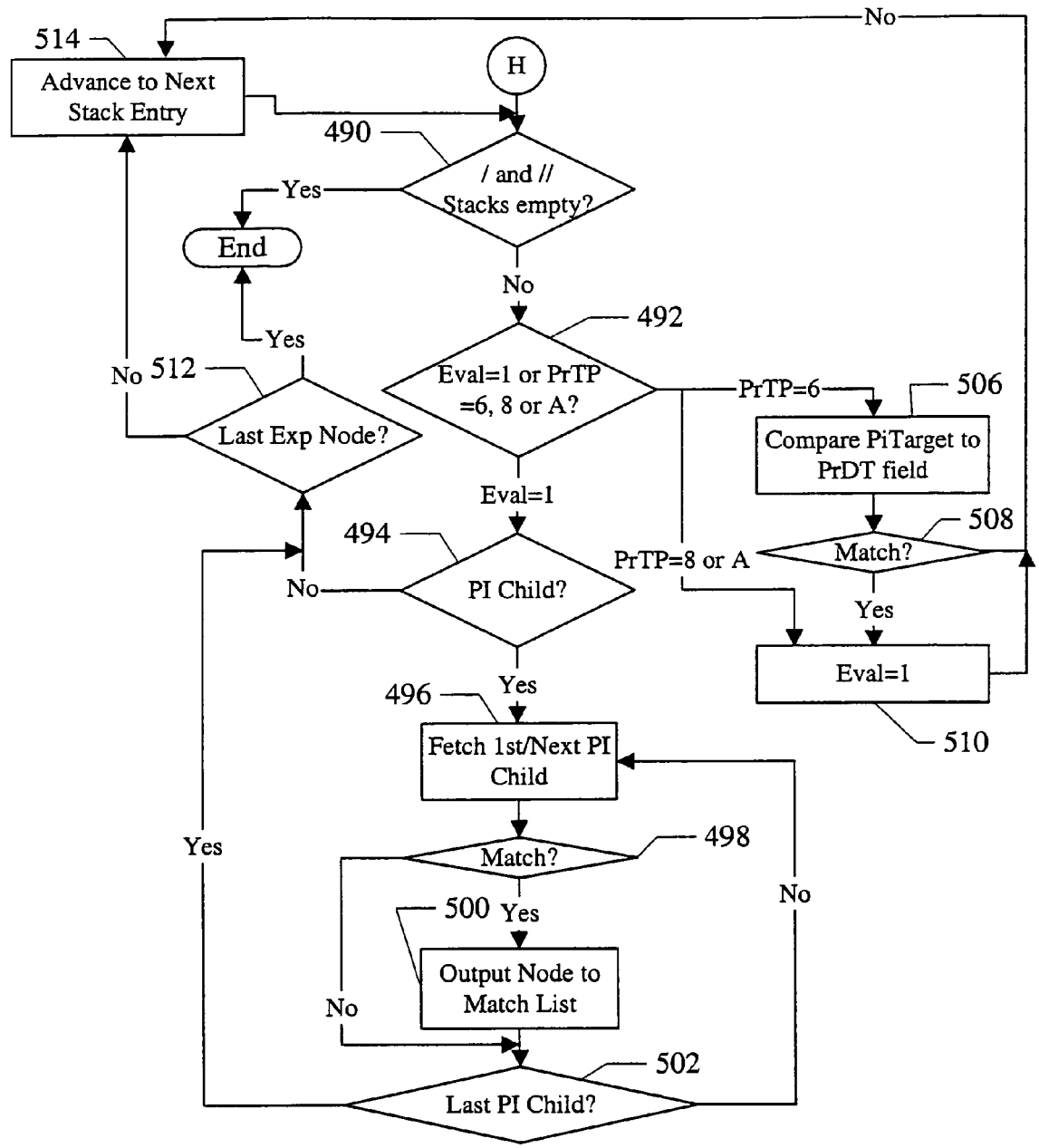

Turning now to FIGS. 24A-24B, a flowchart is shown illustrating operation of one embodiment of the expression processor 42, using the parse-time expression tree 26 shown in FIG. 17, responsive to a processing instruction event. The processing instruction node identified in the processing instruction event may be referred to in the description of FIGS. 24A-24B more succinctly as "the processing instruction node" or "the PI node". Generally, the processing may include checking relative top level expression nodes for a match with the PI node, as well as checking whether the PI node satisfies a predicate of an expression node on the / and // stacks 39C and 39D or is a PI child of such an expression node.

If the parent node of the PI node is the root node (decision block 480, "yes" leg), then there is no additional processing to perform. On the other hand, if the parent node of the PI node is not the root node (decision block 480, "no" leg), the expression processor 42 continues.

The expression processor 42 may check each of the relative top-level expression nodes for a match against the PI node (block 482). If there is a match with a given relative top-level expression node (decision block 484, "yes" leg), the PI node is output to the match lists 39G (block 486). Whether or not there is a match, processing may continue with the next relative top-level expression node until the top-level expression nodes have been exhausted (decision block 488, "no" leg). Once the top-level expression nodes have been exhausted (decision block 488, "yes" leg), processing continues in FIG. 24B at reference H.

Continuing at reference H in FIG. 24B, the / and // stacks are searched to see if the PI node matches a child or a predicate of a previously-matched expression node (stored in one of the / or // stack entries). If the / and // stacks are empty (decision block 490, "yes" leg), the matching ends for this PI node. Otherwise (decision block 490, "no" leg), a stack entry is selected. If the eval field in the entry is set to one, the corresponding expression node in the selected stack entry either does not have a predicate or the predicate has been satisfied by a previously-parsed document node. Accordingly (decision block 492, "eval=1" leg), the expression processor 42 may check any PI children of the expression node in the selected stack entry to determine if the PI node matches any of the PI children. More particularly, if the expression node in the selected entry does not have a PI child (as indicated, e.g., in the CD field of the parse-time expression tree entry 300) (decision block 494, "no" leg), the expression processor 42 may determine if the last expression node in the stacks has been processed (decision block 512). If so (decision block 512, "yes" leg) processing ends for the PI node. Otherwise (decision block 512, "no" leg), the expression processor 42 may advance to the next stack entry (block 514) for processing. If the expression node in the selected entry does have a PI child (decision block 494, "yes" leg), the expression processor 42 fetches the first PI child of the expression node in the selected entry (block 496). For example, the Ptr / PI or Ptr // PI pointers of the entry may be used to locate PI children. If the child PI node matches the PI node (block 498, "yes" leg), the node is output to the match list (block 500). Whether or not the child PI node matches the PI node, the expression processor 42 determines if the last PI child has been processed (decision block 502). If not, the next PI child node is fetched (block 496) and processed in a similar fashion. If the child PI node is the last PI child of the expression node in the selected stack entry (decision block 502, "yes" leg), the expression processor 42 may determine if the last expression node has been processed (decision block 512) and may advance to the next stack entry (block 514) or terminate processing accordingly.

If the PrTP field of the selected stack entry is equal to either 8 (node test) or A (PI node test), then the PI node satisfies the predicate of the expression node in the selected stack entry. Thus, the expression processor 42 sets the eval field of the selected stack entry to one (block 510). The expression processor 42 may advance to the next stack entry (block 514). The expression processor 42 may determine if there are any remaining expression nodes (decision block 512) before advancing, if desired.

If the PrTP field of the selected stack entry is equal to 6 (PI node test with name), then the PI node satisfies the predicate if the PITarget of the PI node matches the PrDT field. The expression processor 42 compares the PITarget to the PrDT field (block 506). If a match is detected (decision block 508, "yes" leg), the-expression processor 42 sets the eval field of the selected entry to one (block 510). The expression processor 42 may advance to the next stack entry (block 514). The expression processor 42 may determine if there are any remaining expression nodes (decision block 512) before advancing, if desired.

It is noted that a given stack entry may have the eval field equal to zero and the PrTP field not equal to 6, 8 or A. In such cases, the expression processor 42 may advance to the next stack entry (block 514).

It is noted that, in some embodiments, the expression processor 42 may be pipelined. For example, comparisons of nodes may occur at a later pipeline stage then the fetching of those nodes (and checking of the eval field, for nodes having predicates). In such embodiments, the / and // stack entries may include an in-progress bit that may be set when a potential change to the eval field is in the pipeline. The in-progress bit, when set, may indicate that the entry is busy, so that a subsequent event does not read the eval field before the comparison has been made.

It is noted that, at various points above, an expression node may be referred to as being pushed onto the / stack 39C or the // stack 39D. Pushing an expression node onto a stack 39C-39D may include pushing the node's expression tree entry 300 onto the stack (or a portion of the expression tree entry used in expression matching). Additional information may be included in the entry, as desired (e.g. various status variables indicating the progress of matchings, such as the eval field).

Numerous variations and modifications will become apparent to those skilled in the art once the above disclosure is fully appreciated. It is intended that the following claims be interpreted to embrace all such variations and modifications.

What is claimed is:

1. A method comprising:
   characterizing at least a portion of an expression in a stylesheet as evaluatable at a phase wherein the phase is one of a compile phase, a parse phase, or a transformation phase of applying the stylesheet to a document to transform the document in a document transformation appliance;
   applying at least a portion of the expression to the document in the phase determined in the characterizing;
   combining results from applying the at least a portion of the expression and from applying other expressions to the document to generate a transformed document; and
   outputting the transformed document or saving the transformed document to memory;
   wherein the at least a portion of the expression:
   is evaluatable at the compile phase only if the at least a portion of the expression includes no predicates and no ancestor/descendent references,
   is evaluatable in the parse phase if the at least a portion of the expression includes no predicates referring to the current node or a following sibling node, and no ancestor/descendent references, and
   is evaluatable in the transformation phase if the at least a portion of the expression includes a predicate or ancestor element reference;
   wherein applying the at least a portion of the expression comprises applying a first and a remaining portion of the expression, wherein the first portion is evaluatable during the parse phase and is applied during the parse phase, and wherein the remaining portion is evaluatable during the transformation phase.

2. The method as recited in claim 1 further comprising grouping results of applying the first portion according to the remaining portion to be evaluated at the transformation phase.

3. The method as recited in claim 2 further comprising, during the transformation phase, evaluating the remaining portion and selecting groups that satisfy the remaining portion.

4. An article comprising a computer-readable storage medium having instructions that, when executed, cause a processor to:
   characterize at least a portion of an expression in a stylesheet as evaluatable at a phase wherein the phase is one of a compile phase, a parse phase, or a transformation phase of applying the stylesheet to a document to transform the document in a document transformation appliance;
   apply the at least a portion of the expression to the document in the phase determined in the characterizing;
   combine results from applying the at least a portion of the expression and from applying other expressions to the document to generate a transformed document; and
   output the transformed document or save the transformed document to a memory;
   wherein the at least a portion of the expression:
   is evaluatable in the compile phase only if the at least a portion of the expression includes no predicates and no ancestor/descendent references,
   is evaluatable in the parse phase if the at least a portion of the expression includes no predicates referring to the current node or a following sibling node, and no ancestor/descendent references, and
   is evaluatable in the transformation phase if the at least a portion of the expression includes a predicate or ancestor element reference;
   wherein applying the at least a portion of the expression comprises applying a first and a remaining portion of the expression, wherein the first portion is evaluatable during the parse phase and is applied during the parse phase, and wherein the remaining portion is evaluatable during the transformation phase.

5. The article as recited in claim 4 further comprising grouping results of applying the first portion according to the remaining portion to be evaluated at the transformation phase.

6. The article as recited in claim 5 further comprising, during the transformation phase, evaluating the remaining portion and selecting groups that satisfy the remaining portion.

7. An apparatus comprising:
   means for characterizing least a portion of an expression in a stylesheet as evaluatable at a phase wherein the phase is one of a compile phase, a parse phase, or a transformation phase of applying the stylesheet to a document to transform the document in a document transformation appliance;

means for applying the at least a portion of the expression to the document in the phase determined in the characterizing;

means for combining results from applying the at least a portion of the expression and from applying other expressions to the document to generate a transformed document; and means for outputting the transformed document or for saving the transformed document to memory;

wherein the at least a portion of the expression:

is evaluatable in the compile phase only if the at least a portion of the expression includes no predicates and no ancestor/descendent references, is evaluatable in the parse phase if the at least a portion of the expression includes no predicates referring to the current node or a following sibling node, and no ancestor/descendent references, and is evaluatable in the transformation phase if the at least a portion of the expression includes a predicate or ancestor element reference;

wherein applying the at least a portion of the expression comprises applying a first and a remaining portion of the expression, wherein the first portion is evaluatable during the parse phase and is applied during the parse phase, and wherein the remaining portion is evaluatable during the transformation phase.

8. The apparatus as recited in claim 7 further comprising grouping results of applying the first portion according to the remaining portion to be evaluated at the transformation phase.

9. The apparatus as recited in claim 8 further comprising, during the transformation phase, evaluating the remaining portion and selecting groups that satisfy the remaining portion.

* * * * *